US012714994B2

(12) United States Patent
Xing et al.

(10) Patent No.: US 12,714,994 B2
(45) Date of Patent: Aug. 25, 2026

(54) DEVICES AND METHODS FOR REVERSIBLE ASSEMBLY OF A FLOWCELL

(71) Applicant: 10x Genomics, Inc., Pleasanton, CA (US)

(72) Inventors: Siyuan Xing, Newark, CA (US); Pratomo Putra Alimsijah, Palo Alto, CA (US); Denis Pristinski, Dublin, CA (US); David Morgan, San Leandro, CA (US); Rajiv Bharadwaj, Pleasanton, CA (US); Augusto Manuel Tentori, Dublin, CA (US); Francis Marcogliese, Livermore, CA (US); Yiran Zhang, Castro Valley, CA (US)

(73) Assignee: 10x Genomics, Inc., Pleasanton, CA (US)

( * ) Notice: Subject to any disclaimer, the term of this patent is extended or adjusted under 35 U.S.C. 154(b) by 564 days.

(21) Appl. No.: 18/170,413

(22) Filed: Feb. 16, 2023

(65) Prior Publication Data

US 2023/0278028 A1 Sep. 7, 2023

Related U.S. Application Data

(60) Provisional application No. 63/310,855, filed on Feb. 16, 2022, provisional application No. 63/310,755, filed on Feb. 16, 2022, provisional application No. 63/310,784, filed on Feb. 16, 2022.

(51) Int. Cl.

| | |
|---|---|
| ***G01N 21/05*** | (2006.01) |
| ***B01L 3/00*** | (2006.01) |

(52) U.S. Cl.

CPC ... *B01L 3/502707* (2013.01); *B01L 3/502715* (2013.01); *G01N 21/05* (2013.01); *G01N 2021/058* (2013.01)

(58) Field of Classification Search

CPC ......... B01L 3/502707; B01L 3/502715; G01N 21/05; G01N 2021/058

See application file for complete search history.

(56) References Cited

U.S. PATENT DOCUMENTS

| | | | | |
|---|---|---|---|---|
| 5,147,606 A * | 9/1992 | Charlton | B01L 3/502753 436/805 |
| 6,054,274 A * | 4/2000 | Sampson | C12Q 1/682 435/7.1 |
| 6,265,552 B1 | 7/2001 | Schatz | |
| 6,291,187 B1 | 9/2001 | Kingsmore et al. | |

(Continued)

FOREIGN PATENT DOCUMENTS

| | | | |
|---|---|---|---|
| EP | 4382474 A2 * | 6/2024 | B01L 3/502715 |
| EP | 3676010 B1 * | 7/2024 | B01L 3/502738 |

(Continued)

OTHER PUBLICATIONS

U.S. Appl. No. 17/345,809, Marcogliese et al.

(Continued)

*Primary Examiner* — Jamel E Williams

(74) *Attorney, Agent, or Firm* — Clark & Elbing LLP

(57) ABSTRACT

Flowcell devices configured for reversible assembly, and methods of assembly, disassembly, and use thereof are provided. The methods and devices allow the interior of the flowcell device to be accessed without damaging, or otherwise disturbing sensitive samples and surfaces.

16 Claims, 17 Drawing Sheets

(56) References Cited

U.S. PATENT DOCUMENTS

| | | | | |
|---|---|---|---|---|
| 6,323,009 | B1 * | 11/2001 | Lasken | C12Q 1/6844 435/91.1 |
| 6,344,329 | B1 * | 2/2002 | Lizardi | C12Q 1/6844 435/6.12 |
| 6,368,801 | B1 * | 4/2002 | Faruqi | C12Q 1/6844 435/6.12 |
| 6,391,937 | B1 | 5/2002 | Beuhler et al. | |
| 7,264,929 | B2 * | 9/2007 | Rothberg | C12Q 1/6869 435/5 |
| 8,551,710 | B2 * | 10/2013 | Bernitz | C12Q 1/6827 435/6.12 |
| 9,512,422 | B2 | 12/2016 | Barnard et al. | |
| 9,889,422 | B2 | 2/2018 | Smith et al. | |
| 10,011,872 | B1 * | 7/2018 | Belgrader | C12Q 1/683 |
| 10,323,278 | B2 * | 6/2019 | Belgrader | C12Q 1/6874 |
| 10,550,429 | B2 | 2/2020 | Harada et al. | |
| 2002/0039783 | A1 | 4/2002 | McMillan et al. | |
| 2002/0079219 | A1 | 6/2002 | Zhao et al. | |
| 2003/0203491 | A1 | 10/2003 | Andrevski et al. | |
| 2004/0072278 | A1 | 4/2004 | Chou et al. | |
| 2004/0126279 | A1 | 7/2004 | Renzi et al. | |
| 2005/0247673 | A1 | 11/2005 | Delamarche et al. | |
| 2007/0039866 | A1 | 2/2007 | Schroeder et al. | |
| 2007/0099290 | A1 | 5/2007 | Iida et al. | |
| 2010/0055733 | A1 | 3/2010 | Lutolf et al. | |
| 2010/0123457 | A1 | 5/2010 | Shinoda | |
| 2010/0133189 | A1 | 6/2010 | Maierhofer et al. | |
| 2010/0166612 | A1 | 7/2010 | Lehto | |
| 2010/0173394 | A1 | 7/2010 | Colston, Jr. et al. | |
| 2010/0234237 | A1 | 9/2010 | Yoo | |
| 2012/0091004 | A1 | 4/2012 | Abell et al. | |
| 2012/0126154 | A1 | 5/2012 | Den Dulk et al. | |
| 2012/0152369 | A1 | 6/2012 | Hiddessen et al. | |
| 2012/0192642 | A1 | 8/2012 | Speldrich et al. | |
| 2012/0301966 | A1 | 11/2012 | Hosokawa et al. | |
| 2013/0136858 | A1 | 5/2013 | Dutt et al. | |
| 2013/0287645 | A1 * | 10/2013 | Shaikh | B01L 3/5027 156/60 |
| 2014/0194311 | A1 | 7/2014 | Gullberg et al. | |
| 2014/0329269 | A1 | 11/2014 | Adey et al. | |
| 2015/0141261 | A1 | 5/2015 | Hunicke-Smith et al. | |
| 2016/0024555 | A1 | 1/2016 | Church et al. | |
| 2016/0108458 | A1 | 4/2016 | Frei et al. | |
| 2016/0153868 | A1 | 6/2016 | Nelson et al. | |
| 2016/0289669 | A1 | 10/2016 | Fan et al. | |
| 2017/0183616 | A1 * | 6/2017 | Thon | B01L 3/502715 |
| 2017/0219465 | A1 * | 8/2017 | Deisseroth | G01N 27/44743 |
| 2017/0253918 | A1 | 9/2017 | Kohman | |
| 2018/0052081 | A1 | 2/2018 | Kohman | |
| 2018/0147573 | A1 | 5/2018 | Hiddessen et al. | |
| 2018/0251833 | A1 | 9/2018 | Daugharthy et al. | |
| 2019/0055594 | A1 | 2/2019 | Samusik et al. | |
| 2019/0177800 | A1 | 6/2019 | Boutet et al. | |
| 2019/0323088 | A1 | 10/2019 | Boutet et al. | |
| 2019/0338353 | A1 | 11/2019 | Belgrader et al. | |
| 2019/0367969 | A1 | 12/2019 | Belhocine et al. | |
| 2020/0002763 | A1 | 1/2020 | Belgrader et al. | |
| 2020/0108389 | A1 | 4/2020 | Wheeler et al. | |
| 2020/0224243 | A1 | 7/2020 | Desai et al. | |
| 2020/0224244 | A1 | 7/2020 | Nilsson et al. | |
| 2020/0277663 | A1 | 9/2020 | Ramachandran Iyer et al. | |
| 2020/0291469 | A1 | 9/2020 | Almogy et al. | |
| 2023/0167489 | A1 | 6/2023 | Zhang et al. | |
| 2023/0184663 | A1 | 6/2023 | Xing et al. | |
| 2023/0264186 | A1 | 8/2023 | Lin et al. | |
| 2023/0271190 | A1 | 8/2023 | Marindra et al. | |
| 2023/0278028 | A1 | 9/2023 | Xing et al. | |
| 2023/0278031 | A1 | 9/2023 | Marcogliese et al. | |
| 2023/0324421 | A1 | 10/2023 | Zhang et al. | |
| 2023/0347312 | A1 | 11/2023 | Zhang et al. | |
| 2025/0091050 | A1 | 3/2025 | Beckett et al. | |

FOREIGN PATENT DOCUMENTS

| | | | | |
|---|---|---|---|---|
| JP | H04174361 | A | 6/1992 | |
| JP | 5497587 | B2 * | 5/2014 | B01L 3/502707 |
| WO | WO-2006/104467 | A1 | 10/2006 | |
| WO | WO-2008127269 | A2 * | 10/2008 | B01L 3/5027 |
| WO | WO-2014/163886 | A1 | 10/2014 | |
| WO | WO-2017/079406 | A1 | 5/2017 | |
| WO | WO-2019046690 | A1 * | 3/2019 | B01L 3/502715 |
| WO | WO-2019/157529 | A1 | 8/2019 | |
| WO | WO-2019/199579 | A1 | 10/2019 | |
| WO | WO-2020/176788 | A1 | 9/2020 | |
| WO | WO-2020/178562 | A1 | 9/2020 | |
| WO | WO-2023/168423 | A1 | 9/2023 | |

OTHER PUBLICATIONS

"EPlex® Blood Culture Identification Panels", GenMark Dx, F. Hoffmann-La Roche Ltd, retrieved on Jan. 13, 2024 (4 pages).

"FCS3 Chamber," Bioptechs,<https://bioptechs.com/product/fcs3-chamber/>, retrieved on Nov. 29, 2022 (13 pages).

"Micro Canvas Fully automated NGS sample prep", Integra Biosciences, (4 pages).

"The Laminar Wash HT1000 System", Flow Cytometry, Curiox, (2019) (2 pages).

Darhuber et al., "Thermocapillary Actuation of Droplets on Chemically Patterned Surfaces by Programmable Microheater Arrays", Journal of Microelectromechanical systems, 12(6): 873-879 (Dec. 2003) (7 pages).

Goyette et al., "Microfluidic multipoles theory and applications," Nat Commun. 10(1):1781. doi: 10.1038/s41467-019-09740-7 (2019) (10 pages).

Lovchik et al., "Vertical Microfluidic Probe Heads," 14th International Conference on Miniaturized Systems for Chemistry and Life Sciences. Oct. 3-7, 2010, 1793-5 (2010).

Safavieh et al., "Two-Aperture Microfluidic Probes as Flow Dipoles: Theory and Applications," Sci Rep. 5:11943. doi: 10.1038/srep11943 (2015) (16 pages).

VolTRAX V2B Technical Specification, Oxford Nanopore Technologies, Updated Apr. 24, 2024, (12 pages).

Xing et al., "Droplet-driven transports on superhydrophobic-patterned surface microfluidics", Lab Chip 11:3642 (2011).

Zhang et al., "Magnetic digital microfluidics—a review", Lab Chip 6(17): 994-1008, (2017) (15 pages).

Banér et al., "Signal amplification of padlock probes by rolling circle replication," Nucleic Acids Res. 26(22):5073-8 (1998).

Bolognesi et al., "Multiplex Staining by Sequential Immunostaining and Antibody Removal on Routine Tissue Sections," J Histochem Cytochem. 65(8):431-444 (2017).

Chen et al., "Expansion microscopy." available in PMC Jul. 30, 2015, published in final edited form as: Science. 347(6221):543-548 (2015) (13 pages).

Dean et al., "Rapid Amplification of Plasmid and Phage DNA Using Phi29 DNA Polymerase and Multiply-Primed Rolling Circle Amplification," Genome Res. 11(6):1095-9 (2001) (6 pages).

Fang et al., "Fluoride-Cleavable Biotinylation Phosphoramidite for 5'-end-Labeling and Affinity Purification of Synthetic Oligonucleotides," Nucleic Acids Res. 31(2):708-715 (2003).

Faruqi et al., "High-throughput genotyping of single nucleotide polymorphisms with rolling circle amplification," BMC Genomics. 2:4. doi: 10.1186/1471-2164-2-4 (2001) (10 pages).

Glass et al., "SIMPLE: a sequential immunoperoxidase labeling and erasing method" J Histochem Cytochem. 57(10):899-905 (2009).

Lin et al., "Highly multiplexed imaging of single cells using a high-throughput cyclic immunofluorescence method," Nat Commun. 2015; 6:8390 doi: 10.1038/ncomms9390 (2015) (7 pages).

Lizardi et al., "Mutation detection and single-molecule counting using isothermal rolling-circle amplification," Nat Genet. 19(3):225-32 (1998) (9 pages).

Moffitt et al., "RNA Imaging with Multiplexed Error Robust Fluorescence In Situ Hybridization." Methods Enzymol. 572:1-49 (2016) (42 pages).

(56) References Cited

OTHER PUBLICATIONS

Mohsen et al., "The Discovery of Rolling Circle Amplification and Rolling Circle Transcription," available in PMC Aug. 23, 2017, published in final edited form as: Acc Chem Res. 49(11):2540-50 (2016) (25 pages).

Nallur et al., "Signal amplification by rolling circle amplification on DNA microarrays," Nucl Acids Res. 29(23): E118. doi: 10.1093/nar/29.23.e118 (2001) (9 pages).

Pirici et al., "Antibody elution method for multiple immunohistochemistry on primary antibodies raised in the same species and of the same subtype," J Histochem Cytochem. 57(6):567-75 (2009).

Schweitzer et al., "Immunoassays with rolling circle DNA amplification: a versatile platform for ultrasensitive antigen detection," Proc Natl Acad Sci USA. 97(18):10113-9 (2000).

Schweitzer et al., "Multiplexed protein profiling on microarrays by rolling-circle amplification," available in PMC Apr. 22, 2010, published in final edited form as: Nat Biotechnol. 20(4):359-65 (2002) (17 pages).

Fahy et al., "Self-sustained Sequence Replication (3SR): An Isothermal Transcription-based Amplification System Alternative to PCR," PCR Methods Appl. 1(1):25-33 (Aug. 1991) (10 pages).

* cited by examiner

DEVICES AND METHODS FOR REVERSIBLE ASSEMBLY OF A FLOWCELL

BACKGROUND

Many biomedical applications rely on high-throughput assays of biological samples combined with one or more reagents using flow devices. For example, in both research and clinical applications, high-throughput assays using target-specific reagents for analyzing molecules present in a biological sample can provide information for various applications. These applications may require disassembly of the device, for example after running fluidic operations, to gain access to the sample (e.g., a tissue sample) or substrate layer in the interior of the device without disturbing them. New methods and devices that enable assembly and/or disassembly of the device would be beneficial.

SUMMARY

The present disclosure features devices configured for improved assembly and disassembly, and methods of assembly, disassembly, and use thereof.

In one aspect, the disclosure features a method for attaching a gasket by providing a fluidic interface layer and a gasket, where the fluidic interface layer includes one or more edges that define a first perimeter that defines a first shape and the gasket includes one or more edges that define a second perimeter that defines a second shape. The method further includes wrapping a first portion of the second perimeter of the gasket over a first portion of the one or more edges of the fluidic interface layer and attaching the first portion thereto.

In some embodiments, the method includes wrapping a second portion of the second perimeter over a second portion of the one or more edges of the fluidic interface layer and attaching the second portion thereto.

In some embodiments, the gasket includes silicone, fluorosilicone, FKM, FFKM, or COC elastomer. In some embodiments, the fluidic interface layer includes glass, polymer, plastic, or metal.

In some embodiments, the first and second shapes are circular, and a diameter of the second shape is greater than a diameter of the first shape. In some embodiments, the first and second shapes are rectangular; the first and second perimeters include a length and a width; and the length and/or width of the second perimeter is greater than the length or width of the first perimeter. In some embodiments, the first shape and second shape are different.

In some embodiments, the length and width of the second perimeter are greater than the length and width of the first perimeter and four portions of the second perimeter wrap over four portions of the first perimeter.

In some embodiments, the one or more portions of the gasket are bonded or mechanically fixed to the fluidic interface layer. In some embodiments, the gasket is reversibly attached to the fluidic interface layer. In some embodiments, the gasket is reversibly attached to a substrate layer.

In some embodiments, the fluidic interface layer includes an optically transparent portion. In some embodiments, the substrate layer includes an optically transparent portion.

In some embodiments, the fluidic interface layer includes an inlet and an outlet for liquids.

In some embodiments, the gasket includes a void defining a flow path, e.g., between the fluidic interface layer and the substrate layer.

In some embodiments, the method further includes piercing the gasket to provide fluid communication to the flow path.

In another aspect, the disclosure provides a device including a fluidic interface layer and a substrate layer; where the fluidic interface layer includes one or more edges that define a first perimeter that defines a first shape and a gasket including one or more edges that define a second perimeter that defines a second shape. A first portion of the second perimeter of the gasket is wrapped over a first portion of the one or more edges of the fluidic interface layer.

In some embodiments, a second portion of the perimeter of the second perimeter is wrapped over a second portion of the one or more edges of the fluidic interface layer.

In some embodiments, the gasket includes silicone, fluorosilicone, FKM, FFKM, or COC elastomer. In some embodiments, the fluidic interface layer includes glass, polymer, plastic, or metal.

In some embodiments, the first and second shapes are circular, and a diameter of the second shape is greater than a diameter of the first shape. In some embodiments, the first and second shapes are rectangular; the first and second perimeters include a length and a width; and the length and/or width of the second perimeter is greater than the length or width of the first perimeter. In some embodiments, the first shape and second shape are different.

In some embodiments, the length and width of the second perimeter are greater than the length and width of the first perimeter and four portions of the second perimeter are wrapped over four portions of the first perimeter.

In some embodiments, the gasket is reversibly attached to the fluidic interface layer and/or reversibly attached to the substrate layer. In some embodiments, the one or more portions of the gasket are bonded or mechanically fixed to the fluidic interface layer.

In some embodiments, the device includes one or more channels located between the gasket and the fluidic interface layer, and the channels are connected to the exterior of the device through vias or a pierceable seal.

In some embodiments, the one or more channels are recessed in the gasket. In some embodiments, the one or more channels are recessed in the fluidic interface layer.

In some embodiments, the gasket includes a void defining a flow path between the fluidic interface layer and the substrate layer.

In some embodiments, the gasket is pierceable.

In some embodiments, the fluidic interface layer and/or substrate layer include an array of bound reagents and/or an optically transparent portion.

In another aspect, the disclosure provides a method of assembling a device. The method includes providing a gasket-wrapped fluidic interface layer. The fluidic interface layer includes one or more edges that define a first perimeter that defines a first shape, and the gasket includes one or more edges that define a second perimeter that defines a second shape. A first portion of the second perimeter of the gasket is wrapped around a first portion of the one or more edges of the fluidic interface layer, and the first portion of the gasket is attached to the fluidic interface layer. The method further includes assembling the gasket-wrapped fluidic interface layer and a substrate layer into the device, where the gasket is disposed between the fluidic interface layer and the substrate layer and forms a fluid-tight seal therebetween. The device of the method includes one or more channels between the fluidic interface layer and the substrate layer in fluid communication with the exterior of the device.

In some embodiments, one of the one or more channels is recessed in the gasket. In some embodiments, one of the one or more channels is recessed in the fluidic interface layer.

In some embodiments, the method includes applying negative pressure to one of the one or more channels thereby attaching the gasket to the fluidic interface layer.

In some embodiments, the gasket reversibly attaches to the substrate layer.

In some embodiments, one of the one or more channels is accessed by piercing the gasket with a needle.

In some embodiments, a second portion of the second perimeter is wrapped over a second portion of the one or more edges of the fluidic interface layer and attached the second portion thereto.

In some embodiments, the first and second shapes are circular, and a diameter of the second shape is greater than a diameter of the first shape. In some embodiments, the first and second shapes are rectangular; the first and second perimeters include a length and a width; and the length and/or width of the second perimeter is greater than the length or width of the first perimeter. In some embodiments, the first shape and second shape are different.

In some embodiments, the length and width of the second perimeter are greater than the length and width of the first perimeter and four portions of the second perimeter are wrapped over four portions of the first perimeter.

In some embodiments, the one or more portions of the gasket are bonded or mechanically fixed to the fluidic interface layer. In some embodiments, the gasket is reversibly attached to a fluidic interface layer.

In some embodiments, the fluidic interface layer and/or substrate layer includes an optically transparent portion.

In another aspect, the disclosure features a method of assembling a device by providing a fluidic interface layer, a gasket, and a substrate layer; assembling the fluidic interface layer, gasket, and substrate layer into the device, where the gasket is disposed between the fluidic interface layer and the substrate layer, and forming a fluid-tight seal by applying negative pressure to the device, where the gasket includes one or more voids defining a flow path with the substrate layer, and where the gasket is removable from the substrate layer after assembly.

In some embodiments, negative pressure is applied to the substrate layer during assembly to seal with the gasket.

In some embodiments, adhesive is applied to the gasket and/or fluidic interface layer.

In some embodiments, the fluidic interface layer has one or more fluidic ports in fluid communication with the one or more voids.

In some embodiments, the fluidic interface layer or substrate layer includes glass, polymer, plastic, or metal.

In some embodiments, the gasket includes silicone rubber, fluorosilicone, FKM, FFKM, COC elastomer, one-sided adhesive film, double-sided adhesive film, a polymer coating, or a hydrophobic coating. In some embodiments, the gasket is from 10 μm to 3 mm thick.

In some embodiments, the fluidic interface layer has channels therein in fluid communication with the one or more voids in the gasket. In some embodiments, the fluidic interface layer includes a top layer and a bottom layer, where the top layer includes fluidic ports and the bottom layer includes the channels in fluid communication with the one or more voids in the gasket. In some embodiments, vacuum is applied to the channels during assembly to cause the fluidic interface layer, gasket, and substrate layer to seal.

In some embodiments, the gasket includes at least two voids and, during formation of the seal, negative pressure is applied to one of the at least two voids. In some embodiments, one or more of the one or more voids includes spacers. In some embodiments, the spacers are between the gasket and the fluidic interface layer.

In some embodiments, the disclosure further includes applying positive pressure to one or more of the voids in the gasket to separate the gasket from the fluidic interface layer and/or substrate layer.

In some embodiments, the gasket is integral with the fluidic interface layer.

In another aspect, the disclosure features a device including a gasket disposed between a fluidic interface layer and a substrate layer and forming a fluid-tight seal therebetween, where the gasket includes one or more voids defining a flow path with the substrate layer, where the contact between the gasket and the substrate layer is reversible, and the device is configured to be sealed by applying negative pressure.

In some embodiments, the gasket is sealed to the fluidic interface layer and substrate layer by applied negative pressure.

In some embodiments, two or more of the gasket, fluidic interface layer, and/or substrate layer are temporarily adhered by adhesive.

In some embodiments, the fluidic interface layer has one or more fluidic ports in fluid communication with the one or more voids.

In some embodiments, the fluidic interface layer or substrate layer includes glass, polymer, plastic, or metal.

In some embodiments, the gasket includes silicone rubber, fluorosilicone, FKM, FFKM, COC elastomer, one-sided adhesive film, double-sided adhesive film, a polymer coating, or a hydrophobic coating.

In some embodiments, the gasket is from 10 μm to 3 mm thick.

In some embodiments, the fluidic interface layer has channels therein in fluid communication with the one or more voids in the gasket.

In some embodiments, the fluidic interface layer includes a top layer and a bottom layer, where the top layer includes fluidic ports and the bottom layer includes the channels in fluid communication with the one or more voids in the gasket.

In some embodiments, one or more of the one or more voids includes spacers. In some embodiments, the spacers are between the gasket and the fluidic interface layer.

In some embodiments, the gasket includes at least two voids and the gasket seals to the substrate layer by negative pressure applied to one of the at least two voids.

The present disclosure further provides a method for reversibly assembling a device, e.g., a flowcell.

In another aspect, the disclosure provides a method of disassembling a device, e.g., a flowcell, by providing a device, e.g., a flowcell, including a substrate layer; a fluidic interface layer; a gasket therebetween; and a release fluid channel, wherein the gasket has a first void defining a flow path; applying a fluid to the release fluid channel; and separating the gasket from the substrate layer.

In some embodiments, the fluid pressurizes the release fluid channel and deforms the gasket to reduce surface area in contact with the substrate layer. In some embodiments, the fluid reduces the bonding between the gasket and the substrate layer.

In some embodiments, the release fluid channel includes a second void in the gasket. In some embodiments, the second void is in fluid communication with the substrate layer. In some embodiments, the second void is not in fluid communication with the substrate layer. In some embodiments, the release fluid channel is disposed between the gasket and the fluidic interface layer and defined by a bonded perimeter and an unbonded interior within.

In some embodiments, the fluid is selected from the group consisting of a gas, an alcohol, and water. In some embodiments, the substrate layer includes a sample within the flow path, and the method further includes flowing a second fluid to the sample in the flow path.

In some embodiments, the fluidic interface layer or gasket further includes a release fluid inlet in fluid communication with the release fluid channel through which the fluid is introduced.

In some embodiments, applying the fluid includes piercing the gasket.

In some embodiments, the fluidic interface layer further includes a reagent inlet and a reagent outlet in fluid communication with the flow path.

In some embodiments, the fluidic interface layer and/or substrate layer includes an array of bound reagents in the flow path.

In another aspect, the disclosure provides a device including: a substrate layer; a fluidic interface layer; a gasket disposed therebetween; and a release fluid channel; wherein the gasket has a first void defining a flow path.

In some embodiments, the gasket is deformable. In some embodiments, the gasket is pierceable.

In some embodiments, the fluidic interface layer or the gasket further includes a release fluid inlet in fluid communication with the release fluid channel.

In some embodiments, the release fluid channel is disposed between the gasket and the fluidic interface layer and defined by a bonded perimeter and an unbonded interior within.

In some embodiments, the release fluid channel is a second void in the gasket. In some embodiments, the second void is in fluid communication with the substrate layer. In some embodiments, the second void is not in fluid communication with the substrate layer.

In some embodiments, the gasket includes an elastomeric material, e.g., silicone, fluorosilicone, FKM, FFKM, or COC elastomer.

In some embodiments, the fluidic interface layer and/or substrate layer includes glass, polymer, plastic, or metal.

In some embodiments, the gasket is bonded to the fluidic interface layer with adhesive, plasma-activation, or solvent.

In some embodiments, the fluidic interface layer further includes a reagent inlet and a reagent outlet in fluid communication with the flow path. In some embodiments, the substrate layer includes a sample disposed thereon. In some embodiments, the fluidic interface layer and/or substrate layer includes an array of bound reagents.

The present disclosure further provides a device including: a fluidic interface layer having a top surface, a bottom surface, and at least one side surface; a substrate layer having a top surface, a bottom surface, and at least one side surface; and a gasket disposed between the bottom surface of the fluidic interface layer and the top surface of the substrate layer, wherein a first portion of the gasket is wrapped over the at least one side surface portion of the of the fluidic interface layer and at least a portion of the top surface of the fluidic interface layer.

In some embodiments, a second portion of the gasket (e.g., on a different edge of the gasket from the first portion) is wrapped over the at least one side surface of the fluidic interface layer (e.g., a second side surface different from the side surface over which the first portion of the gasket is wrapped) and at least a portion of the top surface of the fluidic interface layer (e.g., a second portion different from the portion over which the first portion of the gasket is wrapped).

In some embodiments, the gasket includes silicone, fluorosilicone, FKM, FFKM, or COC elastomer. In some embodiments, the fluidic interface layer includes glass, polymer, plastic, or metal.

In some embodiments, the gasket is reversibly attached to the fluidic interface layer and/or the substrate layer. In some embodiments, the one or more portions of the gasket are bonded or mechanically fixed to the fluidic interface layer.

In some embodiments, the device includes one or more channels, and the channels are connected to the exterior of the device through vias or a pierceable seal. In some embodiments, the one or more channels are within the gasket, e.g., recessed. In some embodiments, the one or more channels are formed within the fluidic interface layer, e.g., recessed.

In some embodiments, the gasket includes a void defining a flow path. In some embodiments, the gasket is pierceable. In some embodiments, the gasket has a thickness of about 10 μm to about 3 mm.

In some embodiments, the fluidic interface layer and/or substrate layer includes an optically transparent portion. In some embodiments, the fluidic interface layer and/or substrate layer includes an array of bound reagents.

The present disclosure further provides a method for attaching a gasket including: providing a fluidic interface layer having a top surface, a bottom surface, and at least one side surface; and a gasket; and wrapping a first portion of the gasket over the at least one side surface of the fluidic interface layer and at least a portion of the top surface of the fluidic interface layer; and attaching the first portion of the gasket thereto.

In some embodiments, the method further includes wrapping a second portion of the gasket over the at least one side surface of the fluidic interface layer and at least a portion of the top surface the fluidic interface layer and attaching the second portion thereto.

In some embodiments, the gasket includes silicone, fluorosilicone, FKM, FFKM, or COC elastomer. In some embodiments, the fluidic interface layer includes glass, polymer, plastic, or metal.

In some embodiments, the first portion of the gasket is bonded or mechanically fixed to the fluidic interface layer. In some embodiments, the gasket is reversibly attached to the fluidic interface layer.

In some embodiments, the fluidic interface layer includes an optically transparent portion.

In some embodiments, the method further includes providing a substrate layer, wherein the gasket is reversibly attached to the substrate layer.

In some embodiments, the fluidic interface layer includes an inlet and an outlet.

In some embodiments, the gasket includes a void defining a flow path.

In some embodiments, the method further includes piercing the gasket to provide fluid communication to the flow path.

In some embodiments, the substrate layer includes an optically transparent portion.

In some embodiments, the gasket has a thickness of about 10 μm to about 3 mm.

The present disclosure further provides a method of assembling a device: providing a gasket-wrapped fluidic interface layer including a fluidic interface layer including having a top surface, a bottom surface, and at least one side surface and a gasket. A first portion of the gasket is wrapped over the at least one side surface of the fluidic interface layer and at least a portion of the top surface of the fluidic interface layer, wherein the first portion of the gasket is attached to the fluidic interface layer. The method further includes assembling the gasket-wrapped fluidic interface layer and a substrate layer into the device, wherein the gasket is disposed between the fluidic interface layer and the substrate layer, and forming a fluid tight seal therebetween, wherein the device includes one or more channels in fluid communication with the exterior of the device.

In some embodiments, at least one of the one or more channels is formed within the gasket, e.g., recessed. In some embodiments, at least one of the one or more channels is formed within the fluidic interface layer, e.g., recessed.

In some embodiments, the method further includes applying negative pressure to at least one of the one or more channels thereby attaching the gasket to the fluidic interface layer.

In some embodiments, the gasket is reversibly attached to the substrate layer.

In some embodiments, at least one of the one or more channels is configured to be accessed by piercing the gasket.

In some embodiments, a second portion of the gasket is wrapped over the at least one side surface of the fluidic interface layer and at least a portion of the top surface of the fluidic interface layer and attached the second portion thereto.

In some embodiments, the first portion of the gasket is bonded or mechanically fixed to the fluidic interface layer. In some embodiments, the gasket is reversibly attached to the fluidic interface layer.

In some embodiments, the fluidic interface layer and/or substrate layer includes an optically transparent portion.

In some embodiments, the gasket has a thickness of about 10 μm to about 3 mm.

The present disclosure further provides a method for assembling a device including: providing a fluidic interface layer, a gasket, and a substrate layer; assembling the fluidic interface layer, gasket, and substrate layer into the device, wherein the gasket is disposed between the fluidic interface layer and the substrate layer, and forming a fluid tight seal by applying a negative pressure to the device, wherein the gasket includes one or more voids defining a flow path with the substrate layer, and wherein the gasket is removable from the substrate layer after assembly.

In some embodiments, forming the fluid tight seal includes applying negative pressure to the substrate layer to seal with the gasket.

In some embodiments, adhesive is applied to the gasket and/or fluidic interface layer.

In some embodiments, the fluidic interface layer has one or more fluidic ports in fluid communication with the one or more voids.

In some embodiments, the fluidic interface layer or substrate layer includes glass, polymer, plastic, or metal. In some embodiments, the gasket includes silicone rubber, fluorosilicone, FKM, FFKM, COC elastomer, one-sided adhesive film, double-sided adhesive film, a polymer coating, or a hydrophobic coating.

In some embodiments, the gasket has a thickness of about 10 μm to about 3 mm.

In some embodiments, the fluidic interface layer has one or more channels formed therein in fluid communication with the one or more voids in the gasket. In some embodiments, the fluidic interface layer includes a top layer and a bottom layer, wherein the top layer includes fluidic ports and the bottom layer includes the channels in fluid communication with the one or more voids in the gasket.

In some embodiments, forming the fluid tight seal includes applying a vacuum to the channels to cause the fluidic interface layer, gasket, and substrate layer to seal. In some embodiments, the gasket includes at least two voids and wherein the negative pressure is applied to one of the at least two voids.

In some embodiments, at least one of the one or more voids includes one or more spacers. In some embodiments, the one or more spacers are disposed between the gasket and the fluidic interface layer.

In some embodiments, the method further includes applying positive pressure to the one or more voids in the gasket to thereby separate the gasket from the fluidic interface layer and/or substrate layer.

In some embodiments, the gasket is integrally formed with the fluidic interface layer.

The present disclosure further provides a device including a gasket disposed between a fluidic interface layer and a substrate layer, and forming a fluid-tight seal therebetween, wherein the gasket includes one or more voids defining a flow path with the substrate layer, wherein the contact between the gasket and the substrate layer is reversible, and wherein the device is configured to be sealed by applying negative pressure.

In some embodiments, the gasket is configured to seal to the fluidic interface layer and substrate layer by applied negative pressure. In some embodiments, the gasket, fluidic interface layer, and/or substrate layer are temporarily adhered to one another by an adhesive.

In some embodiments, the fluidic interface layer has one or more fluidic ports in fluid communication with the one or more voids.

In some embodiments, the fluidic interface layer or substrate layer includes glass, polymer, plastic, or metal. In some embodiments, the gasket includes silicone rubber, fluorosilicone, FKM, FFKM, COC elastomer, one-sided adhesive film, double-sided adhesive film, a polymer coating, or a hydrophobic coating.

In some embodiments, the gasket includes a thickness of about 10 μm to about 3 mm.

In some embodiments, the fluidic interface layer has one or more channels formed therein in fluid communication with the one or more voids in the gasket. In some embodiments, the fluidic interface layer includes a top layer and a bottom layer, the top layer includes fluidic ports, and the bottom layer includes the one or more channels in fluid communication with the one or more voids in the gasket.

In some embodiments, at least one of the one or more voids includes one or more spacers. In some embodiments, the one or more spacers are disposed between the gasket and the fluidic interface layer.

In some embodiments, the gasket includes at least two voids, and the gasket is configured to seal to the substrate layer by applying negative pressure to at least one of the at least two voids.

The present disclosure further provides a method for disassembling a flowcell including: providing a flowcell including: a substrate layer; a fluidic interface layer; a gasket therebetween; and a release fluid channel, wherein the gasket has a first void defining a flow path; providing a fluid to the release fluid channel; and separating the gasket from the substrate layer.

In some embodiments, providing the fluid pressurizes the release fluid channel and deforms the gasket to reduce surface area in contact with the substrate layer.

In some embodiments, providing the fluid reduces the bonding between the gasket and the substrate layer.

In some embodiments, the release fluid channel is a second void in the gasket. In some embodiments, the second void is in fluid communication with the substrate layer. In some embodiments, the second void is not in fluid communication with the substrate layer.

In some embodiments, the release fluid channel is defined by a bonded perimeter and an unbonded interior, e.g., disposed within the gasket and within the fluidic interface layer and.

In some embodiments, the fluid is selected from the group consisting of a gas, an alcohol, and water.

In some embodiments, the substrate layer includes a sample within the flow path and the method further includes flowing a second fluid to the sample in the flow path.

In some embodiments, the fluidic interface layer or the gasket further includes a release fluid inlet in fluid communication with the release fluid channel through which the fluid is introduced.

In some embodiments, providing the fluid includes piercing the gasket.

In some embodiments, the fluidic interface layer further includes a reagent inlet and a reagent outlet in fluid communication with the flow path. In some embodiments, the fluidic interface layer and/or the substrate layer includes an array of bound reagents in the flow path.

BRIEF DESCRIPTION OF THE DRAWINGS

FIG. 8B shows substrate layer 910, fluidic interface layer 920 including a plurality of fluidic ports 951, and gasket 930 as shown in FIG. 8A assembled together to form device 900 having a flow path.

FIG. 9 shows gasket 1030 including gasket void 1031. Reducing the total contact area of the gasket may allow for easier disassembly of the device.

FIG. 10 further shows a fluidic manifold having a plurality of fluidic ports 1151 for fluidic connection to fluidic interface layer 1120.

FIG. 13 shows fluidic interface layer 1420 having top fluidic interface layer 1423 and bottom fluidic interface layer 1424. Top fluidic interface layer 1423 includes a plurality of fluidic interface layer ports 1421. Bottom fluidic interface layer 1424 includes a plurality of fluidic interface layer ports 1421 and a plurality of recessed fluidic interface layer channels 1422. Fluidic interface layer ports 1421 in the top fluidic interface layer 1423 are in fluid communication with the fluidic interface layer ports 1421 in the bottom fluidic interface layer 1424 via the recessed fluidic interface layer channels 1422 of the bottom fluidic interface layer 1424.

FIG. 17 shows gasket 1830 having a plurality of gasket voids 1831, vacuum channel 1860, and hollow areas 1862. When vacuum is applied to a device having gasket 1830, these hollow areas 1862 seal to the substrate layer and fluidic interface layer.

FIG. 19D shows device 1900 having substrate layer 1910, fluidic interface layer 1920, and gasket 1930 therebetween. Gasket 1930 is attached to fluidic interface layer 1920 by bonded perimeters 1972. Unbonded interior 1973 forms release fluid channel 1970.

FIG. 19C shows device 1900 having substrate layer 1910, fluidic interface layer 1920, and gasket 1930 therebetween. Gasket 1930 is attached to fluidic interface layer 1920 by bonded perimeters 1972. Unbonded interior 1973 forms release fluid channel 1970 which is shown in a deformed state.

DETAILED DESCRIPTION

Figure 1:
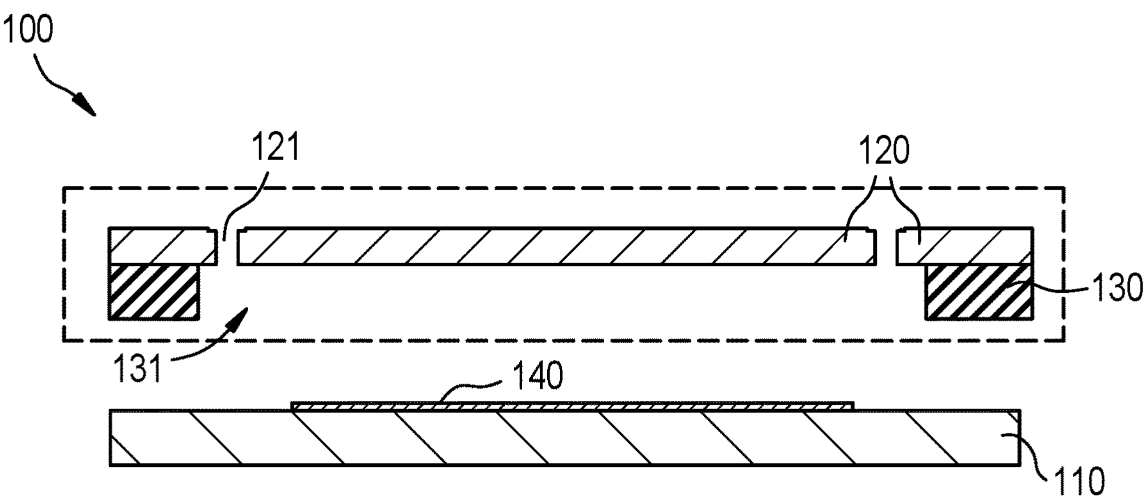
FIG. 1 illustrates an embodiment of a device in which a fluidic interface layer and gasket are temporarily fixed and can reversibly seal to a substrate layer having a sensitive surface that will not contact the gasket or fluidic interface layer. In particular, device 100 of FIG. 1 includes substrate layer 110 having sensitive surface 140 thereon, and fluidic interface layer 120 having a plurality of fluidic interface layer ports 121 therein temporarily fixed to gasket 130 having gasket void 131. Gasket 130 can reversibly seal to substrate layer 110 without contacting sensitive surface 140.

The present invention features devices, e.g., sealed flowcells, configured for improved assembly and disassembly, and methods of assembly, disassembly, and use thereof. A user may wish to gain access to the sample, substrate surface, or other components in the interior of a device, e.g., a flowcell. The methods and devices allow the interior of the device to be accessed without damaging, or otherwise disturbing sensitive samples and surfaces.

Definitions

To facilitate the understanding of this disclosure, a number of terms are defined below. Terms defined herein have meanings as commonly understood by a person of ordinary skill in the areas relevant to the disclosure. Terms such as "a", "an," and "the" are not intended to refer to only a singular entity, but include the general class of which a specific example may be used for illustration. The terminology herein is used to describe specific embodiments of the disclosure, but their usage does not limit the disclosure, except as outlined in the claims.

Where values are described as ranges, it will be understood that such disclosure includes the disclosure of all possible sub-ranges within such ranges, as well as specific numerical values that fall within such ranges irrespective of whether a specific numerical value or specific sub-range is expressly stated.

The term "about," as used herein, refers to ±10% of a recited value.

As used herein, any values provided in a range of values include both the upper and lower bounds, and any values contained within the upper and lower bounds.

The term "biological particle," as used herein, generally refers to a discrete biological system derived from a biological sample. The biological particle may be a virus. The biological particle may be a cell or derivative of a cell. The biological particle may be an organelle from a cell. Examples of an organelle from a cell include, without limitation, a nucleus, endoplasmic reticulum, a mitochondrion, a ribosome, a Golgi apparatus, an endoplasmic reticulum, a chloroplast, an endocytic vesicle, an exocytic vesicle, a vacuole, and a lysosome. The biological particle may be a rare cell from a population of cells. The biological particle may be any type of cell, including without limitation prokaryotic cells, eukaryotic cells, bacterial, fungal, plant, mammalian, or other animal cell type, mycoplasmas, normal tissue cells, tumor cells, or any other cell type, whether derived from single cell or multicellular organisms. The biological particle may be a constituent of a cell. The biological particle may be or may include DNA, RNA, organelles, proteins, or any combination thereof. The biological particle may be or may include a matrix (e.g., a gel or polymer matrix) including a cell or one or more constituents from a cell (e.g., cell bead), such as DNA, RNA, organelles, proteins, or any combination thereof, from the cell. The biological particle may be obtained from a tissue of a subject. The biological particle may be a hardened cell. Such hardened cell may or may not include a cell wall or cell membrane. The biological particle may include one or more constituents of a cell but may not include other constituents of the cell. An example of such constituents is a nucleus or an organelle. A cell may be a live cell. The live cell may be capable of being cultured, for example, being cultured when enclosed in a gel or polymer matrix or cultured when including a gel or polymer matrix.

The term "fluidically connected", as used herein, refers to a direct connection between at least two device elements, e.g., a channel, reservoir, etc., that allows for fluid to move between such device elements without passing through an intervening element.

The term "genome," as used herein, generally refers to genomic information from a subject, which may be, for example, at least a portion or an entirety of a subject's hereditary information. A genome can be encoded either in DNA or in RNA. A genome can include coding regions that code for proteins as well as non-coding regions. A genome can include the sequence of all chromosomes together in an organism.

For example, the human genome has a total of 46 chromosomes. The sequence of all of these together may constitute a human genome.

The term "in fluid communication with", as used herein, refers to a connection between at least two device elements, e.g., a channel, reservoir, etc., that allows for fluid to move between such device elements with or without passing through one or more intervening device elements.

The term "macromolecular constituent," as used herein, generally refers to a macromolecule contained within or from a biological particle. The macromolecular constituent may include a nucleic acid. In some cases, the biological particle may be a macromolecule. The macromolecular constituent may include DNA or a DNA molecule. The macromolecular constituent may include RNA or an RNA molecule. The RNA may be coding or non-coding. The RNA may be messenger RNA (mRNA), ribosomal RNA (rRNA) or transfer RNA (tRNA), for example. The RNA may be a transcript. The RNA molecule may be (i) a clustered regularly interspaced short palindromic (CRISPR) RNA molecule (crRNA) or (ii) a single guide RNA (sgRNA) molecule. The RNA may be small RNA that are less than 200 nucleic acid bases in length, or large RNA that are greater than 200 nucleic acid bases in length. Small RNAs may include 5.8S ribosomal RNA (rRNA), 5S rRNA, transfer RNA (tRNA), microRNA (miRNA), small interfering RNA (siRNA), small nucleolar RNA (snoRNAs), Piwi-interacting RNA (piRNA), tRNA-derived small RNA (tsRNA) and small rDNA-derived RNA (srRNA). The RNA may be double-stranded RNA or single-stranded RNA. The RNA may be circular RNA. The macromolecular constituent may include a protein. The macromolecular constituent may include a peptide. The macromolecular constituent may include a polypeptide or a protein. The polypeptide or protein may be an extracellular or an intracellular polypeptide or protein. The macromolecular constituent may also include a metabolite. These and other suitable macromolecular constituents (also referred to as analytes) will be appreciated by those skilled in the art (see U.S. Pat. Nos. 10,011,872 and 10,323,278, and PCT Publication No. WO 2019/157529, each of which is incorporated herein by reference in its entirety).

The term "particulate component of a cell" refers to a discrete biological system derived from a cell or fragment thereof and having at least one dimension of 0.01 μm (e.g., at least 0.01 μm, at least 0.1 μm, at least 1 μm, at least 10 μm, or at least 100 μm). A particulate component of a cell may be, for example, an organelle, such as a nucleus, an exosome, a liposome, an endoplasmic reticulum (e.g., rough or smooth), a ribosome, a Golgi apparatus, a chloroplast, an endocytic vesicle, an exocytic vesicle, a vacuole, a lysosome, or a mitochondrion.

The terms "sample," "tissue sample," and "biological tissue sample" as used herein, refers to material from a subject, such as a biopsy, core biopsy, tissue section, needle aspirate, or fine needle aspirate or skin sample. The biological tissue sample may be derived from another sample. The biological sample may be a nucleic acid sample or protein sample. The sample may be a liquid sample, such as a blood sample, urine sample, or saliva sample. The sample may be a skin sample. The sample may be a cheek swap. The sample may be a plasma or serum sample. The sample may include a biological particle, e.g., a cell or virus, or a population thereof, or it may alternatively be free of biological particles. A cell-free sample may include polynucleotides. Polynucleotides may be isolated from a bodily sample that may be selected from the group consisting of blood, plasma, serum, urine, saliva, mucosal excretions, sputum, stool, and tears.

The term "sequencing," as used herein, generally refers to methods and technologies for determining the sequence of nucleotide bases in one or more polynucleotides. The polynucleotides can be, for example, nucleic acid molecules such as deoxyribonucleic acid (DNA) or ribonucleic acid (RNA), including variants or derivatives thereof (e.g., single stranded DNA). Sequencing can be performed by various systems currently available, such as, without limitation, a sequencing system by ILLUMINA®, Pacific Biosciences (PACBIO®), Oxford NANOPORE®, or Life Technologies (ION TORRENT®). Alternatively, or in addition, sequencing may be performed using nucleic acid amplification, polymerase chain reaction (PCR) (e.g., digital PCR, quantitative PCR, or real time PCR), or isothermal amplification. Such systems may provide a plurality of raw genetic data corresponding to the genetic information of a subject (e.g., human), as generated by the systems from a sample provided by the subject. In some examples, such systems provide sequencing reads (also "reads" herein). A read may include a string of nucleic acid bases corresponding to a sequence of a nucleic acid molecule that has been sequenced. In some situations, systems and methods provided herein may be used with proteomic information.

The term "subject," as used herein, generally refers to an animal, such as a mammal (e.g., human) or avian (e.g., bird), or other organism, such as a plant. The subject can be a vertebrate, a mammal, a mouse, a primate, a simian or a human. Animals may include, but are not limited to, farm animals, sport animals, and pets. A subject can be a healthy or asymptomatic individual, an individual that has or is suspected of having a disease (e.g., cancer) or a predisposition to the disease, or an individual that is in need of therapy or suspected of needing therapy. A subject can be a patient.

The term "via," as used herein, generally refers to an orifice or channel extending through at least a portion of a device layer.

Devices

Provided herein are devices which may be used for chemical and biological preparation, processing, and/or analysis of one or more samples that utilize flow contained in a structure. The devices of the disclosure include a fluidic interface layer and a gasket, e.g., a gasket positioned between a fluidic interface layer and a substrate layer (see, e.g., FIG. 1).

In some embodiments, the fluidic interface layer has one or more edges that define a perimeter that defines a shape. The gasket has one or more edges that define a perimeter that defines a shape, one or more portions of which extend beyond the perimeter of the fluidic interface layer (e.g., when the fluidic interface layer and gasket are aligned for assembly). The one or more portions of the gasket can be wrapped around one or more portions of the edges of the fluidic interface layer. Portions of the gasket that are wrapped around an edge of the fluidic interface layer may be attached thereto.

In some embodiments, the fluidic interface layer has a top surface, a bottom surface, and at least one side surface. One or more portions of a gasket can be wrapped over the at least one side surface portion of the of the fluidic interface layer and at least a portion of the top surface of the fluidic interface layer. Portions of the gasket that are wrapped over the fluidic interface layer may be attached thereto.

The gasket may be reversibly attached, fixedly attached, or integral to the fluidic interface layer. The gasket may be adhered to the fluidic interface layer through, for example, chemical means (e.g., adhesive) and/or physical means (e.g., conformal contact or mechanical or vacuum pressure). In some embodiments, chemical adhesive may be applied to the gasket, fluidic interface layer, and/or substrate layer (discussed below) to reversibly adhere two or more of the layers together. In some embodiments, the gasket may be reversibly attached to the substrate layer. In some embodiments, the physical means includes wrapping a portion of a gasket that has a greater length than the fluidic interface layer around the edges of the fluidic interface layer (see, e.g., FIG. 4 which shows gasket 430 wrapped around two edges of fluidic interface layer 420). The ends may then be attached, e.g., bonded (e.g., conformally, thermally, by adhesive, etc.), or mechanically fixed to the fluidic interface layer by any means (e.g., hook and eye, clamp, snap, or post with corresponding recess).

In some embodiments, the gasket is wider than the fluidic interface layer, and the gasket may have more than two (e.g., 3 or 4) portions to wrap around or over the edges of the fluidic interface layer. In some embodiments, the gasket is wider than the fluidic interface device, and the gasket may have more than two (e.g., 3 or 4) portions to wrap around or over side surface and/or top surfaces of the fluidic interface layer. Gaskets and fluidic interface layers may have one or more edges or side surfaces which define a perimeter of any suitable shape, e.g., a regular polygon (e.g., square), irregular polygon (e.g., rectangle), or a plane curve, e.g., a conic section (e.g., circle or ellipse), ovoid (e.g., a hippopede), etc. In some embodiments, the gasket may be wider, but not longer, than the fluidic interface layer. The shape of a fluidic interface layer or gasket may be substantially polygonal (e.g., rectangular) but include one or more curved edges and/or curves in place of vertices. A polygonal perimeter, e.g., in a gasket, may include at least one reflex interior angle. The fluidic interface layer and gasket may be the same shape (e.g., both rectangular or both circular) or different shapes (e.g., a circular fluidic interface and rectangular (or substantially rectangular) gasket, or vice versa). Typically, at least one cross-sectional dimension of the gasket is longer than a corresponding cross-sectional dimension of the fluidic interface layer, e.g., the gasket may be of greater length, width, diameter, etc. Alternatively, the gasket is offset from the fluidic interface layer in a manner that allows wrapping portions of the gasket around the fluidic interface layer. The portions of the gasket that are wrapped may be extensions or flaps, e.g., flaps extending from a rectangle to create a T or cross shape. The wrapped portions may or may not extend the entire dimension of an edge (e.g., the entire length or width of a rectangular fluidic interface layer), and multiple portions may wrap over the same edge (e.g., one side of a rectangular fluidic interface layer).

Figure 3:
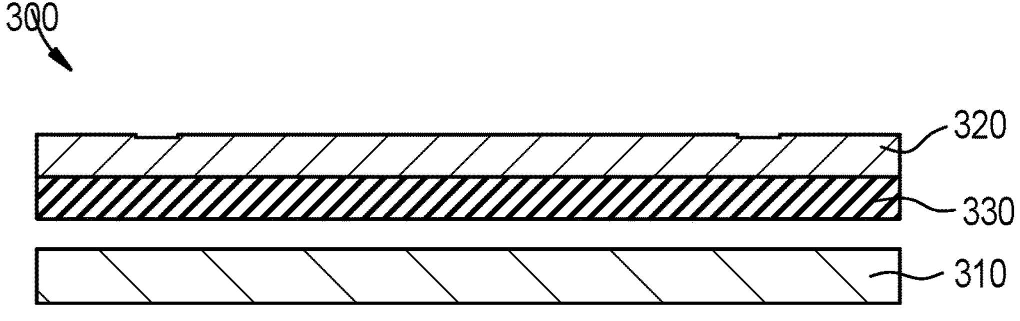
FIG. 3 illustrates an embodiment of a device in which a layer including a flow path, or fluidic channel (e.g., having a fluidic interface layer and gasket with voids that together make a channel), can reversibly seal to a substrate layer. In particular, device 300 of FIG. 3 includes a flow path formed from substrate layer 310, fluidic interface layer 320, and gasket 330.

The gasket and fluidic interface layer may then be coupled to (e.g., adhered to) a substrate layer (see, e.g., fluidic interface layer 320 and gasket 33 reversibly attached to substrate layer 310 in FIG. 3). The devices have one or more channels between the fluidic interface layer and the substrate layer.

Figure 12:
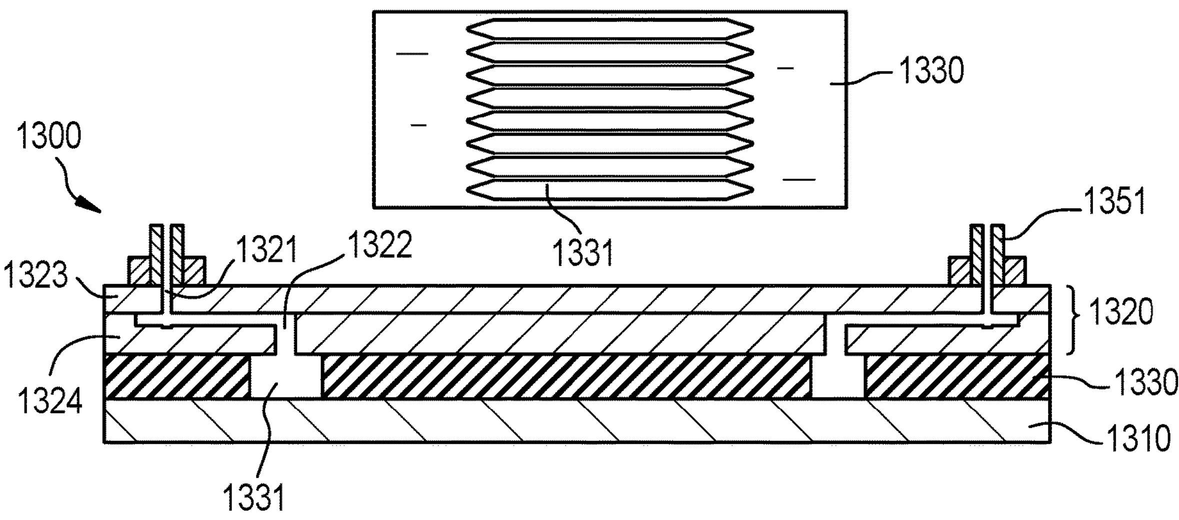
FIG. 12 illustrates an embodiment of a device in which the gasket includes voids for flow paths or fluidic channels, a substrate layer, and a fluidic interface layer. In particular, device 1300 of FIG. 12 includes substrate layer 1310, fluidic interface layer 1320, and gasket 1330 having a plurality of gasket voids 1331. Fluidic interface layer 1320 includes top fluidic interface layer 1323, or top layer, and a bottom fluidic interface layer 1324, or a bottom layer. The bottom fluidic interface layer 1324 has recessed fluidic interface channel 1322 (e.g., microfluidic channels) etched into it. Top fluidic interface layer 1323 includes a plurality of fluidic interface layer ports fluidic ports 1321, e.g., to interface with an external fluidic network.
Figure 19A:
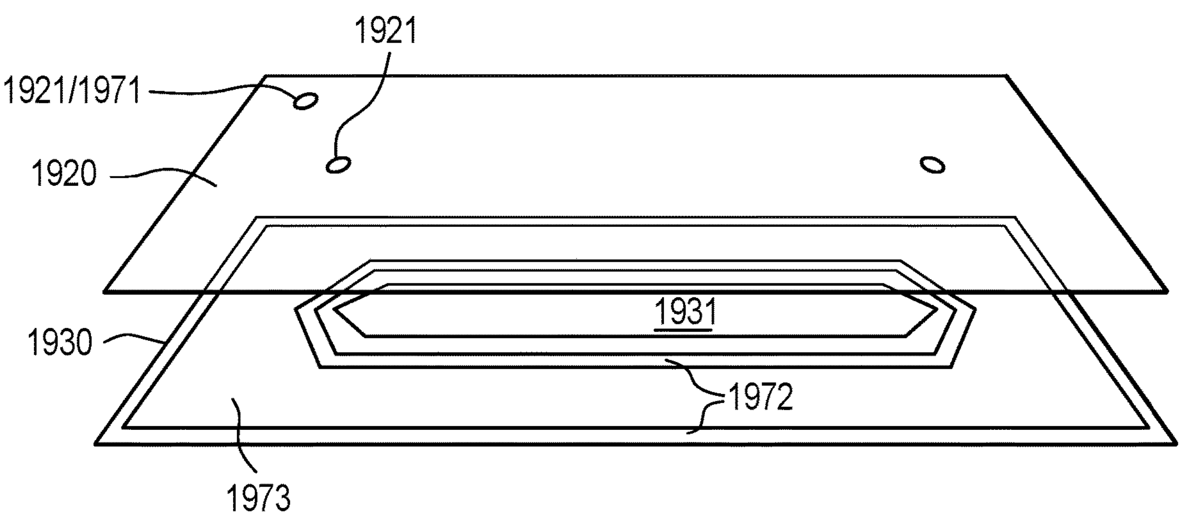
FIG. 19A illustrates an embodiment of a fluidic interface layer and an embodiment of a gasket. In particular, fluidic interface layer 1920 of FIG. 19A includes a plurality of fluidic interface layer ports 1921 (e.g., defining release fluid inlet 1971, a reagent inlet, and a reagent outlet) and gasket 1930 having gasket void 1931. The release fluid channel 1970 is disposed between gasket 1930 and fluidic interface layer 1920 and is defined by bonded perimeter 1972 and unbonded interior 1973 within.

In some embodiments, the gasket has one or more voids (see, e.g., FIG. 12 and FIG. 19A). Together with the substrate layer and fluidic interface layer, the voids in the gasket may define a flow path between the substrate layer and fluidic interface layer (see, e.g., FIG. 19D). A void may define a flow path between the gasket and the fluidic interface layer or the gasket and the substrate layer. In some embodiments, the gasket has from 1 to 50 voids (e.g., 1 to 2, 1 to 3, 1 to 4, 1 to 5, 1 to 10, 1 to 15, 1 to 20, 1 to 25, 1 to 30, 1 to 35, 1 to 40, 1 to 50, 2 to 3, 2 to 4, 2 to 5, 2 to 6, 2 to 8, 2 to 10, 3 to 4, 3 to 5, 4 to 6, 4 to 10, 5 to 10, 6 to 12, 10 to 15, 10 to 20, 10 to 25, 15 to 25, 20 to 30, 25 to 50, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50).

Figure 5:
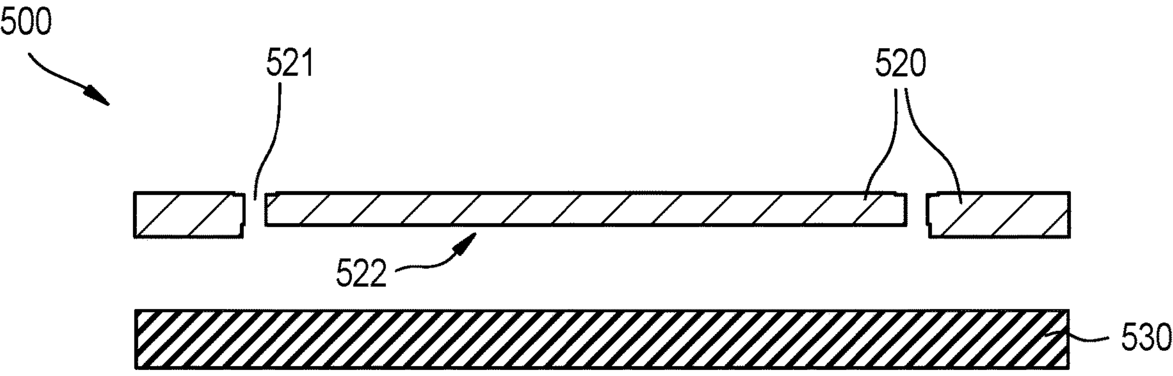
FIG. 5 illustrates embodiments of devices in which flow paths include channels that are recessed in the gasket or fluidic interface layer (e.g., molded channels) and sealed by contact between the fluidic interface layer and gasket. In particular, device 500 of FIG. 5 includes fluidic interface 520 having a plurality of fluidic interface layer ports 521 and recessed fluidic interface layer channel 522, as well as gasket 530. Device 600 of FIG. 5 includes fluidic interface layer 620 having a plurality of fluidic interface layer ports 621, as well as gasket 630 having recessed gasket channel 622.
Figure 5:
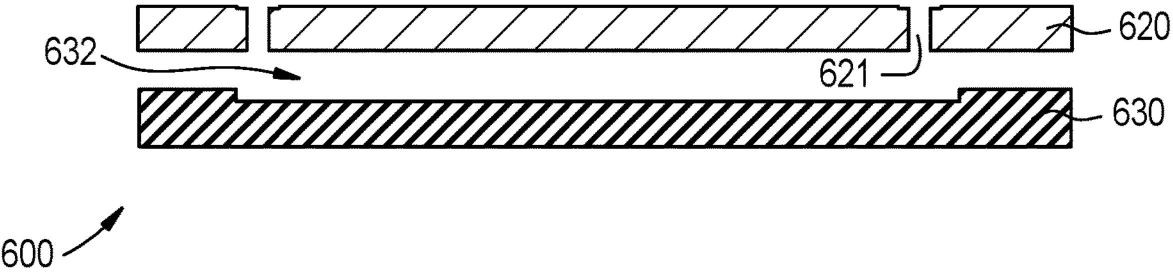
Figure 15:
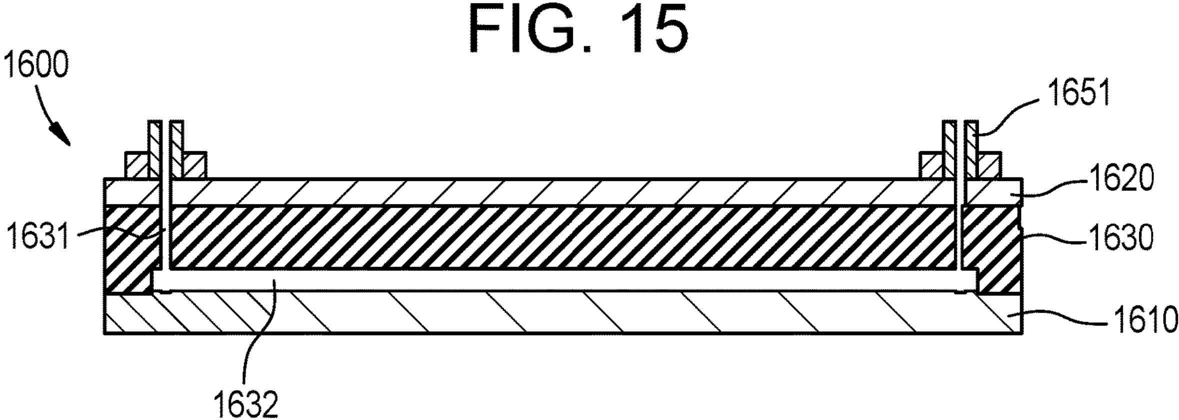
FIG. 15 illustrates an embodiment of a device in which flow paths include channels that are recessed in the gasket (e.g., molded channels) and sealed by the substrate layer. In particular, device 1600 of FIG. includes substrate layer 1610, fluidic interface layer 1620 having a plurality of fluidic interface ports 1651, and a gasket 1630 including a voids 1631 and a recessed gasket channel 1632. Gasket voids 1631 in gasket 1630 connect fluidic ports 1651 in the fluidic interface layer 1620 with recessed gasket channels 1632 in the gasket 1630.
Figure 16:
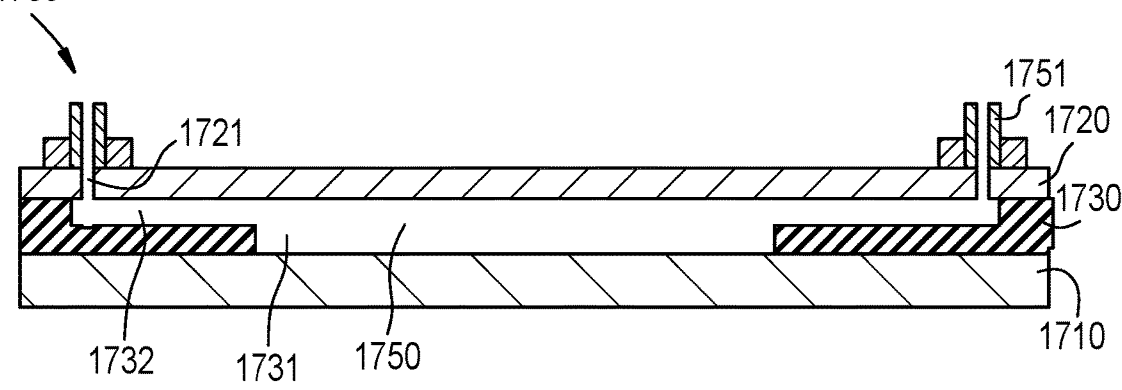
FIG. 16 illustrates an embodiment of a device in which channels are recessed in the gasket and sealed by the fluidic interface layer. In particular, device 1700 of FIG. 16 includes substrate layer 1710, fluidic interface layer 1720 having fluidic interface layer ports 1751, and gasket 1730 having recessed gasket channel 1732.

In some embodiments, the void forms one or more channels (e.g., recessed channels, see, e.g., recessed gasket channel 632 of FIG. 5) that define a flow path with the substrate layer and/or fluidic interface layer. Together with the substrate layer and/or fluidic interface layer, the channels in the gasket may define a flow path between the substrate layer and/or the fluidic interface layer (see, e.g., recessed gasket channel 1632 of FIG. 15 or recessed gasket channel 1732 of FIG. 16). As shown in FIG. 15, the recessed gasket channel may be on the substrate layer side of the gasket. As shown in FIG. 16, the recessed gasket channel may be on the fluidic interface layer side of the gasket. In some embodiments, the gasket has from 1 to 50 recessed channels (e.g., 1 to 2, 1 to 3, 1 to 4, 1 to 5, 1 to 10, 1 to 15, 1 to 20, 1 to 25, 1 to 30, 1 to 35, 1 to 40, 1 to 50, 2 to 3, 2 to 4, 2 to 5, 2 to 6, 2 to 8, 2 to 10, 3 to 4, 3 to 5, 4 to 6, 4 to 10, 5 to 10, 6 to 12, 10 to 15, 10 to 20, 10 to 25, 15 to 25, 20 to 30, 25 to 50, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50).

The fluidic interface layer may have channels (e.g., recessed channels) that are in fluid communication with the flow path in the gasket. Alternatively or in addition, the fluidic interface layer may include channels (e.g., recessed channels) that define a flow path with the gasket (see, e.g., recessed fluidic interface layer channel 522 of FIG. 5 or recessed fluidic interface layer channel 1522 of FIG. 14), e.g., to provide fluid flow paths having variations in depths, multiple levels, a vacuum channel, etc. In some embodiments, the fluidic interface layer has from 1 to 50 recessed channels (e.g., 1 to 2, 1 to 3, 1 to 4, 1 to 5, 1 to 10, 1 to 15, 1 to 20, 1 to 25, 1 to 30, 1 to 35, 1 to 40, 1 to 50, 2 to 3, 2 to 4, 2 to 5, 2 to 6, 2 to 8, 2 to 10, 3 to 4, 3 to 5, 4 to 6, 4 to 10, 5 to 10, 6 to 12, 10 to 15, 10 to 20, 10 to 25, 15 to 25, 20 to 30, 25 to 50, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50).

Figure 7:
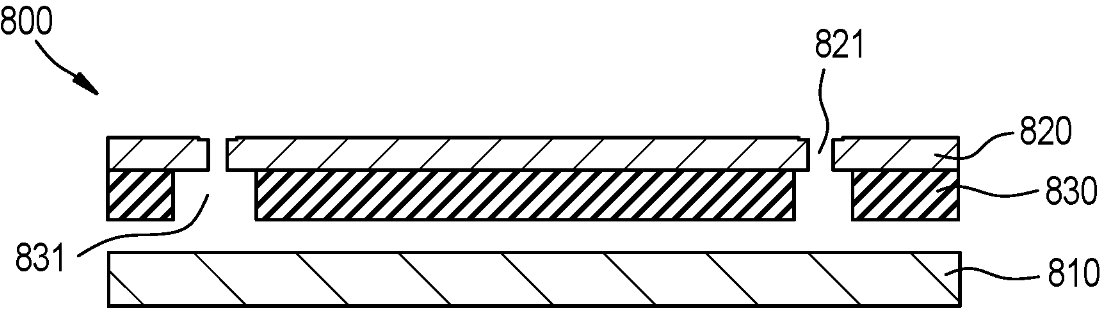
FIG. 7 illustrates an embodiment of a device in which the fluidic interface layer has inlets and/or outlets (e.g., fluidic ports) for liquids in fluid communication with the one or more voids in the gasket. In particular, device 800 of FIG. 7 includes substrate layer 810, fluidic interface layer 820 having a plurality of fluidic interface layer ports 821, and gasket 830 having a plurality of gasket voids 831. In device 800, fluidic interface ports 821 are aligned with gasket voids 831.
Figure 11:
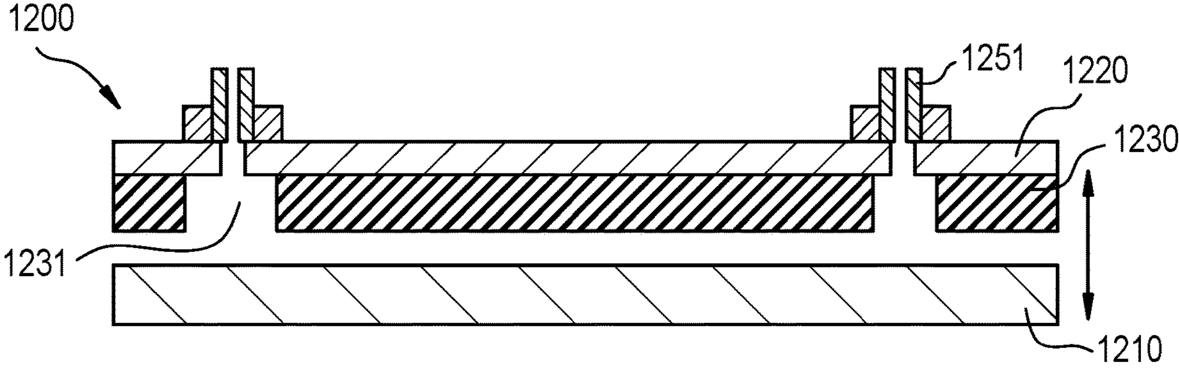
FIG. 11 illustrates an embodiment of a device in which the gasket includes voids to define flow paths, or fluidic channels, when assembled with a substrate layer and/or a fluidic interface layer, and the fluidic interface layer includes fluidic ports. In particular, device 1200 of FIG. 11 includes substrate layer 1210, fluidic interface layer 1220 having fluidic interface layer ports 1251, and gasket 1230 having gasket void 1231.
Figure 14:
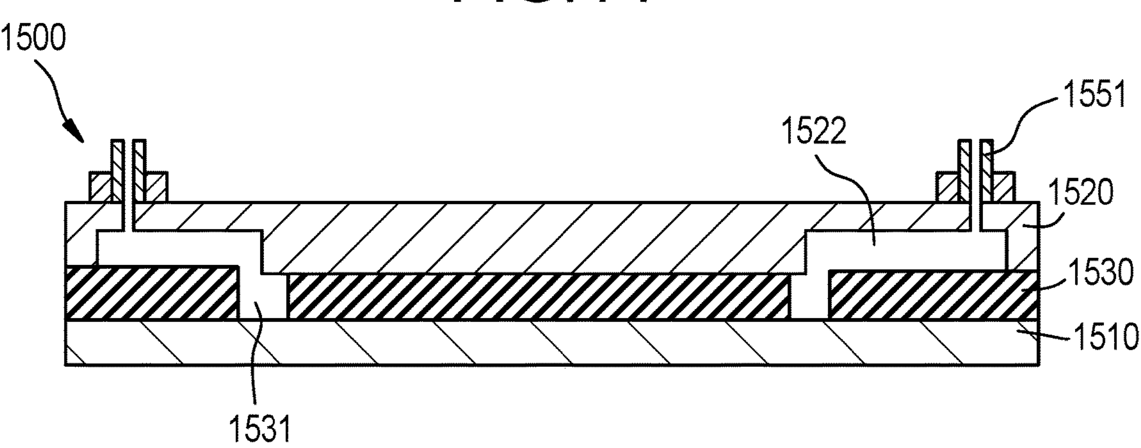
FIG. 14 illustrates an embodiment of a device in which the flow paths are defined by recessed channels etched in the fluidic interface layer and voids in the gasket, where the recessed channels are sealed by the gasket. In particular, device 1500 of FIG. 14 shows a substrate layer 1510, fluidic interface layer 1520 having a plurality of recessed fluidic interface layer channels 1522 in fluidic contact with fluidic ports 1551, and gasket 1530 having a plurality of gasket voids 1531. Recessed fluidic interface layer channels 1522 form a flow channel together with gasket voids 1531.

FIGS. 7, 11, 14, 15, and 16 variously show combinations of voids and recessed channels in the fluidic interface layer and/or gasket to form flow paths in devices of the present disclosure. For example, FIG. 7 shows fluidic interface layer voids 821 aligned with gasket voids 831 to form flow paths. Similarly, FIG. 11 shows fluidic interface layer voids 1221 aligned with gasket voids 1231. However, FIG. 11 additionally shows that fluidic ports 1251 may be in fluid contact with fluidic interface voids 1221. Alternatively, FIG. 14 shows fluidic interface layer voids 1521 and recessed fluidic interface layer channels 1522 combined with gasket voids 1531 to form flow paths. FIG. 15 shows fluidic interface voids 1621 combined with gasket voids 1631 and recessed gasket channel 1632 to form flow paths. FIG. 15 additionally shows that fluidic ports 1651 may be in fluid contact with fluidic interface voids 1651. FIG. 16 shows fluidic interface voids 1721 combined with gasket void 1731 and recessed gasket channel 1732 to form flow paths.

Figure 8A:
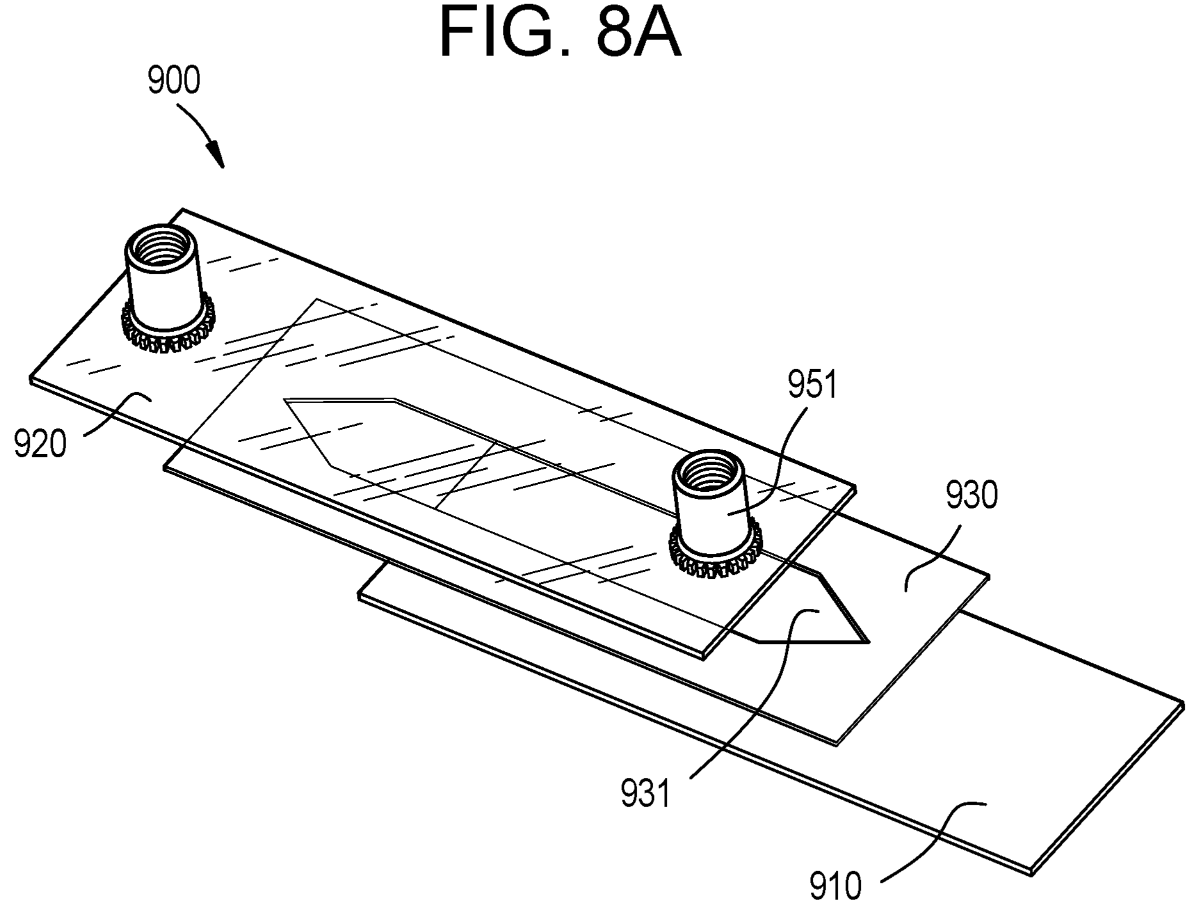
FIG. 8A illustrates an embodiment of a flowcell, featuring a fluidic interface layer with fluidic ports, a gasket, and a substrate layer. In particular, device 900 of FIG. 8A includes substrate layer 910, fluidic interface layer 920 including a plurality of fluidic ports 951, and gasket 930 having gasket void 931.
Figure 8B:
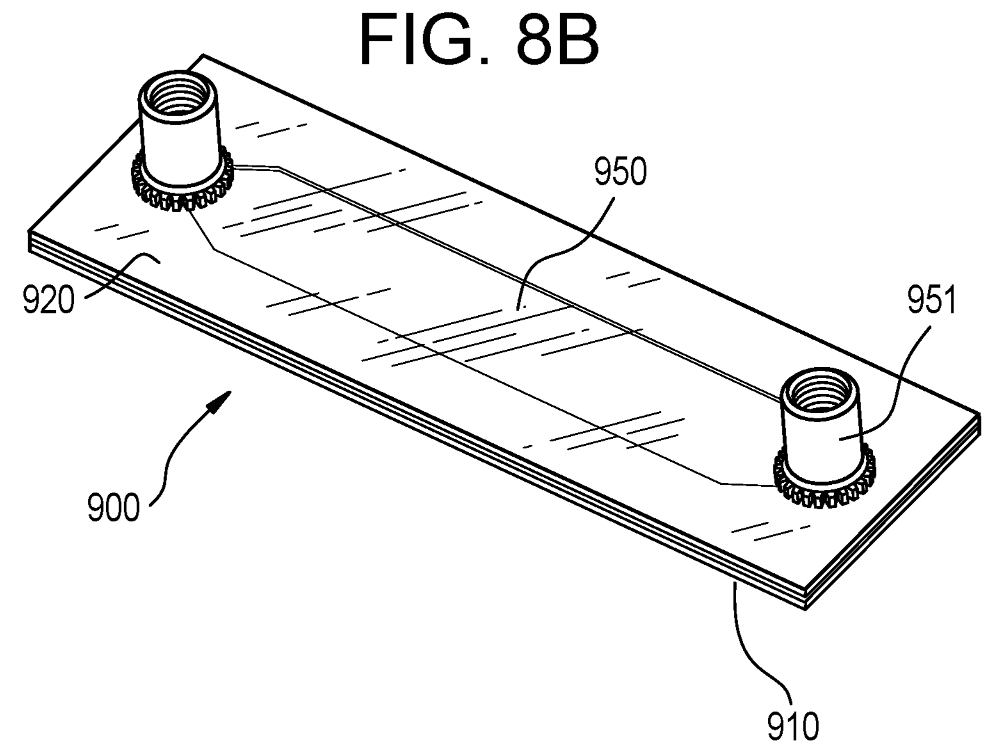
FIG. 8B illustrates a plan view of an embodiment of an assembled flowcell, having a fluidic interface layer with fluidic ports, a gasket, and a substrate layer. In particular.
Figure 9:
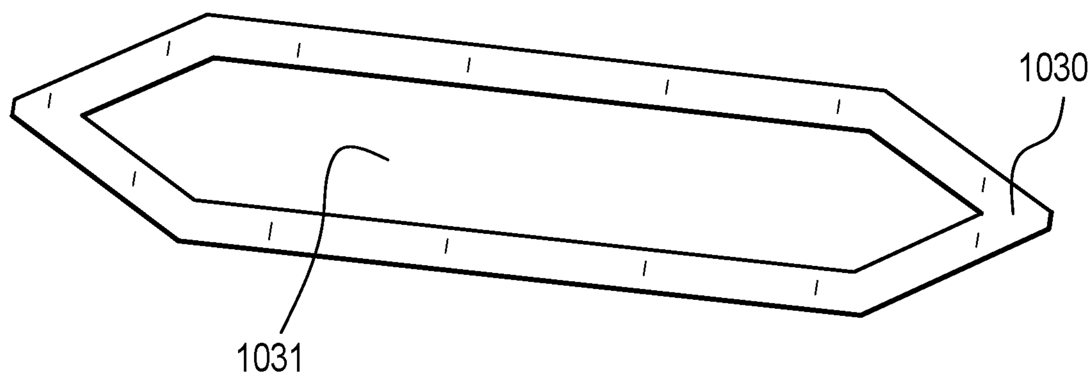
FIG. 9 illustrates an embodiment of a gasket with reduced area to contact the substrate and fluidic interface layers. In particular.
Figure 10:
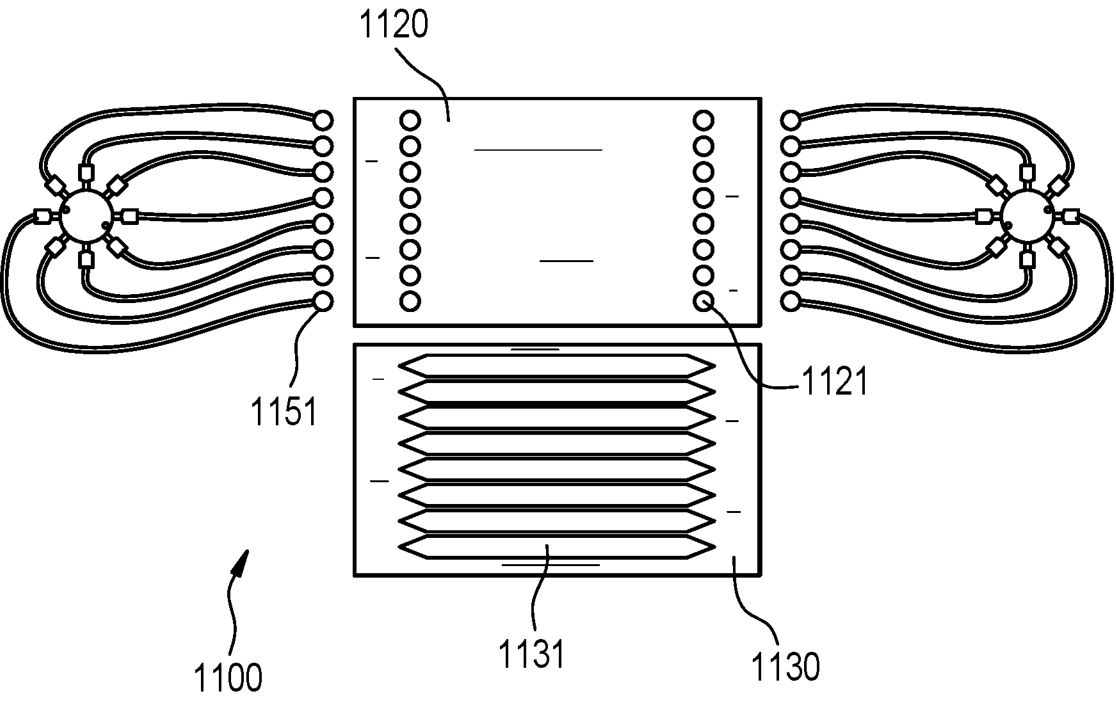
FIG. 10 illustrates an embodiment of a device in which the gasket includes voids to define flow paths, or fluidic channels, when assembled with a substrate layer and/or a fluidic interface layer, and the fluidic interface layer includes fluidic ports in fluid communication with external fluidic sources. In particular, device 1100 of FIG. 10 includes fluidic interface layer 1120 having a plurality of fluidic interface layer ports 1121, as well as gasket 1130 including a plurality of gasket voids 1131.

The fluidic interface layer may include fluidic ports, e.g., inlets and/or outlets for liquids (see, e.g., fluidic ports 951 of FIG. 8A and FIG. 8B, and fluidic ports 1251 of FIG. 11). Fluidic ports may be in fluid communication with one or more fluid manifolds, see, e.g., fluidic ports 1151 of FIG. 10 in fluid communication with manifolds.

In some embodiments, the fluidic interface layer has from 1 to 50 ports (e.g., 1 to 2, 1 to 3, 1 to 4, 1 to 5, 1 to 10, 1 to 15, 1 to 20, 1 to 25, 1 to 30, 1 to 35, 1 to 40, 1 to 50, 2 to 3, 2 to 4, 2 to 5, 2 to 6, 2 to 8, 2 to 10, 3 to 4, 3 to 5, 4 to 6, 4 to 10, 5 to 10, 6 to 12, 10 to 15, 10 to 20, 10 to 25, 15 to 25, 20 to 30, 25 to 50, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50).

Alternatively, or in addition, the channels in the fluidic interface layer or between the fluidic interface layer and the gasket or substrate layer may connect to the exterior of the device through vias or pierceable seals, or the gasket may be pierced directly, e.g., by a needle. Any fluidic component (e.g., reservoir, pump, tubing, etc.) useful to the function of the device may be connected to the fluidic port, e.g., by vias, pierceable seal, or needle.

The device can include a release fluid channel. A release fluid channel may be formed between a recess (e.g., a recessed channel) in the gasket and the substrate layer, formed from a void in the gasket and the fluidic interface and substrate layers, or defined by a bonded perimeter with an unbonded interior between the gasket and the fluidic interface layer. The device may include any number of release fluid channels, e.g., one, two, three, four, five, etc. For example, device 2000 of FIG. 20 includes two release fluid channels (2070) and one flow path (2050).

As described above, the gasket can include one or more bonded perimeters surrounding one or more unbonded interiors.

In some embodiments, the bonded perimeter can be formed from an adhesive (e.g., a one-sided adhesive film or double-sided adhesive film), a polymer coating, plasma-activation, or a solvent. In some embodiments, the bonded perimeter can be formed from plasma activation, in which the unbonded interiors are masked prior to plasma activation.

In some embodiments, the bonded perimeter can include a thickness from about 100 μm to about 20,000 μm (e.g., about 100 μm to 250 μm, about 100 μm to 500 μm, about 100 μm to 750 μm, about 100 μm to 1,000 μm, about 100 μm to 2,500 μm, about 100 μm to 5,000 μm, about 100 μm to 10,000 μm, about 100 μm to 15,000 μm, about 250 μm to 500 μm, about 500 μm to 1,000 μm, about 1,000 μm to 2,500 μm, about 2,500 μm to 5,000 μm, about 5,000 μm to 10,000 μm, about 10,000 μm to 15,000 μm, about 10,000 μm to 20,000 μm, about 15,000 μm to 20,000 μm, about 100 μm, about 200 μm, about 250 μm, about 500 μm, about 750 μm, about 1,000 μm, about 2,000 μm, about 2,500 μm, about 3,000 μm, about 4,000 μm, about 5,000 μm, about 6,000 μm, about 7,000 μm, about 8,000 μm, about 9,000 μm, about 10,000 μm, about 12,500 μm, about 15,000 μm, about 17,500 μm, or about 20,000 μm).

As described herein, the gasket can include an unbonded interior region within bonded perimeters to form a release fluid channel. The unbonded interior is configured to not attach or seal to the fluidic interface layer, while reversibly sealing to the substrate layer. In some embodiments, the unbonded interior is in fluid communication with a port and/or recessed channel in the fluidic interface layer. In some embodiments, the unbonded interior is in fluid communication with a fluid port on the fluidic interface layer. The unbonded interior can include a substantially polygonal (e.g., rectangular, square, or diamond), substantially elliptical (e.g., oval or circular), or amorphous shape. The unbonded interior can be substantially coplanar with the bonded perimeter, e.g., prior to introduction of a release fluid.

In some embodiments, the substrate layer and/or fluidic interface layer may be transparent or include transparent portions, e.g., to allow for visualization, imaging, or detection. In some embodiments, the transparent portions are optically transparent portions. Substrate layers or fluidic interface layers, or portions thereof, may include transparent materials such as glass, quartz, polystyrene, polyethylene terephthalate, etc.

Figure 2:
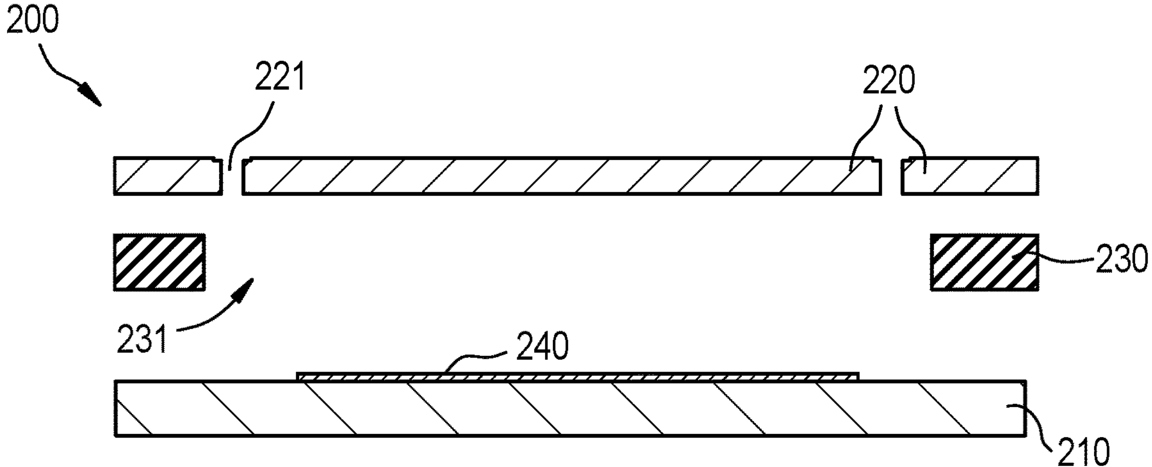
FIG. 2 illustrates an embodiment of a device in which the seal between the fluidic interface layer and gasket is fully reversible. In particular, device 200 of FIG. 1 includes substrate layer 210 having sensitive surface 240, fluidic interface layer 220 having a plurality of fluidic interface layer ports 221, and a gasket 230 having gasket void 231. Gasket 230 can reversibly seal to substrate layer 210 having sensitive surface 240 that will not contact gasket 230 or fluidic interface layer 220 when device 200 is assembled.

The substrate layer or fluidic interface layer may include a sample (e.g., a biological sample, e.g., a tissue sample), reagents, or a surface disposed to interact with (e.g., react with, be dissolved by, be suffused by, etc.) fluid (or components dissolved or dispersed therein) in the flow path. FIG. 1 and FIG. 2 show a substrate layer including a sensitive surface (140 and 150). In some embodiments, the flow path is formed between the gasket and the substrate layer. In some embodiments, the flow path is formed between the fluidic interface layer and the substrate layer. In some embodiments, the surface of the fluidic interface layer or substrate layer may have an array of bound reagents. In many applications, these samples and surfaces are sensitive, and gaining access to them risks damage. In some embodiments, the sample is positioned on the substrate layer within a void in the gasket when the device is assembled. In some embodiments, the sample is positioned on the fluidic interface layer within a void in the gasket when the device is assembled. In some embodiments, disassembly of the device can allow access to the sample (e.g., for further processing) and or collection of analytes (or portions thereof) from the sample. The substrate layer or fluidic interface layer may be transparent or include a transparent portion, e.g., disposed to allow imaging or visualization in a flow path.

Figure 13:
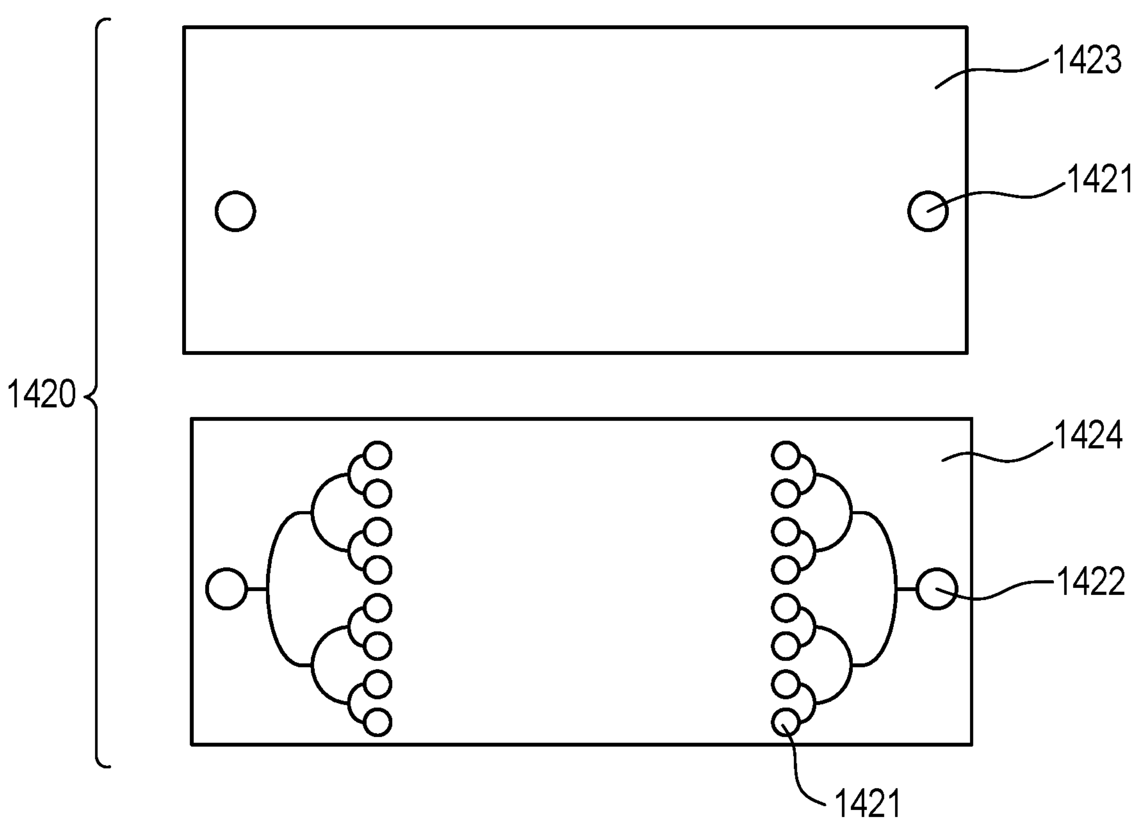
FIG. 13 illustrates an embodiment of a device in which the fluidic interface layer includes a top fluidic interface layer, or top layer, with fluidic ports, and a bottom fluidic interface layer, or bottom layer, with channels etched therein in fluid communication with voids in a gasket. In particular.

The fluidic interface layer may include a top fluidic interface layer and a bottom fluidic interface layer, e.g., a top layer and a bottom layer (see, e.g., FIG. 12). In some embodiments, the top layer includes fluidic ports (e.g., functioning as inlets and outlets, e.g., including connectors to attach to, e.g., a reservoir or other fluid source), and the bottom layer includes fluidic channels (e.g., microfluidic channels) disposed to be in fluid communication with the one or more voids in the gasket (see, e.g., FIG. 13).

Figure 17:
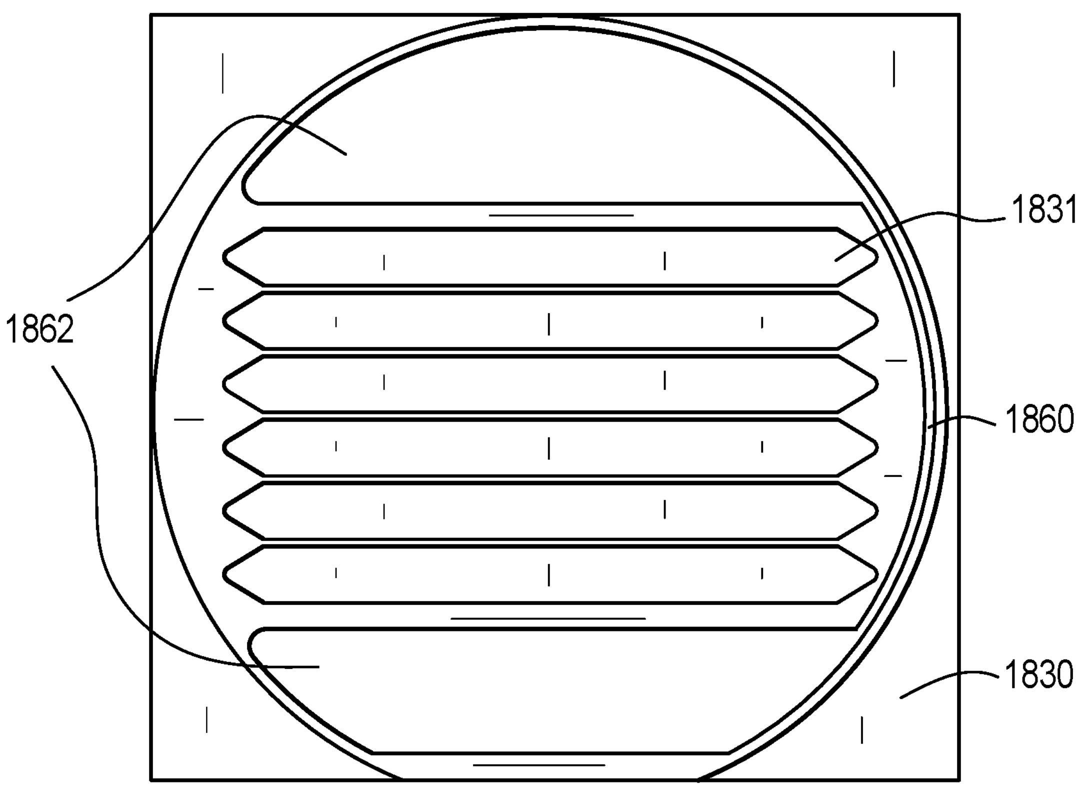
FIG. 17 illustrates an embodiment of a gasket featuring hollow areas. In particular.

The gasket may be sealed to the substrate layer and/or fluidic interface layer by applying a negative pressure, relative to the surrounding environment, between the gasket and the substrate layer and/or fluidic interface layer, e.g., by applying vacuum, e.g., from a pump. The gasket can also include one or more voids and/or recessed channels for the application of a vacuum to seal the gasket to the substrate and fluidic interface layers, e.g., to form a vacuum chamber or channel (see, e.g., vacuum channels 760 of FIG. 6; vacuum chambers 1862 and vacuum channels 1860 of FIG. 17; and vacuum chambers 1862 and vacuum channels 1860 of FIG. 18). The gasket may also include voids to reduce the total surface area in contact between the gasket and the substrate and fluidic interface layers. In some embodiments the void may include spacers, e.g., as support structures, e.g., pillars (e.g., micropillars), or other means to maintain structural integrity and prevent, e.g., the channels or chambers from collapsing. Structural supports may form part of the gasket, the substrate layer, or the fluidic interface layer. For example, the fluidic interface layer or substrate layer may include pillars which bridge the void to prevent collapse. In some embodiments, a recessed channel or chamber may include supports such as posts. In some embodiments, the spacers are positioned in the void of the gasket. In some embodiments, the spacers are positioned between the gasket and the fluidic interface layer. During disassembly of the device the vacuum can be relieved, and positive air pressure may optionally be applied to separate the layers.

The gasket and/or fluidic interface layers may include recessed channels (see, e.g., FIGS. 5, 6, 15, and 16). The recessed channels may be in fluid communication with the exterior of the device, e.g., through the fluidic ports and/or voids (or, e.g., a vacuum connection port). Recessed channels in the gasket and/or fluidic interface layer may also be used as vacuum chambers or vacuum channels for reversibly sealing the gasket to the fluidic interface layer or substrate layer. Alternatively or in addition, a recessed channel or chamber may act to reduce surface contact between the gasket and the substrate layer or fluidic interface layer, depending on the arrangement. For either purpose, the recessed channel or chamber may include spacers, e.g., as structural supports, e.g., pillars. A gasket may include multiple voids, e.g., for multiple flow paths. A source of negative pressure may be in fluid communication with a void in the gasket via ports or channels in the fluidic interface layer, the substrate layer, or the gasket (e.g., via an exposed edge). A gasket can conformably seal to the fluidic interface layer and/or substrate layer.

An exemplary range of thickness for the gasket is from 10 μm to 3 mm, e.g., between 10 μm and 2.5 mm, 10 μm and 2 mm, 10 μm and 1 mm, 10 μm and 900 μm, 10 μm and 800 μm, 10 μm and 700 μm, 10 μm and 600 μm, 10 μm and 500 μm, 10 μm and 400 μm, 10 μm and 300 μm, 10 μm and 200 μm, 10 μm and 100 μm, 10 μm and 90 μm, 10 μm and 80 μm, 10 μm and 70 μm, 10 μm and 60 μm, 10 μm and 50 μm, 10 μm and 40 μm, 10 μm and 30 μm, 10 μm and 20 μm, 20 μm and 3 mm, 30 μm and 3 mm, 40 μm and 3 mm, 50 μm and 3 mm, 60 μm and 3 mm, 70 μm and 3 mm, 80 μm and 3 mm, 90 μm and 3 mm, 100 μm and 3 mm, 200 μm and 3 mm, 300 μm and 3 mm, 400 μm and 3 mm, 500 μm and 3 mm, 600 μm and 3 mm, 700 μm and 3 mm, 800 μm and 3 mm, 900 μm and 3 mm, 1 mm and 3 mm, 1.5 mm and 3 mm, 2 mm and 3 mm, 20 μm and 2.5 mm, 50 μm and 2 mm, 150 μm and 1.5 mm, 250 μm and 1 mm, or 400 μm and 1 mm.

An exemplary range of height for recessed channels or chambers in a gasket or fluidic interface layer is from 10 μm to 3 mm, e.g., between 10 μm and 2.5 mm, 10 μm and 2 mm, 10 μm and 1 mm, 10 μm and 900 μm, 10 μm and 800 μm, 10 μm and 700 μm, 10 μm and 600 μm, 10 μm and 500 μm, 10 μm and 400 μm, 10 μm and 300 μm, 10 μm and 200 μm, 10 μm and 100 μm, 10 μm and 90 μm, 10 μm and 80 μm, 10 μm and 70 μm, 10 μm and 60 μm, 10 μm and 50 μm, 10 μm and 40 μm, 10 μm and 30 μm, 10 μm and 20 μm, 20 μm and 3 mm, 30 μm and 3 mm, 40 μm and 3 mm, 50 μm and 3 mm, 60 μm and 3 mm, 70 μm and 3 mm, 80 μm and 3 mm, 90 μm and 3 mm, 100 μm and 3 mm, 200 μm and 3 mm, 300 μm and 3 mm, 400 μm and 3 mm, 500 μm and 3 mm, 600 μm and 3 mm, 700 μm and 3 mm, 800 μm and 3 mm, 900 μm and 3 mm, 1 mm and 3 mm, 1.5 mm and 3 mm, 2 mm and 3 mm, 20 μm and 2.5 mm, 50 μm and 2 mm, 150 μm and 1.5 mm, 250 μm and 1 mm, or 400 μm and 1 mm.

An exemplary range of thickness for the fluidic interface layer or substrate layer is from 100 μm to 3 mm, e.g., between 100 μm and 2.5 mm, 100 μm and 2 mm, 100 μm and 1 mm, 100 μm and 900 μm, 100 μm and 800 μm, 100 μm and 700 μm, 100 μm and 600 μm, 100 μm and 500 μm, 100 μm and 400 μm, 100 μm and 300 μm, 100 μm and 200 μm, 100 μm and 100 μm, 150 μm and 190 μm, 130 μm and 180 μm, 500 μm and 750 μm, 500 μm and 600 μm, 400 μm and 750 μm, 200 μm and 400 μm, 300 μm and 900 μm, 1100 μm and 1250 μm, 500 μm and 2 mm, 300 μm and 1 mm, 1500 μm and 2 mm, 500 μm and 3 mm, 2600 μm and 3 mm, 1700 μm and 3 mm, 800 μm and 3 mm, 900 μm and 3 mm, 1100 μm and 3 mm, 1200 μm and 3 mm, 1300 μm and 3 mm, 1400 μm and 3 mm, 1600 μm and 3 mm, 1700 μm and 3 mm, 1800 μm and 3 mm, 1900 μm and 3 mm, 1 mm and 3 mm, 1.5 mm and 3 mm, 2 mm and 3 mm, 120 μm and 2.5 mm, 150 μm and 2 mm, 150 μm and 1.5 mm, 250 μm and 1 mm, or 400 μm and 1 mm.

An exemplary range of width for the voids and/or recessed channels in the gasket and/or fluidic interface layer is from 100 μm to 10 mm, e.g., between 100 μm and 2.5 mm, 100 μm and 2 mm, 100 μm and 1 mm, 100 μm and 900 μm, 100 μm and 800 μm, 100 μm and 700 μm, 100 μm and 600 μm, 100 μm and 500 μm, 100 μm and 400 μm, 100 μm and 300 μm, 100 μm and 200 μm, 100 μm and 100 μm, 150 μm and 190 μm, 130 μm and 180 μm, 500 μm and 750 μm, 500 μm and 600 μm, 400 μm and 750 μm, 200 μm and 400 μm, 300 μm and 900 μm, 1100 μm and 1250 μm, 500 μm and 2 mm, 300 μm and 1 mm, 1500 μm and 2 mm, 500 μm and 3 mm, 2600 μm and 3 mm, 1700 μm and 3 mm, 800 μm and 3 mm, 900 μm and 3 mm, 1100 μm and 3 mm, 1200 μm and 3 mm, 1300 μm and 3 mm, 1400 μm and 3 mm, 1600 μm and 3 mm, 1700 μm and 3 mm, 1800 μm and 3 mm, 1900 μm and 3 mm, 1 mm and 3 mm, 1.5 mm and 3 mm, 2 mm and 3 mm, 120 μm and 2.5 mm, 150 μm and 2 mm, 150 μm and 1.5 mm, 250 μm and 1 mm, 400 μm and 1 mm, 0.5 mm and 5 mm, 1.5 mm and 4 mm, 2.5 mm and 3 mm, 2.5 mm and 5 mm, 3 mm and 5 mm, 4 mm and 5 mm, 4 mm and 6 mm, 3 mm and 7 mm, 5.5 mm and 8 mm, 6 mm and 10 mm, 6 mm and 9 mm, 8 mm and 10 mm, or 9 mm and 10 mm.

An exemplary range of maximum cross sectional dimension for voids or recesses in the gasket for use as a vacuum chamber or a fluid release channel or to reduce contact area with the fluidic interface layer or substrate layer is from 1 mm to 100 mm, e.g., between 1 mm and 3 mm, 1.5 mm and 3 mm, 2 mm and 3 mm, 120 μm and 2.5 mm, 150 μm and 2 mm, 150 μm and 1.5 mm, 250 μm and 1 mm, 400 μm and 1 mm, 1.5 mm and 5 mm, 1.5 mm and 4 mm, 2.5 mm and 3 mm, 2.5 mm and 5 mm, 3 mm and 5 mm, 4 mm and 5 mm, 4 mm and 6 mm, 3 mm and 7 mm, 5.5 mm and 8 mm, 6 mm and 10 mm, 6 mm and 9 mm, 8 mm and 10 mm, 9 mm and 10 mm, 10 mm and 20 mm, 15 mm and 45 mm, 20 mm and 50 mm, 30 mm and 50 mm, 35 mm and 65 mm, 10 mm and 60 mm, 60 mm and 100 mm, 70 mm and 90 mm, 55 mm and 85 mm, 40 mm and 70 mm, 75 mm and 100 mm, 80 mm and 90 mm, or 90 and 100 mm.

The flow devices of the disclosure may include any suitable material, for example, polymeric materials, such as polyethylene or polyethylene derivatives, such as cyclic olefin copolymers (COC), polymethylmethacrylate (PMMA), polydimethylsiloxane (PDMS), polycarbonate, polystyrene, polypropylene, polyvinyl chloride, polytetrafluoroethylene, polyoxymethylene, polyether ether ketone, polycarbonate, polystyrene, or the like, or they may be fabricated in whole or in part from inorganic materials, such as silicon, or other silica based materials, e.g., glass, quartz, fused silica, borosilicate glass, metals, ceramics, and combinations thereof.

A gasket of the present disclosure may include, e.g., a polymer, e.g., a silicone (e.g., silicone rubbers, e.g., PDMS), fluorosilicone, FKM, FFKM, COC elastomer, etc. The gasket may include an elastomeric polymer, e.g., to allow the gasket to be compressible. A gasket may be a composite of compressible and incompressible materials, e.g., an elastomeric polymer bonded to a non-elastomeric polymer. Gaskets may include thermoset or thermoplastic polymers, or a combination thereof. A gasket may be coated, e.g., to include a one-sided adhesive, a double-sided adhesive, a polymer coating, or a hydrophobic coating. A hydrophobic coating on the gasket may act to improve sealing (e.g., to prevent leaks), and/or to reduce adhesion between the gasket and the fluidic interface layer and/or substrate layer, e.g., to allow for easier removal.

The fluidic interface layer and substrate layers may be made in whole or in part from glass, polymer (e.g., polystyrene, polycarbonate, polyethylene terephthalate, polypropylene, polyethylene, PTFE, COC, PMMA, etc.), ceramic, metal, or a combination thereof. The fluidic interface may include multiple layers, e.g., a top layer and a bottom layer.

Methods of Assembly

Provided herein are methods of assembling the present devices.

In some embodiments, the present devices may be assembled by alignment and stacking of the fluidic interface layer, gasket, and substrate layer. For example, the gasket may be aligned with and placed onto the fluidic interface layer, followed by alignment and placement of the fluidic interface layer and gasket onto the substrate layer. Alternatively, the gasket may be aligned with and placed onto the substrate layer, followed by alignment and placement of the gasket and substrate layer onto the fluidic interface layer. Compression may be applied during assembly such that the fluidic interface layer, gasket, and/or substrate layer are reversibly attached.

In some embodiments, the gasket is formed from a polymeric material, aiding in reversible adherence to the fluidic interface layer and/or substrate layer. In some embodiments, the present devices may be reversibly or irreversibly attached using adhesives (e.g., a one-sided adhesive or a double-sided adhesive), plasma-activation, solvents, or fasteners (e.g., a rod, a screw, or a clamp).

In some embodiments, a gasket may be sealed to the substrate layer and/or fluidic interface layer by applying a negative pressure, relative to the surrounding environment, between the gasket and the substrate layer and/or fluidic interface layer, e.g., by applying vacuum, e.g., from a pump. Recessed channels in the gasket and/or fluidic interface layer may be used as vacuum chambers or vacuum channels for reversibly sealing the gasket to the fluidic interface layer or substrate layer. The vacuum chambers and/or vacuum channels may be in fluid communication with the exterior of the device, e.g., through the fluidic ports and/or voids (or, e.g., a vacuum connection port). A source of negative pressure may be in fluid communication with the vacuum chambers and/or vacuum channels in the gasket via ports or channels in the fluidic interface layer, the substrate layer, or the gasket (e.g., via an exposed edge). Upon application of negative pressure to any vacuum chambers and/or vacuum channels, the gasket may reversibly seal to the fluidic interface layer and/or substrate layer. Upon removal of negative pressure to the vacuum chambers and/or vacuum channels, or upon application of positive pressure to the vacuum chambers and/or vacuum channels, the device may be easily disassembled.

Figure 4:
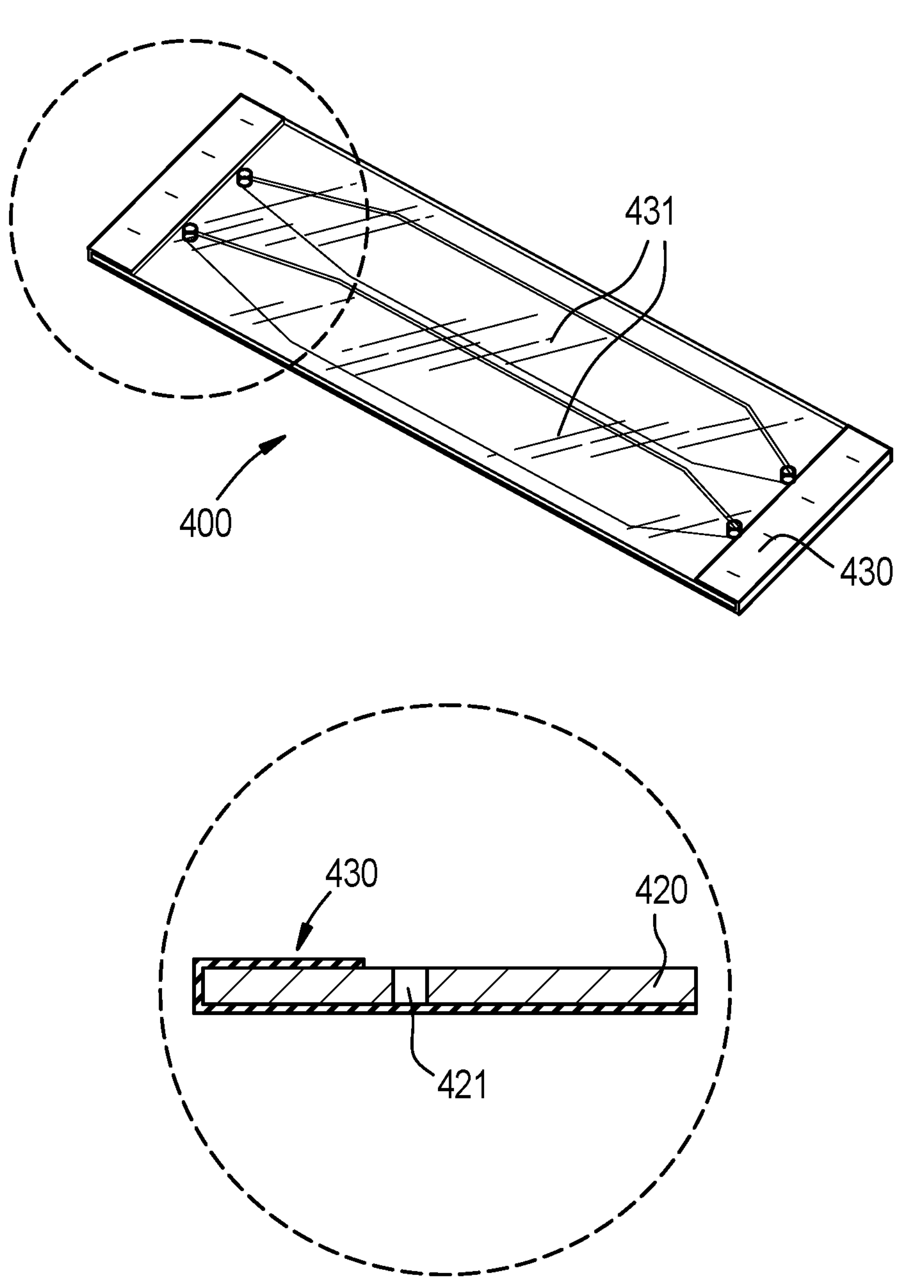
FIG. 4 illustrates an embodiment of a device featuring a fluidic interface layer and a gasket with voids that make a channel with the fluidic interface layer. In particular, device 400 of FIG. 4 includes fluidic interface layer 420 having a plurality of fluidic interface ports 421 and gasket 430 having gasket voids 431. Gasket voids 431 can form flow paths when device 400 is fully assembled with a substrate layer. The ends of gasket 430 are wrapped around the edges of fluidic interface layer 420 and are attached to it.

In some embodiments, a gasket may be attached to a fluidic interface layer by wrapping a portion of the perimeter of the gasket over a portion of the one or more edges of the fluidic interface layer (see, e.g., FIG. 4 which shows gasket 430 wrapped around the edges of fluidic interface 420). In some embodiments, a gasket may be attached to a fluidic interface layer by wrapping a portion of the gasket over at least one side surface of the fluidic interface layer and/or at least a portion of a top surface of the fluidic interface layer. Multiple portions (e.g., 2, 3, 4, 5, 6, 7, 8, 9 10, etc.) of the gasket perimeter may be wrapped over multiple portions (e.g., 2, 3, 4, 5, 6, 7, 8, 9 10, etc.) of the one or more edges or side surfaces of the fluidic interface layer. For example, two portions of a gasket that is longer than the fluidic interface layer, or four ends of a gasket that is both wider and longer. The wrapped fluidic interface layer may than be assembled with a substrate layer to provide an assembled device, e.g., a flowcell. In some embodiments, the fluidic interface and gasket are pre-wrapped and provided to a user for placement on a substrate layer. In some embodiments, the portions of the gasket perimeter that are folded over the fluidic interface layer are attached to the fluidic interface, e.g., chemically, thermally, or mechanically. In some methods of the disclosure, the gasket-wrapped fluidic interface layer may be removed as one piece from the substrate layer. In others, the gasket may be removed from both the substrate and fluidic interface layers. In some cases, the gasket can be removed and accessed for washing or replacement.

Methods of Disassembly

Provided herein are methods of disassembling device, including devices assembled by methods disclosed herein.

In some embodiments, the present devices can be manually disassembled, e.g., by pulling apart the gasket from the fluidic interface layer and/or the substrate layer. In some embodiments, the gasket is more tightly attached to the fluidic interface layer than the substrate layer, such that the fluidic interface layer and gasket can decouple from the substrate layer together.

In embodiments of a device with a release fluid channel, a release fluid may be transported into the release fluid channel to aid in disassembling the device. In some embodiments, the introduction of a fluid to one or more release fluid channels in the device may reduce the bonding between a gasket and a fluidic interface layer and/or a substrate layer. In one embodiment, a release fluid, e.g., a liquid release fluid, introduced into a device can reduce the attraction between a gasket and a fluidic interface layer and/or a substrate layer. For example, release fluids may reduce the bonding between the gasket and the substrate layer, thus facilitating separation of the gasket and substrate layer. In one embodiment, release fluid inlets and/or outlets are in fluid communication with the release fluid channels. In some embodiments, the liquid may be an alcohol (e.g., isopropyl alcohol) or water.

In some embodiments, release fluids may reduce the bonding between the gasket and the substrate layer by deforming the gasket, thus facilitating separation of the gasket and substrate layer. A reduction in the area of contact between the gasket and substrate layer eases disassembly of the device. The release fluid may be a liquid or gas, e.g., air or nitrogen. In some embodiments, the gasket may be bonded to the fluidic interface layer such as to define bonded regions and unbonded interiors to form a release fluid channel (see, e.g., FIG. 19A-19E). Alternatively, the release fluid channel may include a recess or void in the gasket, where the channel wall facing the substrate layer is deformable. When not filled with fluid, the walls of a release fluid channel may be collapsed (see, e.g., FIG. 19D). Introduction of fluid into the release fluid channel deforms the gasket, thereby reducing the area of contact between the gasket and substrate layer (see, e.g., FIG. 19E).

An exemplary range of release fluid pressures is between 0.1 PSI and 50 PSI, e.g., between 0.1 PSI and 25 PSI, 0.1 PSI and 10 PSI, 1 PSI and 25 PSI, 1 PSI and 20 PSI, 1 PSI and 15 PSI, 1 PSI and 10 PSI, 1 PSI and 9 PSI, 1 PSI and 5 PSI, 2 PSI to 10 PSI, 2 PSI to 9 PSI, 2 PSI to 8 PSI, 2 PSI and 7 PSI, 3 PSI to 10 PSI, 3 PSI to 9 PSI, 3 PSI to 8 PSI, 3 PSI to 7 PSI, 3 PSI to 6 PSI, 3 PSI to 5 PSI, 4 PSI to 6 PSI, 4.5 PSI to 5.5 PSI, 5 PSI to 25 PSI, 5 PSI to 15 PSI, 5 PSI to 10 PSI, 10 PSI to 50 PSI, 10 PSI to 25 PSI, PSI to 20 PSI, or about 5 PSI. In some embodiments, the release fluid pressure is variable. In some embodiments, the release fluid pressure may increase or decrease during separation of the gasket and substrate layer. For example, the release fluid pressure may be at a first pressure, e.g., of 1 PSI, and increase, e.g., ramp linearly or nonlinearly, to a second pressure, e.g., of 10 PSI. The time of the increase may be any suitable time, e.g., about 5, 10, 20, 30, 40, 50, or 60 s or more.

Additional Components

A fluidic interface layer with attached gasket (e.g., wrapped or otherwise) may be included as part of a kit or system, e.g., for later assembly with one or more substrate layers. Alternatively, the fluidic interface layer, gasket, and substrate layer may all be components of a kit or system, for assembly by a user according to a method of the disclosure. A device may contain one or more reservoirs, e.g., on a top surface of the fluidic interface layer. Alternatively, reservoirs may be separate components of a system that are connectable to a device of the disclosure. A single reservoir may also be connected to multiple flow paths in a device, e.g., when the same liquid is to be introduced at two or more different locations in the device. Waste reservoirs or overflow reservoirs may also be included to collect waste or overflow. Alternatively, the device may be configured to mate with sources of the liquids, which may be external reservoirs such as vials, tubes, or pouches. Similarly, the device may be configured to mate with a separate component that houses the reservoirs. Reservoirs may be of any appropriate size, e.g., to hold 10 μL to 500 mL, e.g., 10 μL to 300 mL, 25 μL to 10 mL, 100 μL to 1 mL, 40 μL to 300 μL, 1 mL to 10 mL, or 10 mL to 100 mL. When multiple reservoirs are present, each reservoir may have the same or a different size.

Channels may also include filters to prevent introduction of debris into the device. In some cases, the flow systems described herein may include one or more liquid flow units to direct the flow of one or more liquids, e.g., a pump. Examples of pumps include syringe, peristaltic, diaphragm pumps, and sources of vacuum. Other pumps can employ centrifugal or electrokinetic forces. Alternatively, liquid movement may be controlled by gravity, capillarity, or surface treatments. Multiple pumps and mechanisms for liquid movement may be employed in a single device. The device may also include one or more vents to allow pressure equalization. Such additional components may be actuated or monitored by one or more controllers or computers operatively coupled to the device, e.g., by being integrated with, physically connected to (mechanically or electrically), or by wired or wireless connection.

Pressure changes, either negative or positive, may be caused by any suitable source, e.g., syringes, pumps (e.g., vacuum pumps, peristaltic pumps, diaphragm pumps, rotary vane pumps, piston pumps, screw pumps, etc.), or aspirators. Positive pressure may also be applied by ambient atmosphere when the negative pressure is discontinued.

Surface Properties

A surface of the device may include a material, coating, or surface texture that determines the physical properties of the device. In particular, the flow of liquids may be controlled by the surface properties (e.g., wettability of a liquid-contacting surface). In some cases, a portion (e.g., a flow path) may have a surface having a wettability suitable for facilitating liquid flow (e.g., in a flow path).

Wetting, which is the ability of a liquid to maintain contact with a solid surface, may be measured as a function of a water contact angle. A water contact angle of a material can be measured by any suitable method known in the art, such as the static sessile drop method, pendant drop method, dynamic sessile drop method, dynamic Wilhelmy method, single-fiber Wilhelmy method, single-fiber meniscus method, and Washburn's equation capillary rise method.

For example, portions of the device carrying aqueous phases (e.g., a channel or flow path) may have a surface material or coating that is hydrophilic or more hydrophilic than the other parts of the device, e.g., include a material or coating having a water contact angle of less than or equal to about 90°, and/or other components of the device may have a surface material or coating that is hydrophobic or more hydrophobic than the flow path, e.g., include a material or coating having a water contact angle of greater than 70° (e.g., greater than 90°, greater than 95°, greater than 100° (e.g., 95°-120° or 100°-10°)). The system can be designed to have a single type of material or coating throughout. Surface textures may also be employed to control fluid flow.

The surface properties may be those of a native surface (i.e., the surface properties of the bulk material used for fabrication) or of a surface treatment. Non-limiting examples of surface treatments include, e.g., surface coatings and surface textures. In one approach, the surface properties are attributable to one or more surface coatings present in a portion. Hydrophobic coatings may include fluoropolymers (e.g., AQUAPEL® glass treatment), silanes, siloxanes, silicones, or other coatings known in the art. Other coatings include those vapor deposited from a precursor such as henicosyl-1,1,2,2-tetrahydrododecyldimethyltris(dimethylaminosilane); henicosyl-1,1,2,2-tetrahydrododecyltrichlorosilane (C12); heptadecafluoro-1,1,2,2-tetrahydrodecyltrichlorosilane (C10); nonafluoro-1,1,2,2-tetrahydrohexyltris(dimethylamino)silane; 3,3,3,4,4,5,5,6,6-nonafluorohexyltrichlorosilane; tridecafluoro-1,1,2,2-tetrahydrooctyltrichlorosilane (C8); bis(tridecafluoro-1,1,2,2-tetrahydrooctyl)dimethylsiloxymethylchlorosilane; nonafluorohexyltriethoxysilane (C6); dodecyltrichlorosilane (DTS); dimethyldichlorosilane (DDMS); or 10-undecenyltrichlorosilane (V11); pentafluorophenylpropyltrichlorosilane (C5). Hydrophilic coatings include polymers such as polysaccharides, polyethylene glycol, polyamines, and polycarboxylic acids. Hydrophilic surfaces may also be created by oxygen plasma treatment of certain materials.

A coated surface may be formed by depositing a metal oxide onto a surface of the system. Example metal oxides useful for coating surfaces include, but are not limited to, $Al_2O_3$, $TiO_2$, $SiO_2$, or a combination thereof. Other metal oxides useful for surface modifications are known in the art. The metal oxide can be deposited onto a surface by standard deposition techniques, including, but not limited to, atomic layer deposition (ALD), physical vapor deposition (PVD), e.g., sputtering, chemical vapor deposition (CVD), or laser deposition. Other deposition techniques for coating surfaces, e.g., liquid-based deposition, are known in the art. For example, an atomic layer of $Al_2O_3$ can be deposited on a surface by contacting it with trimethylaluminum (TMA) and water.

In another approach, the surface properties may be attributable to surface texture. For example, a surface may have a nanotexture, e.g., have a surface with nanometer surface features, such as cones or columns, that alters the wettability of the surface. Nanotextured surface may be hydrophilic, hydrophobic, or superhydrophobic, e.g., have a water contact angle greater than 150°. Exemplary superhydrophobic materials include Manganese Oxide Polystyrene ($MnO_2$/PS) nano-composite, Zinc Oxide Polystyrene (ZnO/PS) nano-composite, Precipitated Calcium Carbonate, Carbon nano-tube structures, and a silica nano-coating. Superhydrophobic coatings may also include a low surface energy material (e.g., an inherently hydrophobic material) and a surface roughness (e.g., using laser ablation techniques, plasma etching techniques, or lithographic techniques in which a material is etched through apertures in a patterned mask). Examples of low surface energy materials include fluorocarbon materials, e.g., polytetrafluoroethylene (PTFE), fluorinated ethylene propylene (FEP), ethylene tetrafluoroethylene (ETFE), ethylene chloro-trifluoroethylene (ECTFE), perfluoro-alkoxyalkane (PFA), poly(chloro-trifluoro-ethylene) (CTFE), perfluoro-alkoxyalkane (PFA), and poly(vinylidene fluoride) (PVDF). Other superhydrophobic surfaces are known in the art.

In some cases, the water contact angle of a hydrophilic or more hydrophilic material or coating is less than or equal to about 90°, e.g., less than 80°, 70°, 60°, 50°, 40°, 30°, 20°, or 10°, e.g., 90°, 85°, 80°, 75°, 70°, 65°, 60°, 55°, 50°, 45°, 40°, 35°, 30°, 25°, 20°, 15°, 10°, 9°, 8°, 7°, 6°, 5°, 4°, 3°, 2°, 1°, or 0°. In some cases, the water contact angle of a hydrophobic or more hydrophobic material or coating is at least 70°, e.g., at least 80°, at least 85°, at least 90°, at least 95°, or at least 100° (e.g., about 100°, 101°, 102°, 103°, 104°, 105°, 106°, 107°, 108°, 109°, 110°, 115°, 120°, 125°, 130°, 135°, 140°, 145°, or about) 150°.

The difference in water contact angles between that of a hydrophilic or more hydrophilic material or coating and a hydrophobic or more hydrophobic material or coating may be 5° to 100°, e.g., 5° to 80°, 5° to 60°, 5° to 50°, 5° to 40°, 5° to 30°, 5° to 20°, 10° to 75°, 15° to 70°, 20° to 65°, 25° to 60°, 30 to 50°, 35° to 45°, e.g., 5°, 6°, 7°, 8°, 9°, 10°, 15°, 20°, 25°, 30°, 35°, 40°, 45°, 50°, 55°, 60, 65°, 70°, 75°, 80°, 85°, 90°, 95°, or 100°.

Surfaces may also be coated with various functional materials, e.g., metals or other electrically or magnetically conducting materials. For example, a surface may include a metal coating for electrical connectivity, detection, or resistive heating. Alternatively, such elements may be physically incorporated into a device or placed in physical contact with a device.

Surface properties may also be modified after application. Such methods include exposure to UV, ozone, plasma (e.g., oxygen, argon, etc.), UV photografting and UV induced photo-catalytic oxidation. These and other methods can alter the properties of the surface (e.g., wettability such as hydrophilicity, fluorophilicity, or hydrophobicity) or add an additional layer (e.g., biomolecules) to the surface.

The above discussion centers on the water contact angle. It will be understood that liquids employed may not be water, or even aqueous. Accordingly, the actual contact angle of a liquid on a surface may differ from the water contact angle. Furthermore, the determination of a water contact angle of a material or coating can be made on that material or coating when not incorporated into a device.

Methods of Detection

In some embodiments, the methods described herein include detecting, e.g., tissue, cells, particulate components thereof, or other analytes. A sensor (e.g., optical, electrical, magnetic, impedance, or fluorescent sensor) in the detector may sense a particular feature (e.g., fluorescence, charge) or characteristic (e.g., diameter or volume) of sample (e.g., a cell or group of cells in a tissue sample).

Methods of detection include optical detection, e.g., by visual observation, e.g., using an optical bright-field. In some embodiments, analytes thereof are detectable by light absorbance, scatter, emission, and/or transmission. Additionally, or alternatively, optical detection can include fluorescent detection, e.g., by fluorescent microscopy. In still further embodiments, methods of the disclosure include detection of analytes having electrical or magnetic labels or properties. In some embodiments, the device includes a plurality (e.g., 2, 3, 4, 5, 6, 7, 8, 9, 10, or more) of detectors. Detectors may or may not be integrated with the device. In some embodiments, the substrate layer and/or fluid interface layer may be transparent, or include transparent portions, e.g., to allow for visualization, imaging, or detection. Substrate layers or fluidic interface layers, or portions thereof, may include transparent materials such as glass, quartz, polystyrene, polyethylene terephthalate, etc. The detection methods described herein may be automated, e.g., including robotic systems.

A variety of analytes, e.g., tissue, cell, or particulate component or macromolecular constituent thereof, characteristics can be observed and/or quantified. For example, characteristics such as analyte, e.g., cell, or particulate component or macromolecular constituent thereof, size (e.g., diameter) and shape can be readily observed visually and recorded by image or video acquisition software known in the art. In addition, the number of analytes, e.g., cell or particulate component thereof, can similarly be observed visually, by using detectable labels, or by other optical characteristics (e.g., scatter, absorbance, transmission, emission, such as fluorescence, etc.). In some embodiments, methods of the disclosure include observing the presence and/or intensity of a fluorescently or ionically tagged antigen-binding molecule bound to a biological antigen (e.g., a protein or nucleic acid, e.g., associated with an intact cell).

Preparation of Samples

A variety of steps can be performed to prepare a biological tissue sample for analysis. In some embodiments, a sample is collected or deposited in the device described herein and prepared using a device described herein. In some embodiments, a prepared sample is placed on a substrate layer described herein. Except where indicated otherwise, the preparative steps described below can generally be combined in any manner to appropriately prepare a particular sample for analysis. In some aspects, any of the preparative or processing steps described can be performed on a sample using a device described herein, e.g., to deliver reagents via a fluid source. For example, the preparing or processing may include but is not limited to steps for fixing, embedding, staining, crosslinking, permeabilizing the sample, providing and/or removing reagents (e.g., probes, enzymes, buffers, etc.) or any combinations thereof.

A biological tissue sample can be harvested from a subject (e.g., via surgical biopsy, whole subject sectioning), grown in vitro on a growth substrate or culture dish as a population of cells, or prepared as a tissue slice or tissue section. Grown samples may be sufficiently thin for analysis without further processing steps. Alternatively, grown samples, and samples obtained via biopsy or sectioning, can be prepared as thin tissue sections using a mechanical cutting apparatus such as a vibrating blade microtome. As another alternative, in some embodiments, a thin tissue section can be prepared by applying a touch imprint of a biological sample to a suitable substrate material.

The thickness of the tissue section can be a fraction of (e.g., less than 0.9, 0.8, 0.7, 0.6, 0.5, 0.4, 0.3, 0.2, or 0.1) the maximum cross-sectional dimension of a cell. However, tissue sections having a thickness that is larger than the maximum cross-section cell dimension can also be used. For example, cryostat sections can be used, which can be, e.g., from about 10 μm to about 20 μm thick.

More generally, the thickness of a tissue section typically depends on the method used to prepare the section and the physical characteristics of the tissue, and therefore sections having a wide variety of different thicknesses can be prepared and used. For example, the thickness of the tissue section can be at least 0.1, 0.2, 0.3, 0.4, 0.5, 0.7, 1.0, 1.5, 2, 3, 4, 5, 6, 7, 8, 9, 10, 12, 13, 14, 15, 20, 30, 40, or 50 μm. Thicker sections can also be used if desired or convenient, e.g., at least 70, 80, 90, or 100 μm or more. Typically, the thickness of a tissue section is about 1-100 μm, 1-50 μm, 1-30 μm, 1-25 μm, 1-20 μm, 1-15 μm, 1-10 μm, 2-8 μm, 3-7 μm, or 4-6 μm, but as mentioned above, sections with thicknesses larger or smaller than these ranges can also be analyzed.

Multiple sections can also be obtained from a single biological sample. For example, multiple tissue sections can be obtained from a surgical biopsy sample by performing serial sectioning of the biopsy sample using a sectioning blade. Spatial information among the serial sections can be preserved in this manner, and the sections can be analyzed successively to obtain three-dimensional information about the biological sample.

In some embodiments, the biological tissue sample (e.g., a tissue section as described above) can be prepared by deep freezing at a temperature suitable to maintain or preserve the integrity (e.g., the physical characteristics) of the tissue structure. Such a temperature can be, e.g., less than −20° C., or less than −25° C., −30° C., −40° C., −50° C., −60° C., −70° C., 80° C. −90° C., −100° C., −110° C., −120° C., −130° C., −140° C., −150° C., −160° C., −170° C., −180° C., −190° C., or −200° C. The frozen tissue sample can be sectioned, e.g., thinly sliced, onto a substrate surface using any number of suitable methods. For example, a tissue sample can be prepared using a chilled microtome (e.g., a cryostat) set at a temperature suitable to maintain both the structural integrity of the tissue sample and the chemical properties of the nucleic acids in the sample. Such a temperature can be, e.g., less than −15° C., less than −20° C., or less than −25° C. A sample can be snap frozen in isopentane and liquid nitrogen. Frozen samples can be stored in a sealed container prior to embedding.

Fixation and Postfixation

In some embodiments, the biological sample can be prepared using formalin-fixation and paraffin-embedding (FFPE), which are established methods. In some embodiments, cell suspensions and other non-tissue samples can be prepared using formalin-fixation and paraffin-embedding. Following fixation of the sample and embedding in a paraffin or resin block, the sample can be sectioned as described above. Prior to analysis, the paraffin-embedding material can be removed from the tissue section (e.g., deparaffinization) by incubating the tissue section in an appropriate solvent (e.g., xylene) followed by a rinse (e.g., 99.5% ethanol for 2 minutes, 96% ethanol for 2 minutes, and 70% ethanol for 2 minutes).

As an alternative to formalin fixation described above, a biological sample can be fixed in any of a variety of other fixatives to preserve the biological structure of the sample prior to analysis. For example, a sample can be fixed via immersion in ethanol, methanol, acetone, paraformaldehyde (PFA)-Triton, and combinations thereof.

In some embodiments, acetone fixation is used with fresh frozen samples, which can include, but are not limited to, cortex tissue, mouse olfactory bulb, human brain tumor, human post-mortem brain, and breast cancer samples. When acetone fixation is performed, pre-permeabilization steps (described below) may not be performed. Alternatively, acetone fixation can be performed in conjunction with permeabilization steps.

In some embodiments, the methods provided herein includes one or more post-fixing (also referred to as post-fixation) steps. In some embodiments, one or more post-fixing step is performed after contacting a sample with a polynucleotide disclosed herein, e.g., one or more probes such as a circular or padlock probe. In some embodiments, one or more post-fixing step is performed after a hybridization complex including a probe and a target is formed in a sample. In some embodiments, one or more post-fixing step is performed prior to a ligation reaction disclosed herein, such as the ligation to circularize a padlock probe.

In some embodiments, one or more post-fixing step is performed after contacting a sample with a binding or labelling agent (e.g., an antibody or antigen binding fragment thereof) for a non-nucleic acid analyte such as a protein analyte. The labelling agent can include a nucleic acid molecule (e.g., reporter oligonucleotide) including a sequence corresponding to the labelling agent and therefore corresponds to (e.g., uniquely identifies) the analyte. In some embodiments, the labelling agent can include a reporter oligonucleotide including one or more barcode sequences.

A post-fixing step may be performed using any suitable fixation reagent disclosed herein, for example, 3% (w/v) paraformaldehyde in DEPC-PBS.

Embedding

As an alternative to paraffin embedding described above, a biological sample can be embedded in any of a variety of other embedding materials to provide structural substrate to the sample prior to sectioning and other handling steps. In some cases, the embedding material can be removed e.g., prior to analysis of tissue sections obtained from the sample. Suitable embedding materials include, but are not limited to, waxes, resins (e.g., methacrylate resins), epoxies, and agar.

In some embodiments, the biological sample can be embedded in a matrix (e.g., a hydrogel matrix). Embedding the sample in this manner typically involves contacting the biological sample with a hydrogel such that the biological sample becomes surrounded by the hydrogel. For example, the sample can be embedded by contacting the sample with a suitable polymer material, and activating the polymer material to form a hydrogel. In some embodiments, the hydrogel is formed such that the hydrogel is internalized within the biological sample.

In some embodiments, the biological sample is immobilized in the hydrogel via cross-linking of the polymer material that forms the hydrogel. Cross-linking can be performed chemically and/or photochemically, or alternatively by any other hydrogel-formation method known in the art.

The composition and application of the hydrogel-matrix to a biological sample typically depends on the nature and preparation of the biological sample (e.g., sectioned, non-sectioned, type of fixation). As one example, where the biological sample is a tissue section, the hydrogel-matrix can include a monomer solution and an ammonium persulfate (APS) initiator/tetramethylethylenediamine (TEMED) accelerator solution. As another example, where the biological sample consists of cells (e.g., cultured cells or cells disassociated from a tissue sample), the cells can be incubated with the monomer solution and APS/TEMED solutions. For cells, hydrogel-matrix gels are formed in compartments, including but not limited to devices used to culture, maintain, or transport the cells. For example, hydrogel-matrices can be formed with monomer solution plus APS/TEMED added to the compartment to a depth ranging from about 0.1 μm to about 2 mm.

Additional methods and aspects of hydrogel embedding of biological samples are described for example in Chen et al., Science 347(6221):543-548, 2015, the entire contents of which are incorporated herein by reference.

Staining and Immunohistochemistry (INC)

To facilitate visualization, biological samples can be stained using a wide variety of stains and staining techniques. In some embodiments, for example, a sample can be stained using any number of stains and/or immunohistochemical reagents. One or more staining steps may be performed to prepare or process a biological sample for an assay described herein or may be performed during and/or after an assay. In some instances, the provided methods and devices for the reversible assembly and use of a flowcell allow access to the sample after performing fluidic operations. In some cases, the provided flowcell can be sealed then access can be gained to the sample without disrupting the sample (e.g., to perform staining or IHC after performing other fluidic steps of an assay). In some embodiments, the sample can be contacted with one or more nucleic acid stains, membrane stains (e.g., cellular or nuclear membrane), cytological stains, or combinations thereof. In some examples, the stain may be specific to proteins, phospholipids, DNA (e.g., dsDNA, ssDNA), RNA, an organelle or compartment of the cell. The sample may be contacted with one or more labeled antibodies (e.g., a primary antibody specific for the analyte of interest and a labeled secondary antibody specific for the primary antibody). In some embodiments, cells in the sample can be segmented using one or more images taken of the stained sample.

In some embodiments, the stain is performed using a lipophilic dye. In some examples, the staining is performed with a lipophilic carbocyanine or aminostyryl dye, or analogs thereof (e.g., DiI, DiO, DiR, DiD). Other cell membrane stains may include FM and RH dyes or immunohistochemical reagents specific for cell membrane proteins. In some examples, the stain may include but is not limited to, acridine orange, acid fuchsin, Bismarck brown, carmine, coomassie blue, cresyl violet, DAPI, eosin, ethidium bromide, acid fuchsine, haematoxylin, Hoechst stains, iodine, methyl green, methylene blue, neutral red, Nile blue, Nile red, osmium tetroxide, ruthenium red, propidium iodide, rhodamine (e.g., rhodamine B), or safranine, or derivatives thereof. In some embodiments, the sample may be stained with haematoxylin and eosin (H&E).

In some embodiments, biological samples can be destained. Methods of destaining or discoloring a biological sample are known in the art, and generally depend on the nature of the stain(s) applied to the sample. For example, in some embodiments, one or more immunofluorescent stains are applied to the sample via antibody coupling. Such stains can be removed using techniques such as cleavage of disulfide linkages via treatment with a reducing agent and detergent washing, chaotropic salt treatment, treatment with antigen retrieval solution, and treatment with an acidic glycine buffer. Methods for multiplexed staining and destaining are described, for example, in Bolognesi et al., *J. Histochem. Cytochem.* 2017; 65(8): 431-444, Lin et al., *Nat Commun.* 2015; 6:8390, Pirici et al., *J. Histochem. Cytochem.* 2009; 57:567-75, and Glass et al., *J. Histochem. Cytochem.* 2009; 57:899-905, the entire contents of each of which are incorporated herein by reference.

Isometric Expansion

In some embodiments, a biological sample embedded in a matrix (e.g., a hydrogel) can be isometrically expanded. Isometric expansion methods that can be used include hydration, a preparative step in expansion microscopy, as described in Chen et al., Science 347(6221):543-548, 2015.

Isometric expansion can be performed by anchoring one or more components of a biological sample (e.g., nucleic acids, proteins) to a gel, followed by gel formation, proteolysis, and swelling. In some embodiments, analytes in the sample, products of the analytes, and/or probes associated with analytes in the sample can be anchored to the matrix (e.g., hydrogel). Isometric expansion of the biological sample can occur prior to immobilization of the biological sample on a substrate, or after the biological sample is immobilized to a substrate. In some embodiments, the isometrically expanded biological sample can be removed from the substrate prior to contacting the substrate with probes disclosed herein.

Isometric expansion of the sample can increase the spatial resolution of the subsequent analysis of the sample. The increased resolution in spatial profiling can be determined by comparison of an isometrically expanded sample with a sample that has not been isometrically expanded.

In some embodiments, a biological sample is isometrically expanded to a size at least 2×, 2.1×, 2.2×, 2.3×, 2.4×, 2.5×, 2.6×, 2.7×, 2.8×, 2.9×, 3×, 3.1×, 3.2×, 3.3×, 3.4×, 3.5×, 3.6×, 3.7×, 3.8×, 3.9×, 4×, 4.1×, 4.2×, 4.3×, 4.4×, 4.5×, 4.6×, 4.7×, 4.8×, or 4.9× its non-expanded size. In some embodiments, the sample is isometrically expanded to at least 2× and less than 20× of its non-expanded size.

Crosslinking and De-Crosslinking

In some embodiments, the biological sample is reversibly cross-linked. In some aspects, the analytes, polynucleotides and/or product of an analyte or a probe bound thereto can be anchored to a polymer matrix. For example, the polymer matrix can be a hydrogel. In some embodiments, portions of the sample can be modified to contain functional groups that can be used as an anchoring site to attach the polynucleotide probes and/or amplification product to a polymer matrix. In some embodiments, a modified probe including oligo dT may be used to bind to mRNA molecules of interest, followed by reversible crosslinking of the mRNA molecules.

In some embodiments, a hydrogel can include hydrogel subunits, such as, but not limited to, acrylamide, bis-acrylamide, polyacrylamide and derivatives thereof, poly(ethylene glycol) and derivatives thereof (e.g. PEG-acrylate (PEG-DA), PEG-RGD), gelatin-methacryloyl (GelMA), methacrylated hyaluronic acid (MeHA), polyaliphatic polyurethanes, polyether polyurethanes, polyester polyurethanes, polyethylene copolymers, polyamides, polyvinyl alcohols, polypropylene glycol, polytetramethylene oxide, polyvinyl pyrrolidone, polyacrylamide, poly(hydroxyethyl acrylate), and poly(hydroxyethyl methacrylate), collagen, hyaluronic acid, chitosan, dextran, agarose, gelatin, alginate, protein polymers, methylcellulose, and the like, and combinations thereof.

In some embodiments, a hydrogel includes a hybrid material, e.g., the hydrogel material includes elements of both synthetic and natural polymers. Examples of suitable hydrogels are described, for example, in U.S. Pat. Nos. 6,391,937, 9,512,422, and 9,889,422, and in U.S. Patent Application Publication Nos. 2017/0253918, 2018/0052081 and 2010/0055733, the entire contents of each of which are incorporated herein by reference.

In some embodiments, the hydrogel can form the substrate. In some embodiments, the substrate includes a hydrogel and one or more second materials. In some embodiments, the hydrogel is placed on top of one or more second materials. For example, the hydrogel can be pre-formed and then placed on top of, underneath, or in any other configuration with one or more second materials. In some embodiments, hydrogel formation occurs after contacting one or more second materials during formation of the substrate. Hydrogel formation can also occur within a structure (e.g., wells, ridges, projections, and/or markings) located on a substrate.

In some embodiments, hydrogel formation on a substrate occurs before, contemporaneously with, or after the sample is in the device. For example, hydrogel formation can be performed on the sample on the substrate layer.

In some embodiments, hydrogel formation occurs within a biological sample. In some embodiments, a biological sample (e.g., tissue section) is embedded in a hydrogel. In some embodiments, hydrogel subunits are infused into the biological sample, and polymerization of the hydrogel is initiated by an external or internal stimulus.

In embodiments in which a hydrogel is formed within a biological sample, functionalization chemistry can be used. In some embodiments, functionalization chemistry includes hydrogel-tissue chemistry (HTC). Any hydrogel-tissue backbone (e.g., synthetic or native) suitable for HTC can be used for anchoring biological macromolecules and modulating functionalization. Non-limiting examples of methods using HTC backbone variants include CLARITY, PACT, ExM, SWITCH and ePACT. In some embodiments, hydrogel formation within a biological sample is permanent. For example, biological macromolecules can permanently adhere to the hydrogel allowing multiple rounds of interrogation. In some embodiments, hydrogel formation within a biological sample is reversible.

In some embodiments, a method disclosed herein includes de-crosslinking the reversibly cross-linked biological sample. The de-crosslinking does not need to be complete. In some embodiments, only a portion of crosslinked molecules in the reversibly cross-linked biological sample are de-crosslinked and allowed to migrate.

Tissue Permeabilization and Treatment

In some embodiments, a biological sample can be permeabilized to facilitate transfer of analytes out of the sample, and/or to facilitate transfer of species (such as probes) into the sample. If a sample is not permeabilized sufficiently, the amount of analyte captured from the sample may be too low to enable adequate analysis. Conversely, if the tissue sample is too permeable, the relative spatial relationship of the analytes within the tissue sample can be lost. Hence, a balance between permeabilizing the tissue sample enough to obtain good signal intensity while still maintaining the spatial resolution of the analyte distribution in the sample is desirable.

In general, a biological sample can be permeabilized by exposing the sample to one or more permeabilizing agents. Suitable agents for this purpose include, but are not limited to, organic solvents (e.g., acetone, ethanol, and methanol), cross-linking agents (e.g., paraformaldehyde), detergents (e.g., saponin, Triton X100™ or Tween-20™), and enzymes (e.g., trypsin, proteases). In some embodiments, the biological sample can be incubated with a cellular permeabilizing agent to facilitate permeabilization of the sample. Additional methods for sample permeabilization are described, for example, in Jamur et al., Method Mol. Biol. 588:63-66, 2010, the entire contents of which are incorporated herein by reference. Any suitable method for sample permeabilization can generally be used in connection with the samples described herein.

In some embodiments, the biological sample can be permeabilized by adding one or more lysis reagents to the sample. Examples of suitable lysis agents include, but are not limited to, bioactive reagents such as lysis enzymes that are used for lysis of different cell types, e.g., gram positive or negative bacteria, plants, yeast, mammalian, such as lysozymes, achromopeptidase, lysostaphin, labiase, kitalase, lyticase, and a variety of other commercially available lysis enzymes.

Other lysis agents can additionally or alternatively be added to the biological sample to facilitate permeabilization. For example, surfactant-based lysis solutions can be used to lyse sample cells. Lysis solutions can include ionic surfactants such as, for example, sarcosyl and sodium dodecyl sulfate (SDS). More generally, chemical lysis agents can include, without limitation, organic solvents, chelating agents, detergents, surfactants, and chaotropic agents.

In some embodiments, the biological sample can be permeabilized by non-chemical permeabilization methods. Non-chemical permeabilization methods are known in the art. For example, non-chemical permeabilization methods that can be used include, but are not limited to, physical lysis techniques such as electroporation, mechanical permeabilization methods (e.g., bead beating using a homogenizer and grinding balls to mechanically disrupt sample tissue structures), acoustic permeabilization (e.g., sonication), and thermal lysis techniques such as heating to induce thermal permeabilization of the sample.

Additional reagents can be added to a biological sample to perform various functions prior to analysis of the sample. In some embodiments, Dnase and Rnase inactivating agents or inhibitors such as proteinase K, and/or chelating agents such as EDTA, can be added to the sample. For example, a method disclosed herein may include a step for increasing accessibility of a nucleic acid for binding, e.g., a denaturation step to opening up DNA in a cell for hybridization by a probe. For example, proteinase K treatment may be used to free up DNA with proteins bound thereto.

Analytes

The methods and compositions disclosed herein can be used to detect and analyze a wide variety of different analytes. In some aspects, an analyte can include any biological substance, structure, moiety, or component to be analyzed. In some aspects, a target disclosed herein may similarly include any analyte of interest. In some examples, a target or analyte can be directly or indirectly detected.

Analytes can be derived from a specific type of cell and/or a specific sub-cellular region. For example, analytes can be derived from cytosol, from cell nuclei, from mitochondria, from microsomes, and more generally, from any other compartment, organelle, or portion of a cell. Permeabilizing agents that specifically target certain cell compartments and organelles can be used to selectively release analytes from cells for analysis, and/or allow access of one or more reagents (e.g., probes for analyte detection) to the analytes in the cell or cell compartment or organelle.

The analyte may include any biomolecule or chemical compound, including a macromolecule such as a protein or peptide, a lipid or a nucleic acid molecule, or a small molecule, including organic or inorganic molecules. The analyte may be a cell or a microorganism, including a virus, or a fragment or product thereof. An analyte can be any substance or entity for which a specific binding partner (e.g., an affinity binding partner) can be developed. Such a specific binding partner may be a nucleic acid probe (for a nucleic acid analyte) and may lead directly to the generation of a product. Alternatively, the specific binding partner may be coupled to a nucleic acid, which may be detected.

Analytes of particular interest may include nucleic acid molecules, such as DNA (e.g., genomic DNA, mitochondrial DNA, plastid DNA, viral DNA, etc.) and RNA (e.g., mRNA, microRNA, rRNA, snRNA, viral RNA, etc.), and synthetic and/or modified nucleic acid molecules, (e.g., including nucleic acid domains including or consisting of synthetic or modified nucleotides such as LNA, PNA, morpholino, etc.), proteinaceous molecules such as peptides, polypeptides, proteins or prions or any molecule which includes a protein or polypeptide component, etc., or fragments thereof, or a lipid or carbohydrate molecule, or any molecule which include a lipid or carbohydrate component. The analyte may be a single molecule or a complex that contains two or more molecular subunits, e.g., including but not limited to protein-DNA complexes, which may or may not be covalently bound to one another, and which may be the same or different. Thus, in addition to cells or microorganisms, such a complex analyte may also be a protein complex or protein interaction. Such a complex or interaction may thus be a homo- or hetero-multimer. Aggregates of molecules, e.g., proteins may also be target analytes, for example aggregates of the same protein or different proteins. The analyte may also be a complex between proteins or peptides and nucleic acid molecules such as DNA or RNA, e.g., interactions between proteins and nucleic acids, e.g., regulatory factors, such as transcription factors, and DNA or RNA.

Endogenous Analytes

In some embodiments, an analyte herein is endogenous to a biological sample and can include nucleic acid analytes and non-nucleic acid analytes. Methods and compositions disclosed herein can be used to analyze nucleic acid analytes (e.g., using a nucleic acid probe or probe set that directly or indirectly hybridizes to a nucleic acid analyte) and/or non-nucleic acid analytes (e.g., using a labelling agent that includes a reporter oligonucleotide and binds directly or indirectly to a non-nucleic acid analyte) in any suitable combination.

Examples of non-nucleic acid analytes include, but are not limited to, lipids, carbohydrates, peptides, proteins, glycoproteins (N-linked or O-linked), lipoproteins, phosphoproteins, specific phosphorylated or acetylated variants of proteins, amidation variants of proteins, hydroxylation variants of proteins, methylation variants of proteins, ubiquitylation variants of proteins, sulfation variants of proteins, viral coat proteins, extracellular and intracellular proteins, antibodies, and antigen binding fragments.

Examples of nucleic acid analytes include DNA analytes such as single-stranded DNA (ssDNA), double-stranded DNA (dsDNA), genomic DNA, methylated DNA, specific methylated DNA sequences, fragmented DNA, mitochondrial DNA, in situ synthesized PCR products, and RNA/DNA hybrids. The DNA analyte can be a transcript of another nucleic acid molecule (e.g., DNA or RNA such as mRNA) present in a tissue sample.

Examples of nucleic acid analytes also include RNA analytes such as various types of coding and non-coding RNA. Examples of the different types of RNA analytes include messenger RNA (mRNA), including a nascent RNA, a pre-mRNA, a primary-transcript RNA, and a processed RNA, such as a capped mRNA (e.g., with a 5' 7-methyl guanosine cap), a polyadenylated mRNA (poly-A tail at the 3' end), and a spliced mRNA in which one or more introns have been removed. Also included in the analytes disclosed herein are non-capped mRNA, a non-polyadenylated mRNA, and a non-spliced mRNA. The RNA analyte can be a transcript of another nucleic acid molecule (e.g., DNA or RNA such as viral RNA) present in a tissue sample. Examples of a non-coding RNAs (ncRNA) that is not translated into a protein include transfer RNAs (tRNAs) and ribosomal RNAs (rRNAs), as well as small non-coding RNAs such as microRNA (miRNA), small interfering RNA (siRNA), Piwi-interacting RNA (piRNA), small nucleolar RNA (snoRNA), small nuclear RNA (snRNA), extracellular RNA (exRNA), small Cajal body-specific RNAs (scaRNAs), and the long ncRNAs such as Xist and HOTAIR.

In some embodiments described herein, an analyte may be a denatured nucleic acid, wherein the resulting denatured nucleic acid is single-stranded. The nucleic acid may be denatured, for example, optionally using formamide, heat, or both formamide and heat. In some embodiments, the nucleic acid is not denatured for use in a method disclosed herein.

In certain embodiments, an analyte can be extracted from a live cell. Processing conditions can be adjusted to ensure that a biological sample remains live during analysis, and analytes are extracted from (or released from) live cells of the sample. Live cell-derived analytes can be obtained only once from the sample or can be obtained at intervals from a sample that continues to remain in viable condition.

Methods and compositions disclosed herein can be used to analyze any number of analytes. For example, the number of analytes that are analyzed can be at least about 2, at least about 3, at least about 4, at least about 5, at least about 6, at least about 7, at least about 8, at least about 9, at least about 10, at least about 11, at least about 12, at least about 13, at least about 14, at least about 15, at least about 20, at least about 25, at least about 30, at least about 40, at least about 50, at least about 100, at least about 1,000, at least about 10,000, at least about 100,000 or more different analytes present in a region of the sample or within an individual feature of the substrate.

In any embodiment described herein, the analyte includes a target sequence. In some embodiments, the target sequence may be endogenous to the sample, generated in the sample, added to the sample, or associated with an analyte in the sample. In some embodiments, the target sequence is a single-stranded target sequence (e.g., a sequence in a rolling circle amplification product). In some embodiments, the analytes include one or more single-stranded target sequences. In one aspect, a first single-stranded target sequence is not identical to a second single-stranded target sequence. In another aspect, a first single-stranded target sequence is identical to one or more second single-stranded target sequence. In some embodiments, the one or more second single-stranded target sequence is included in the same analyte (e.g., nucleic acid) as the first single-stranded target sequence. Alternatively, the one or more second single-stranded target sequence is included in a different analyte (e.g., nucleic acid) from the first single-stranded target sequence.

Labelling Agents

In some embodiments, provided herein are methods and compositions for analyzing endogenous analytes (e.g., RNA, ssDNA, and cell surface or intracellular proteins and/or metabolites) in a sample using one or more labelling agents. In some embodiments, an analyte labelling agent may include an agent that interacts with an analyte (e.g., an endogenous analyte in a sample). In some embodiments, the labelling agents can include a reporter oligonucleotide that is indicative of the analyte or portion thereof interacting with the labelling agent. For example, the reporter oligonucleotide may include a barcode sequence that permits identification of the labelling agent. In some cases, the sample contacted by the labelling agent can be further contacted with a probe (e.g., a single-stranded probe sequence), that hybridizes to a reporter oligonucleotide of the labelling agent, in order to identify the analyte associated with the labelling agent. In some embodiments, the analyte labelling agent includes an analyte binding moiety and a labelling agent barcode domain including one or more barcode sequences, e.g., a barcode sequence that corresponds to the analyte binding moiety and/or the analyte. An analyte binding moiety barcode includes a barcode that is associated with or otherwise identifies the analyte binding moiety. In some embodiments, by identifying an analyte binding moiety by identifying its associated analyte binding moiety barcode, the analyte to which the analyte binding moiety binds can also be identified. An analyte binding moiety barcode can be a nucleic acid sequence of a given length and/or sequence that is associated with the analyte binding moiety. An analyte binding moiety barcode can generally include any of the variety of aspects of barcodes described herein.

In some embodiments, the method includes one or more post-fixing (also referred to as post-fixation) steps after contacting the sample with one or more labelling agents.

In the methods and devices described herein, one or more labelling agents capable of binding to or otherwise coupling to one or more features may be used to characterize analytes, cells and/or cell features. In some instances, cell features include cell surface features. Analytes may include, but are not limited to, a protein, a receptor, an antigen, a surface protein, a transmembrane protein, a cluster of differentiation protein, a protein channel, a protein pump, a carrier protein, a phospholipid, a glycoprotein, a glycolipid, a cell-cell interaction protein complex, an antigen-presenting complex, a major histocompatibility complex, an engineered T-cell receptor, a T-cell receptor, a B-cell receptor, a chimeric antigen receptor, a gap junction, an adherens junction, or any combination thereof. In some instances, cell features may include intracellular analytes, such as proteins, protein modifications (e.g., phosphorylation status or other post-translational modifications), nuclear proteins, nuclear membrane proteins, or any combination thereof.

In some embodiments, an analyte binding moiety may include any molecule or moiety capable of binding to an analyte (e.g., a biological analyte, e.g., a macromolecular constituent). A labelling agent may include, but is not limited to, a protein, a peptide, an antibody (or an epitope binding fragment thereof), a lipophilic moiety (such as cholesterol), a cell surface receptor binding molecule, a receptor ligand, a small molecule, a bi-specific antibody, a bi-specific T-cell engager, a T-cell receptor engager, a B-cell receptor engager, a pro-body, an aptamer, a monobody, an affimer, a darpin, and a protein scaffold, or any combination thereof. The labelling agents can include (e.g., are attached to) a reporter oligonucleotide that is indicative of the cell surface feature to which the binding group binds. For example, the reporter oligonucleotide may include a barcode sequence that permits identification of the labelling agent. For example, a labelling agent that is specific to one type of cell feature (e.g., a first cell surface feature) may have coupled thereto a first reporter oligonucleotide, while a labelling agent that is specific to a different cell feature (e.g., a second cell surface feature) may have a different reporter oligonucleotide coupled thereto. For a description of exemplary labelling agents, reporter oligonucleotides, and methods of use, see, e.g., U.S. Pat. No. 10,550,429; U.S. Pat. Pub.

20190177800; and U.S. Pat. Pub. 20190367969, which are each incorporated by reference herein in their entirety.

In some embodiments, an analyte binding moiety includes one or more antibodies or antigen binding fragments thereof. The antibodies or antigen binding fragments including the analyte binding moiety can specifically bind to a target analyte. In some embodiments, the analyte is a protein (e.g., a protein on a surface of the biological sample (e.g., a cell) or an intracellular protein). In some embodiments, a plurality of analyte labelling agents including a plurality of analyte binding moieties bind a plurality of analytes present in a biological sample. In some embodiments, the plurality of analytes includes a single species of analyte (e.g., a single species of polypeptide). In some embodiments in which the plurality of analytes includes a single species of analyte, the analyte binding moieties of the plurality of analyte labelling agents are the same. In some embodiments in which the plurality of analytes includes a single species of analyte, the analyte binding moieties of the plurality of analyte labelling agents are the different (e.g., members of the plurality of analyte labelling agents can have two or more species of analyte binding moieties, wherein each of the two or more species of analyte binding moieties binds a single species of analyte, e.g., at different binding sites). In some embodiments, the plurality of analytes includes multiple different species of analyte (e.g., multiple different species of polypeptides).

In other instances, e.g., to facilitate sample multiplexing, a labelling agent that is specific to a particular cell feature may have a first plurality of the labelling agent (e.g., an antibody or lipophilic moiety) coupled to a first reporter oligonucleotide and a second plurality of the labelling agent coupled to a second reporter oligonucleotide.

In some aspects, these reporter oligonucleotides may include nucleic acid barcode sequences that permit identification of the labelling agent which the reporter oligonucleotide is coupled to. The selection of oligonucleotides as the reporter may provide advantages of being able to generate significant diversity in terms of sequence, while also being readily attachable to most biomolecules, e.g., antibodies, etc., as well as being readily detected, e.g., using sequencing or array technologies.

Attachment (coupling) of the reporter oligonucleotides to the labelling agents may be achieved through any of a variety of direct or indirect, covalent or non-covalent associations or attachments. For example, oligonucleotides may be covalently attached to a portion of a labelling agent (such a protein, e.g., an antibody or antibody fragment) using chemical conjugation techniques (e.g., Lightning-Link® antibody labelling kits available from Innova Biosciences), as well as other non-covalent attachment mechanisms, e.g., using biotinylated antibodies and oligonucleotides (or beads that include one or more biotinylated linker, coupled to oligonucleotides) with an avidin or streptavidin linker. Antibody and oligonucleotide biotinylation techniques are available. See, e.g., Fang, et al., "Fluoride-Cleavable Biotinylation Phosphoramidite for 5'-end-Labelling and Affinity Purification of Synthetic Oligonucleotides," Nucleic Acids Res. Jan. 15, 2003; 31(2):708-715, which is entirely incorporated herein by reference for all purposes. Likewise, protein and peptide biotinylation techniques have been developed and are readily available. See, e.g., U.S. Pat. No. 6,265,552, which is entirely incorporated herein by reference for all purposes. Furthermore, click reaction chemistry may be used to couple reporter oligonucleotides to labelling agents. Commercially available kits, such as those from Thunderlink and Abcam, and techniques common in the art may be used to couple reporter oligonucleotides to labelling agents as appropriate. In another example, a labelling agent is indirectly (e.g., via hybridization) coupled to a reporter oligonucleotide including a barcode sequence that identifies the label agent. For instance, the labelling agent may be directly coupled (e.g., covalently bound) to a hybridization oligonucleotide that includes a sequence that hybridizes with a sequence of the reporter oligonucleotide. Hybridization of the hybridization oligonucleotide to the reporter oligonucleotide couples the labelling agent to the reporter oligonucleotide. In some embodiments, the reporter oligonucleotides are releasable from the labelling agent, such as upon application of a stimulus. For example, the reporter oligonucleotide may be attached to the labeling agent through a labile bond (e.g., chemically labile, photolabile, thermally labile, etc.) as generally described for releasing molecules from supports elsewhere herein. In some instances, the reporter oligonucleotides described herein may include one or more functional sequences that can be used in subsequent processing, such as an adapter sequence, a unique molecular identifier (UMI) sequence, a sequencer specific flow cell attachment sequence (such as an P5, P7, or partial P5 or P7 sequence), a primer or primer binding sequence, a sequencing primer or primer binding sequence (such as an R1, R2, or partial R1 or R2 sequence).

In some cases, the labelling agent can include a reporter oligonucleotide and a label. A label can be fluorophore, a radioisotope, a molecule capable of a colorimetric reaction, a magnetic particle, or any other suitable molecule or compound capable of detection. The label can be conjugated to a labelling agent (or reporter oligonucleotide) either directly or indirectly (e.g., the label can be conjugated to a molecule that can bind to the labelling agent or reporter oligonucleotide). In some cases, a label is conjugated to a first oligonucleotide that is complementary (e.g., hybridizes) to a sequence of the reporter oligonucleotide.

In some embodiments, multiple different species of analytes (e.g., polypeptides) from the biological sample can be subsequently associated with the one or more physical properties of the biological sample. For example, the multiple different species of analytes can be associated with locations of the analytes in the biological sample. Such information (e.g., proteomic information when the analyte binding moiety(ies) recognizes a polypeptide(s)) can be used in association with other spatial information (e.g., genetic information from the biological sample, such as DNA sequence information, transcriptome information (i.e., sequences of transcripts), or both). For example, a cell surface protein of a cell can be associated with one or more physical properties of the cell (e.g., a shape, size, activity, or a type of the cell). The one or more physical properties can be characterized by imaging the cell. The cell can be bound by an analyte labelling agent including an analyte binding moiety that binds to the cell surface protein and an analyte binding moiety barcode that identifies that analyte binding moiety. Results of protein analysis in a sample (e.g., a tissue sample or a cell) can be associated with DNA and/or RNA analysis in the sample.

Products of Endogenous Analyte and/or Labelling Agent

In some embodiments, provided herein are methods and compositions for analyzing one or more products of an endogenous analyte and/or a labelling agent in a biological sample. In some embodiments, an endogenous analyte (e.g., a viral or cellular DNA or RNA) or a product (e.g., a hybridization product, a ligation product, an extension product (e.g., by a DNA or RNA polymerase), a replication product, a transcription/reverse transcription product, and/or an amplification product thereof is analyzed. In some aspects, the generation and/or processing of the analytes may be performed in the device and/or the analysis of the analytes may be performed in the device, such as by delivering reagents to a sample via a fluid source. For example, the generation, processing, and analysis may include but is not limited to reactions including hybridizations, ligations, binding, extension, amplifications, or other enzymatic reactions. In some embodiments, a labelling agent that directly or indirectly binds to an analyte in the biological sample is analyzed. In some embodiments, a product (e.g., a hybridization product, a ligation product, an extension product (e.g., by a DNA or RNA polymerase), a replication product, a transcription/reverse transcription product, and/or an amplification product of a labelling agent that directly or indirectly binds to an analyte in the biological sample is analyzed. In some embodiments, the reactions for generating any of the products (e.g., ligation, amplification, extension, hybridization) provided herein are performed in the devices provided herein.

Hybridization

In some embodiments, a product of an endogenous analyte and/or a labelling agent is a hybridization product including the pairing of substantially complementary or complementary nucleic acid sequences within two different molecules, one of which is the endogenous analyte or the labelling agent (e.g., reporter oligonucleotide attached thereto). The other molecule can be another endogenous molecule or another labelling agent such as a probe. Pairing can be achieved by any process in which a nucleic acid sequence joins with a substantially or fully complementary sequence through base pairing to form a hybridization complex. For purposes of hybridization, two nucleic acid sequences are "substantially complementary" if at least 60% (e.g., at least 70%, at least 80%, or at least 90%) of their individual bases are complementary to one another.

Various probes and probe sets can be hybridized to an endogenous analyte and/or a labelling agent and each probe may include one or more barcode sequences. Exemplary barcoded probes or probe sets may be based on a padlock probe, a gapped padlock probe, a SNAIL (Splint Nucleotide Assisted Intramolecular Ligation) probe set, a PLAYR (Proximity Ligation Assay for RNA) probe set, a PLISH (Proximity Ligation in situ Hybridization) probe set, and RNA-templated ligation probes. The specific probe or probe set design can vary.

Ligation

In some embodiments, a product of an endogenous analyte and/or a labelling agent is a ligation product. In some embodiments, the ligation product is formed between two or more endogenous analytes. In some embodiments, the ligation product is formed between an endogenous analyte and a labelling agent. In some embodiments, the ligation product is formed between two or more labelling agent. In some embodiments, the ligation product is an intramolecular ligation of an endogenous analyte. In some embodiments, the ligation product is an intramolecular ligation of a labelling agent, for example, the circularization of a circularizable probe or probe set upon hybridization to a target sequence. The target sequence can be included in an endogenous analyte (e.g., nucleic acid such as a genomic DNA or mRNA) or a product thereof (e.g., cDNA from a cellular mRNA transcript), or in a labelling agent (e.g., the reporter oligonucleotide) or a product thereof.

In some embodiments, the ligation involves chemical ligation. In some embodiments, the ligation involves template dependent ligation. In some embodiments, the ligation involves template independent ligation. In some embodiments, the ligation involves enzymatic ligation.

In some embodiments, the enzymatic ligation involves use of a ligase. In some aspects, the ligase used herein includes an enzyme that is commonly used to join polynucleotides together or to join the ends of a single polynucleotide. An RNA ligase, a DNA ligase, or another variety of ligase can be used to ligate two nucleotide sequences together. Ligases include ATP-dependent double-strand polynucleotide ligases, NAD-i-dependent double-strand DNA or RNA ligases and single-strand polynucleotide ligases, for example any of the ligases described in EC 6.5.1.1 (ATP-dependent ligases), EC 6.5.1.2 (NAD+-dependent ligases), EC 6.5.1.3 (RNA ligases). Specific examples of ligases include bacterial ligases such as *E. coli* DNA ligase, Tth DNA ligase, *Thermococcus* sp. (strain 9° N) DNA ligase (9° N™ DNA ligase, New England Biolabs), Taq DNA ligase, Ampligase™ (Epicentre Biotechnologies) and phage ligases such as T3 DNA ligase, T4 DNA ligase and T7 DNA ligase and mutants thereof. In some embodiments, the ligase is a T4 RNA ligase. In some embodiments, the ligase is a splintR ligase. In some embodiments, the ligase is a single stranded DNA ligase. In some embodiments, the ligase is a T4 DNA ligase. In some embodiments, the ligase is a ligase that has an DNA-splinted DNA ligase activity. In some embodiments, the ligase is a ligase that has an RNA-splinted DNA ligase activity.

In some embodiments, the ligation herein is a direct ligation. In some embodiments, the ligation herein is an indirect ligation. "Direct ligation" means that the ends of the polynucleotides hybridize immediately adjacently to one another to form a substrate for a ligase enzyme resulting in their ligation to each other (intramolecular ligation). Alternatively, "indirect" means that the ends of the polynucleotides hybridize non-adjacently to one another, i.e., separated by one or more intervening nucleotides or "gaps". In some embodiments, said ends are not ligated directly to each other, but instead occurs either via the intermediacy of one or more intervening (so-called "gap" or "gap-filling" (oligo) nucleotides) or by the extension of the 3' end of a probe to "fill" the "gap" corresponding to said intervening nucleotides (intermolecular ligation). In some cases, the gap of one or more nucleotides between the hybridized ends of the polynucleotides may be "filled" by one or more "gap" (oligo)nucleotide(s) which are complementary to a splint, padlock probe, or target nucleic acid. The gap may be a gap of 1 to 60 nucleotides or a gap of 1 to 40 nucleotides or a gap of 3 to 40 nucleotides. In specific embodiments, the gap may be a gap of about 1, 2, 3, 4, 5, 6, 7, 8, 9, or 10 or more nucleotides, of any integer (or range of integers) of nucleotides in between the indicated values. In some embodiments, the gap between said terminal regions may be filled by a gap oligonucleotide or by extending the 3' end of a polynucleotide. In some cases, ligation involves ligating the ends of the probe to at least one gap (oligo)nucleotide, such that the gap (oligo)nucleotide becomes incorporated into the resulting polynucleotide. In some embodiments, the ligation herein is preceded by gap filling. In other embodiments, the ligation herein does not require gap filling.

In some embodiments, ligation of the polynucleotides produces polynucleotides with melting temperature higher than that of unligated polynucleotides. Thus, in some aspects, ligation stabilizes the hybridization complex containing the ligated polynucleotides prior to subsequent steps, including amplification and detection.

In some aspects, a high fidelity ligase, such as a thermostable DNA ligase (e.g., a Taq DNA ligase), is used. Thermostable DNA ligases are active at elevated temperatures, allowing further discrimination by incubating the ligation at a temperature near the melting temperature ($T_m$) of the DNA strands. This selectively reduces the concentration of annealed mismatched substrates (expected to have a slightly lower $T_m$ around the mismatch) over annealed fully base-paired substrates. Thus, high-fidelity ligation can be achieved through a combination of the intrinsic selectivity of the ligase active site and balanced conditions to reduce the incidence of annealed mismatched dsDNA.

In some embodiments, the ligation herein is a proximity ligation of ligating two (or more) nucleic acid sequences that are in proximity with each other, e.g., through enzymatic means (e.g., a ligase). In some embodiments, proximity ligation can include a "gap-filling" step that involves incorporation of one or more nucleic acids by a polymerase, based on the nucleic acid sequence of a template nucleic acid molecule, spanning a distance between the two nucleic acid molecules of interest (see, e.g., U.S. Pat. No. 7,264,929, the entire contents of which are incorporated herein by reference). A wide variety of different methods can be used for proximity ligating nucleic acid molecules, including (but not limited to) "sticky-end" and "blunt-end" ligations. Additionally, single-stranded ligation can be used to perform proximity ligation on a single-stranded nucleic acid molecule. Sticky-end proximity ligations involve the hybridization of complementary single-stranded sequences between the two nucleic acid molecules to be joined, prior to the ligation event itself. Blunt-end proximity ligations generally do not include hybridization of complementary regions from each nucleic acid molecule because both nucleic acid molecules lack a single-stranded overhang at the site of ligation.

Primer Extension and Amplification

In some embodiments, a product is a primer extension product of an analyte, a labelling agent, a probe or probe set bound to the analyte (e.g., a circularizable probe bound to genomic DNA, mRNA, or cDNA), or a probe or probe set bound to the labelling agent (e.g., a circularizable probe bound to one or more reporter oligonucleotides from the same or different labelling agents).

A primer is generally a single-stranded nucleic acid sequence having a 3' end that can be used as a substrate for a nucleic acid polymerase in a nucleic acid extension reaction. RNA primers are formed of RNA nucleotides, and are used in RNA synthesis, while DNA primers are formed of DNA nucleotides and used in DNA synthesis. Primers can also include both RNA nucleotides and DNA nucleotides (e.g., in a random or designed pattern). Primers can also include other natural or synthetic nucleotides described herein that can have additional functionality. In some examples, DNA primers can be used to prime RNA synthesis and vice versa (e.g., RNA primers can be used to prime DNA synthesis). Primers can vary in length. For example, primers can be about 6 bases to about 120 bases. For example, primers can include up to about 25 bases. A primer, may in some cases, refer to a primer binding sequence. A primer extension reaction generally refers to any method where two nucleic acid sequences become linked (e.g., hybridized) by an overlap of their respective terminal complementary nucleic acid sequences (i.e., for example, 3' termini). Such linking can be followed by nucleic acid extension (e.g., an enzymatic extension) of one, or both termini using the other nucleic acid sequence as a template for extension. Enzymatic extension can be performed by an enzyme including, but not limited to, a polymerase and/or a reverse transcriptase.

In some embodiments, a product of an endogenous analyte and/or a labelling agent is an amplification product of one or more polynucleotides, for instance, a circular probe or circularizable probe or probe set. In some embodiments, the amplifying is achieved by performing rolling circle amplification (RCA). In other embodiments, a primer that hybridizes to the circular probe or circularized probe is added and used as such for amplification. In some embodiments, the RCA includes a linear RCA, a branched RCA, a dendritic RCA, or any combination thereof.

In some embodiments, the amplification is performed at a temperature between or between about 20° C. and about 60° C. In some embodiments, the amplification is performed at a temperature between or between about 30° C. and about 40° C. In some aspects, the amplification step, such as the rolling circle amplification (RCA) is performed at a temperature between at or about 25° C. and at or about 50° C., such as at or about 25° C., 27° C., 29° C., 31° C., 33° C., 35° C., 37° C., 39° C., 41° C., 43° C., 45° C., 47° C., or 49° C.

In some embodiments, upon addition of a DNA polymerase in the presence of appropriate dNTP precursors and other cofactors, a primer is elongated to produce multiple copies of the circular template. This amplification step can utilize isothermal amplification or non-isothermal amplification.

Target Sequences

A target sequence for a probe disclosed herein may be included in any analyte disclose herein, including an endogenous analyte (e.g., a viral or cellular nucleic acid), a labelling agent, or a product of an endogenous analyte and/or a labelling agent.

In some aspects, one or more of the target sequences includes one or more barcode(s), e.g., at least two, three, four, five, six, seven, eight, nine, ten, or more barcodes. Barcodes can spatially-resolve molecular components found in biological samples, for example, within a cell or a tissue sample. A barcode can be attached to an analyte or to another moiety or structure in a reversible or irreversible manner. A barcode can be added to, for example, a fragment of a deoxyribonucleic acid (DNA) or ribonucleic acid (RNA) sample before or during sequencing of the sample. Barcodes can allow for identification and/or quantification of individual sequencing-reads (e.g., a barcode can be or can include a unique molecular identifier or "UMI"). In some aspects, a barcode includes about 4, 5, 6, 7, 8, 9, 10, 11, 12, 13, 14, 15, 16, 17, 18, 19, 20, 21, 22, 23, 24, 25, 26, 27, 28, 29, 30, or more than 30 nucleotides.

In some embodiments, a barcode includes two or more sub-barcodes that together function as a single barcode. For example, a polynucleotide barcode can include two or more polynucleotide sequences (e.g., sub-barcodes) that are separated by one or more non-barcode sequences. In some embodiments, the one or more barcode(s) can also provide a platform for targeting functionalities, such as oligonucleotides, oligonucleotide-antibody conjugates, oligonucleotide-streptavidin conjugates, modified oligonucleotides, affinity purification, detectable moieties, enzymes, enzymes for detection assays or other functionalities, and/or for detection and identification of the polynucleotide.

In some embodiments, in a barcode sequencing method, barcode sequences are detected for identification of other molecules including nucleic acid molecules (DNA or RNA) longer than the barcode sequences themselves, as opposed to direct sequencing of the longer nucleic acid molecules. In some embodiments, a N-mer barcode sequence includes $4^N$ complexity given a sequencing read of N bases, and a much shorter sequencing read may be required for molecular identification compared to non-barcode sequencing methods such as direct sequencing. For example, 1024 molecular species may be identified using a 5-nucleotide barcode sequence ($4^5$=1024), whereas 8 nucleotide barcodes can be used to identify up to 65,536 molecular species, a number greater than the total number of distinct genes in the human genome. In some embodiments, the barcode sequences contained in the probes or RCPs are detected, rather than endogenous sequences, which can be an efficient read-out in terms of information per cycle of sequencing. Because the barcode sequences are pre-determined, they can also be designed to feature error detection and correction mechanisms, see, e.g., U.S. Pat. Pub. 20190055594 and WO2019199579A1, which are hereby incorporated by reference in their entirety.

Assays

The methods described herein may be useful for analysis methods in which specific reagents are added to a sample. In some embodiments, reagents are added to the sample in the device which include but are not limited to oligonucleotides (e.g., probes, dNTPs, primers), enzymes (e.g., endonucleases to fragment DNA, DNA polymerase enzymes, RNA polymerase, transposase, ligase, proteinase K, reverse transcriptase enzymes, including enzymes with terminal transferase activity, and DNAse), buffers and washes. In some embodiments, optical labels or dyes are added to the sample. In some embodiments, a sample can be collected from the device after performing steps of the assay described herein. In some embodiments, the device is used to perform or prepare sample for in situ analysis methods which include, e.g., in situ hybridization and in situ sequencing. In situ hybridization is a hybridization process in which labeled nucleic acids that are complementary to a specific nucleic acid (e.g., DNA or RNA) sequence in a biological sample hybridize to a portion or section of the sample (e.g., tissue) in which the nucleic acid is present. The methods described herein may be useful for array-based methods in which specific reagents are contacted with a sample. In some embodiments, the surface of the fluidic interface layer or substrate layer may have an array of bound reagents. In some embodiments, a device is used to deliver reagents to the sample which is deposited on the array.

The labeled nucleic acids, also referred to as probes, are generally short oligonucleotides in which at least a portion of the oligonucleotide is a reverse complement to a target nucleic acid of interest. The probes may include additional components in addition to the hybridization portion. For example, the probes may include additional sequences (e.g., barcode sequences), that are unique labels or identifiers to convey information about the nucleic acid being detected. The probes may further include a label attached thereto, directly or indirectly. The label may be, e.g., an optical label, a molecular label (e.g., an antigen), a radiolabel, or a field attractable label (e.g., electric or magnetic). In some embodiments the optical label is a fluorescent label, e.g., as used in fluorescence in situ hybridization (FISH). A fluorescent label can be detected by routine optical detection methods known in the art.

Optical detection may be performed by any detector capable of measuring light (e.g., the emitted, scattered, or attenuated light) from the label. Suitable detectors include, but are not limited to, a spectrometer, a light meter, a photometer, a photodiode, a photomultiplier tube, a CCD array, a CMOS sensor, or a photovoltaic device.

In situ methods may first include fixing and/or permeabilizing a biological sample (e.g., tissue). The biological sample may be provided in the device, e.g., on a substrate layer. The sample may be permeabilized by adding a fluid, such as a solvent (e.g., acetone and methanol) or a detergent (e.g., TRITON X-100, NP-40, TWEEN 20, saponin, digitonin, and Leucoperm), to the sample. Permeabilization may allow or enhance access of the probes for the intracellular space of the sample.

In some embodiments, a plurality of probes is used, e.g., for ease of detection and/or signal amplification, such as any probes described herein. For example, a first probe may include a nucleic acid sequence that hybridizes to a target nucleic acid in the sample. A secondary probe that includes a label (e.g., optical label, e.g., fluorescent label) may then be added that hybridizes to the first probe. In some embodiments, a plurality of secondary or higher order (e.g., tertiary, quaternary) detection probes are added. Each probe may be provided by a separate fluid source. Each probe may be provided by a single fluid source that includes a plurality of distinct probes.

When a probe that includes a detection label is added, the unbound probes with detection labels can be washed away and the signal can be detected, e.g., via fluorescence microscopy.

In some embodiments, the signal or template target nucleic acid is amplified. In some embodiments, an analyte (e.g., target nucleic acid) can be amplified using an enzyme, e.g., by polymerase chain reaction (PCR) or rolling circle amplification (RCA). The target nucleic acid may be replicated, e.g., by using the probe as a primer to initiate DNA or RNA synthesis. In such an embodiment, one or more fluids are added (e.g., sequentially) to the sample to provide the reagents for nucleic acid synthesis. Suitable reagents include, but are not limited to, probes, primers, nucleotide triphosphates (NTPs, e.g., dNTPs), sequencing terminators, dyes, polymerases, ligases, transcriptases (e.g., reverse transcriptases), labels, and the like.

In some embodiments, the methods described herein includes in situ sequencing or sequence detection. One such process includes temporal multiplexing of barcoded probes. In some embodiments, a primary probe or set of primary probes (e.g., 24 primary probes) hybridize to a target nucleic acid (e.g., mRNA) in the sample. Each probe may contain a barcode attached thereto. The barcodes may then be detected by contacting with one or more probes each labeled with a fluorescent label which emits a signal. Each round of barcoding may be initiated by flowing the desired probe from a new fluid source. The labels may be detected using different excitation wavelengths (e.g., 640 nm, 561 nm, or 488 nm) during different barcoding rounds. By compiling the spatiotemporal patterns of each fluorescent signal at a location, the unique set of ordered barcode sequences that corresponds to a particular gene can be determined. Such a method may allow multiplex sequencing of a large number of (e.g., of 100, 1,000, 10,000, or more) nucleic acids, e.g., up to 90,000 transcripts per cell. This method also allows for efficient quantification of low-copy number nucleic acids.

In some embodiments, the in situ detection and/or in situ sequencing is performed in three dimensions. In this embodiment, the biological sample may be sequence by using a probe that includes a unique gene identifier. The probe may be ligated, thereby allowing extension and amplification of the target sequence. In some embodiments, the amplification product can then be modified with a chemical moiety that polymerizes in the presence of a polymerization initiator. In some embodiments, an amplified product may be embedded within a polymerized matrix (e.g., a hydrogel), thereby creating spatially fixed three-dimensional target analytes of the biological sample.

In some embodiments, the in situ sequencing includes sequencing by ligation. In this embodiment, fluorescently labeled probes with two known bases followed by degenerate or universal bases hybridize to a temple. A ligase immobilizes the complex and the biological sample is imaged to detect the label on the probe. Following detection, the fluorophore is cleaved from the probe along with several bases, revealing a free 5' phosphate. This process of hybridization, ligation, imaging, and cleavage can be repeating in multiple rounds, thereby allowing identification of, e.g., 2 out of every 5 bases. After a round of probe extension, all probes and anchors are removed and the cycle can begin again with an offset anchor, thus allowing sequencing of a new register of the target.

In another embodiment, sequencing by ligation includes labeled probes with a known base (e.g., A, C, T, or G) flanked on each side of the known base by degenerate or universal bases that hybridize to a template (e.g., three or four bases on each side). Each probe contains a different fluorescent label corresponding to each individual base. Each round of sequencing includes hybridizing a probe with a known base, ligation of the probe, detection, and optionally, cleavage of the fluorescent label. Sequencing can be performed in a plus or minus direction, and rounds of sequencing can begin again with an offset anchor, thus allowing sequencing of a new register of the target.

In some embodiments, detection of one or more analytes (e.g., protein analytes) can be performed using one or more analyte capture agents. In some embodiment, the devices described herein may include one or more analyte capture agents, e.g., an array of oligonucleotides. In some aspects, the array may include a bead array. As used herein, an “analyte capture agent” refers to an agent that interacts with an analyte (e.g., an analyte in a biological sample) and with a capture probe (e.g., a capture probe attached to a substrate or a feature) to identify the analyte. In some embodiments, the analyte capture agent includes: (i) an analyte binding moiety (e.g., that binds to an analyte), for example, an antibody or antigen-binding fragment thereof; (ii) analyte binding moiety barcode; and (iii) an analyte capture sequence. As used herein, the term “analyte binding moiety barcode” refers to a barcode that is associated with or otherwise identifies the analyte binding moiety. As used herein, the term “analyte capture sequence” refers to a region or moiety configured to hybridize to, bind to, couple to, or otherwise interact with a capture domain of a capture probe. In some cases, an analyte binding moiety barcode (or portion thereof) may be able to be removed (e.g., cleaved) from the analyte capture agent. Additional description of analyte capture agents can be found in Section (II)(b)(ix) of WO 2020/176788 and/or Section (II)(b)(viii) U.S. Patent Application Publication No. 2020/0277663.

There are at least two methods to associate a spatial barcode with one or more neighboring cells, such that the spatial barcode identifies the one or more cells, and/or contents of the one or more cells, as associated with a particular spatial location. One method is to promote analytes or analyte proxies (e.g., intermediate agents) out of a cell and towards a spatially-barcoded array (e.g., including spatially-barcoded capture probes). Another method is to cleave spatially-barcoded capture probes from an array and promote the spatially-barcoded capture probes towards and/or into or onto the biological sample.

In some cases, capture probes may be configured to prime, replicate, and consequently yield optionally barcoded extension products from a template (e.g., a DNA or RNA template, such as an analyte or an intermediate agent (e.g., a ligation product or an analyte capture agent), or a portion thereof), or derivatives thereof (see, e.g., Section (II)(b)(vii) of WO 2020/176788 and/or U.S. Patent Application Publication No. 2020/0277663 regarding extended capture probes). In some cases, capture probes may be configured to form ligation products with a template (e.g., a DNA or RNA template, such as an analyte or an intermediate agent, or portion thereof), thereby creating ligations products that serve as proxies for a template.

As used herein, an “extended capture probe” refers to a capture probe having additional nucleotides added to the terminus (e.g., 3' or 5' end) of the capture probe thereby extending the overall length of the capture probe. For example, an “extended 3' end” indicates additional nucleotides were added to the most 3' nucleotide of the capture probe to extend the length of the capture probe, for example, by polymerization reactions used to extend nucleic acid molecules including templated polymerization catalyzed by a polymerase (e.g., a DNA polymerase or a reverse transcriptase). In some embodiments, extending the capture probe includes adding to a 3' end of a capture probe a nucleic acid sequence that is complementary to a nucleic acid sequence of an analyte or intermediate agent specifically bound to the capture domain of the capture probe. In some embodiments, the capture probe is extended using reverse transcription. In some embodiments, the capture probe is extended using one or more DNA polymerases. The extended capture probes include the sequence of the capture probe and the sequence of the spatial barcode of the capture probe.

In some embodiments, extended capture probes are amplified (e.g., in bulk solution or on the array) to yield quantities that are sufficient for downstream analysis, e.g., via DNA sequencing. In some embodiments, extended capture probes (e.g., DNA molecules) act as templates for an amplification reaction (e.g., a polymerase chain reaction).

Additional variants of spatial analysis methods, including in some embodiments, an imaging step, are described in Section (II)(a) of WO 2020/176788 and/or U.S. Patent Application Publication No. 2020/0277663. Analysis of captured analytes (and/or intermediate agents or portions thereof), for example, including sample removal, extension of capture probes, sequencing (e.g., of a cleaved extended capture probe and/or a cDNA molecule complementary to an extended capture probe), sequencing on the array (e.g., using, for example, in situ hybridization or in situ ligation approaches), temporal analysis, and/or proximity capture, is described in Section (II)(g) of WO 2020/176788 and/or U.S. Patent Application Publication No. 2020/0277663. Some quality control measures are described in Section (II)(h) of WO 2020/176788 and/or U.S. Patent Application Publication No. 2020/0277663.

Spatial information can provide information of biological and/or medical importance. For example, the methods and compositions described herein can allow for: identification of one or more biomarkers (e.g., diagnostic, prognostic, and/or for determination of efficacy of a treatment) of a disease or disorder; identification of a candidate drug target for treatment of a disease or disorder; identification (e.g., diagnosis) of a subject as having a disease or disorder; identification of stage and/or prognosis of a disease or disorder in a subject; identification of a subject as having an increased likelihood of developing a disease or disorder; monitoring of progression of a disease or disorder in a subject; determination of efficacy of a treatment of a disease or disorder in a subject; identification of a patient subpopulation for which a treatment is effective for a disease or disorder; modification of a treatment of a subject with a disease or disorder; selection of a subject for participation in a clinical trial; and/or selection of a treatment for a subject with a disease or disorder.

Spatial information can provide information of biological importance. For example, the methods and compositions described herein can allow for: identification of transcriptome and/or proteome expression profiles (e.g., in healthy and/or diseased tissue); identification of multiple analyte types in close proximity (e.g., nearest neighbor analysis); determination of up- and/or down-regulated genes and/or proteins in diseased tissue; characterization of tumor microenvironments; characterization of tumor immune responses; characterization of cells types and their co-localization in tissue; and identification of genetic variants within tissues (e.g., based on gene and/or protein expression profiles associated with specific disease or disorder biomarkers).

Typically, for spatial array-based methods, a substrate layer (e.g., as described herein) functions as a support for direct or indirect attachment of capture probes to features of the array. A "feature" is an entity that acts as a support or repository for various molecular entities used in spatial analysis. In some embodiments, some or all of the features in an array are functionalized for analyte capture. Exemplary substrates are described in Section (II)(c) of WO 2020/176788 and/or U.S. Patent Application Publication No. 2020/0277663. Exemplary features and geometric attributes of an array can be found in Sections (II)(d)(i), (II)(d)(iii), and (II)(d)(iv) of WO 2020/176788 and/or U.S. Patent Application Publication No. 2020/0277663.

Generally, analytes and/or intermediate agents (or portions thereof) can be captured when contacting a biological sample with a substrate including capture probes (e.g., a substrate with capture probes embedded, spotted, printed, fabricated on the substrate, or a substrate with features (e.g., beads, wells) including capture probes). As used herein, "contact," "contacted," and/or "contacting," a biological sample with a substrate refers to any contact (e.g., direct or indirect) such that capture probes can interact (e.g., bind covalently or non-covalently (e.g., hybridize)) with analytes from the biological sample. Capture can be achieved actively (e.g., using electrophoresis) or passively (e.g., using diffusion). Analyte capture is further described in Section (II)(e) of WO 2020/176788 and/or U.S. Patent Application Publication No. 2020/0277663.

In some cases, spatial analysis can be performed by attaching and/or introducing a molecule (e.g., a peptide, a lipid, or a nucleic acid molecule) having a barcode (e.g., a spatial barcode) to a biological sample (e.g., to a cell in a biological sample). In some embodiments, a plurality of molecules (e.g., a plurality of nucleic acid molecules) having a plurality of barcodes (e.g., a plurality of spatial barcodes) are introduced to a biological sample (e.g., to a plurality of cells in a biological sample) for use in spatial analysis. In some embodiments, after attaching and/or introducing a molecule having a barcode to a biological sample, the biological sample can be physically separated (e.g., dissociated) into single cells or cell groups for analysis. Some such methods of spatial analysis are described in Section (III) of WO 2020/176788 and/or U.S. Patent Application Publication No. 2020/0277663.

In some embodiments, the macromolecular components (e.g., analytes) of individual biological samples (e.g., cells) can be identified or detected with unique identifiers (e.g., barcodes) such that upon characterization of those macromolecular components, such that any given component (e.g., bioanalyte) may be traced to the biological sample (e.g., cell) from which it was obtained. The ability to attribute characteristics to individual biological samples or groups of biological samples is provided by the assignment of unique identifiers specifically to an individual biological sample or groups of biological samples. Unique identifiers, for example, in the form of nucleic acid barcodes, can be assigned or associated with individual biological samples (e.g., cells) or populations of biological samples (e.g., cells), or genes (e.g., mRNA transcripts, in order to tag or label the biological sample's macromolecular components (and as a result, its characteristics) with the unique identifiers. These unique identifiers can then be used to attribute the biological sample's components and characteristics to an individual biological sample or group of biological samples.

In some aspects, the unique identifiers are provided in the form of oligonucleotides that include nucleic acid barcode sequences that may be attached to or otherwise associated with the nucleic acid contents of individual biological sample, or to other components of the biological sample, and particularly to fragments of those nucleic acids.

The nucleic acid barcode sequences can include from 6 to about 20 or more nucleotides within the sequence of the oligonucleotides. In some cases, the length of a barcode sequence may be 6, 7, 8, 9, 10, 11, 12, 13, 14, 15, 16, 17, 18, 19, 20 nucleotides or longer. In some cases, the length of a barcode sequence may be at least 6, 7, 8, 9, 10, 11, 12, 13, 14, 15, 16, 17, 18, 19, 20 nucleotides or longer. In some cases, the length of a barcode sequence may be at most 6, 7, 8, 9, 10, 11, 12, 13, 14, 15, 16, 17, 18, 19, 20 nucleotides or shorter. These nucleotides may be completely contiguous, i.e., in a single stretch of adjacent nucleotides, or they may be separated into two or more separate subsequences that are separated by 1 or more nucleotides. In some cases, separated barcode subsequences can be from about 4 to about 16 nucleotides in length. In some cases, the barcode subsequence may be 4, 5, 6, 7, 8, 9, 10, 11, 12, 13, 14, 15, 16 nucleotides or longer. In some cases, the barcode subsequence may be at least 4, 5, 6, 7, 8, 9, 10, 11, 12, 13, 14, 15, 16 nucleotides or longer. In some cases, the barcode subsequence may be at most 4, 5, 6, 7, 8, 9, 10, 11, 12, 13, 14, 15, 16 nucleotides or shorter.

Moieties (e.g., oligonucleotides) used in the methods described herein can also include other functional sequences useful in processing of nucleic acids from biological samples contained in the droplet. These sequences include, for example, targeted or random/universal amplification primer sequences for amplifying the genomic DNA from the individual biological samples within the droplets while attaching the associated barcode sequences, sequencing primers or primer recognition sites, hybridization or probing sequences, e.g., for identification of presence of the sequences or for pulling down barcoded nucleic acids, or any of a number of other potential functional sequences.

The methods described herein may include providing molecular labels, e.g., via a fluid source. The molecular labels may include barcodes (e.g., nucleic acid barcodes). The molecular labels can be provided to the biological sample based on a number of different methods including, without limitation, microinjection, electroporation, liposome-based methods, nanoparticle-based methods, and lipophilic moiety-barcode conjugate methods. For instance, a lipophilic moiety conjugated to a nucleic acid barcode may be contacted with cells or particulate components of interest. The lipophilic moiety may insert into the plasma membrane of a cell thereby labeling the cell with the barcode. The devices and methods of the present disclosure may result in molecular labels being present on (i) the interior of a cell or particulate component and/or (ii) the exterior of a cell or particulate component (e.g., on or within the cell membrane). These and other suitable methods will be appreciated by those skilled in the art (see U.S. Pub. Nos. US20190177800, US20190323088, US20190338353, and US20200002763, each of which is incorporated herein by reference in its entirety).

In an example, a fluid is provided that includes large numbers of the above-described barcoded oligonucleotides releasably attached to a label. In some cases, a fluid will provide a diverse barcode sequence library that includes at least about 1,000 different barcode sequences, at least about 5,000 different barcode sequences, at least about 10,000 different barcode sequences, at least about 50,000 different barcode sequences, at least about 100,000 different barcode sequences, at least about 1,000,000 different barcode sequences, at least about 5,000,000 different barcode sequences, or at least about 10,000,000 different barcode sequences, or more.

Oligonucleotides may be releasable from the labels (e.g., optical label, e.g., fluorescent label) upon the application of a particular stimulus. In some cases, the stimulus may be a photo-stimulus, e.g., through cleavage of a photo-labile linkage that releases the oligonucleotides. In other cases, a thermal stimulus may be used, where increase in temperature will result in cleavage of a linkage or other release of the oligonucleotides from the label. In still other cases, a chemical stimulus is used that cleaves a linkage of the oligonucleotides to the label, or otherwise results in release of the oligonucleotides from the label, e.g., beads.

Methods of Device Manufacture

The devices of the present disclosure may be fabricated in any of a variety of conventional ways. These structures may be fabricated in whole or in part from polymeric materials, such as polyethylene or polyethylene derivatives, such as cyclic olefin copolymers (COC), polymethylmethacrylate (PMMA), polydimethylsiloxane (PDMS), polycarbonate, polystyrene, polypropylene, polyvinyl chloride, polytetrafluoroethylene, polyoxymethylene, polyether ether ketone, polycarbonate, polystyrene, or the like, or they may be fabricated in whole or in part from inorganic materials, such as silicon, or other silica based materials, e.g., glass, quartz, fused silica, borosilicate glass, metals, ceramics, and combinations thereof.

A gasket of the present disclosure may be made in whole or in part from, e.g., a polymer, e.g., a silicone (e.g., silicone rubbers, e.g., PDMS), fluorosilicone, FKM, FFKM, COC elastomer, etc. The gasket may include an elastomeric polymer, e.g., be cut or formed from an elastomeric material, or precursors thereof, e.g., to allow the gasket to be compressible. A gasket may be a composite of compressible and incompressible materials, e.g., an elastomeric polymer bonded to a non-elastomeric polymer, e.g., formed by bonding (e.g., thermally or with adhesive) two or more materials together. Gaskets may include thermoset or thermoplastic polymers, or a combination thereof. A gasket may be coated, e.g., to include a one-sided adhesive, a double-sided adhesive, a polymer coating, or a hydrophobic coating. A hydrophobic coating on the gasket may act to improve sealing (e.g., to prevent leaks), and/or to reduce adhesion between the gasket and the fluidic interface layer and/or substrate layer, e.g., to allow for easier removal.

A gasket of the disclosure may be formed in place on the fluidic interface layer. For example, a gasket may be printed in place, e.g., using screen printing, CNC controlled nozzle deposition, 3D printing of elastomers on the surface, UV curable processes (e.g., stereolithography), etc. In some embodiments, a gasket may be formed on the fluidic interface by dispensing beads of curable elastomers, e.g., moisture or UV curable elastomers, or, e.g., two-part RTV elastomers. In some embodiments, a gasket may be produced by laser cutting of a continuous gasket layer already laminated on to the substrate layer or fluidic interface layer.

The fluidic interface layer and substrate layers may be made in whole or in part from glass, polymer (e.g., polystyrene, polycarbonate, polyethylene terephthalate, polypropylene, polyethylene, PTFE, COC, PMMA, etc.), plastic, ceramic, metal, or a combination thereof. The fluidic interface may be constructed of multiple layers, e.g., a top layer and a bottom layer.

Polymeric device components may be fabricated using any of a number of processes including soft lithography, embossing techniques, micromachining, e.g., laser machining, or, in some aspects, injection molding of the layer components that include the defined channels as well as other structures, e.g., reservoirs, integrated functional components, etc. In such cases, a laminating layer may be adhered to the molded structured part through readily available methods, including thermal lamination, solvent based lamination, sonic welding, or the like.

As will be appreciated, structures included of inorganic materials also may be fabricated using known techniques. For example, structures such as channels or reservoirs may be micro-machined into surfaces or etched into the surfaces using standard photolithographic techniques. In some aspects, the devices or components thereof may be fabricated using three-dimensional printing techniques to fabricate the channel or other structures of the devices and/or their discrete components.

Methods for Surface Modifications

The disclosure features methods for producing a flow device (e.g., a microfluidic device) that has a surface modification, e.g., a surface with a modified water contact angle. The methods may be employed to modify the surface of a device such that a liquid can "wet" the surface by altering the contact angle the liquid makes with the surface.

Devices to be modified with surface coating agents may be primed, e.g., pre-treated, before coating processes occur. In certain embodiments, the first contact angle is greater than the water contact angle of the primed surface. In other embodiments, the first contact angle is greater than the water contact angle of the device component surface. Thus, the method allows for the differential coating of surfaces within or on the device.

A surface may be primed by depositing a metal oxide onto it. Example metal oxides useful for priming surfaces include, but are not limited to, $Al_2O_3$, $TiO_2$, $SiO_2$, or a combination thereof. Other metal oxides useful for surface modifications are known in the art. The metal oxide can be applied to the surface by standard deposition techniques, including, but not limited to, atomic layer deposition (ALD), physical vapor deposition (PVD), e.g., sputtering, chemical vapor deposition (CVD), or laser deposition. Other deposition techniques for coating surfaces, e.g., liquid-based deposition, are known in the art. For example, an atomic layer of $Al_2O_3$ can be prepared on a surface by depositing trimethylaluminum (TMA) and water.

In some cases, the coating agent may create a surface that has a water contact angle greater than 90°, e.g., hydrophobic or fluorophillic, or may create a surface with a water contact angle of less than 90°, e.g., hydrophilic. For example, a fluorophillic surface may be created by flowing fluorosilane (e.g., $H_3FSi$) through a primed device surface, e.g., a surface coated in a metal oxide. The priming of the surfaces of the device enhances the adhesion of the coating agents to the surface by providing appropriate surface functional groups. In some cases, the coating agent used to coat the primed surface may be a liquid reagent.

EXAMPLES

Example 1

The present example demonstrates the assembly of a device of the present disclosure through gasket wrapping.

A substrate layer, fluidic interface layer 420, and gasket 430 are provided. Fluidic interface layer 420 includes four edges, two end edges and two side edges, that define a first perimeter. Fluidic interface layer 420 further includes four fluidic interface layer ports 421. Gasket 430 includes four edges, two end edges and two side edges, that define a second perimeter. Gasket 430 further includes two gasket voids 431.

A first portion of gasket 430 is wrapped around a first end edge of fluidic interface layer 420 and attached thereto. A second portion of gasket 430 is wrapped around a second end edge of fluidic interface layer 420 and attached thereto. The resulting device is shown in FIG. 4. In particular, FIG. 4 illustrates device 400, not yet assembled with the substrate layer, including fluidic interface layer 420 having a plurality of fluidic interface ports 421 and gasket 430 having gasket voids 431. The ends of gasket 430 are shown to be wrapped around the ends of fluidic interface layer 420.

The gasket-wrapped fluidic interface layer is then releasably attached to a substrate layer, thereby forming a flow path from gasket voids 431 between fluidic interface layer 420 and the substrate layer.

Example 2

Th present example demonstrates the reversible assembly of a device of the present disclosure through the use of negative pressure.

Figure 6:
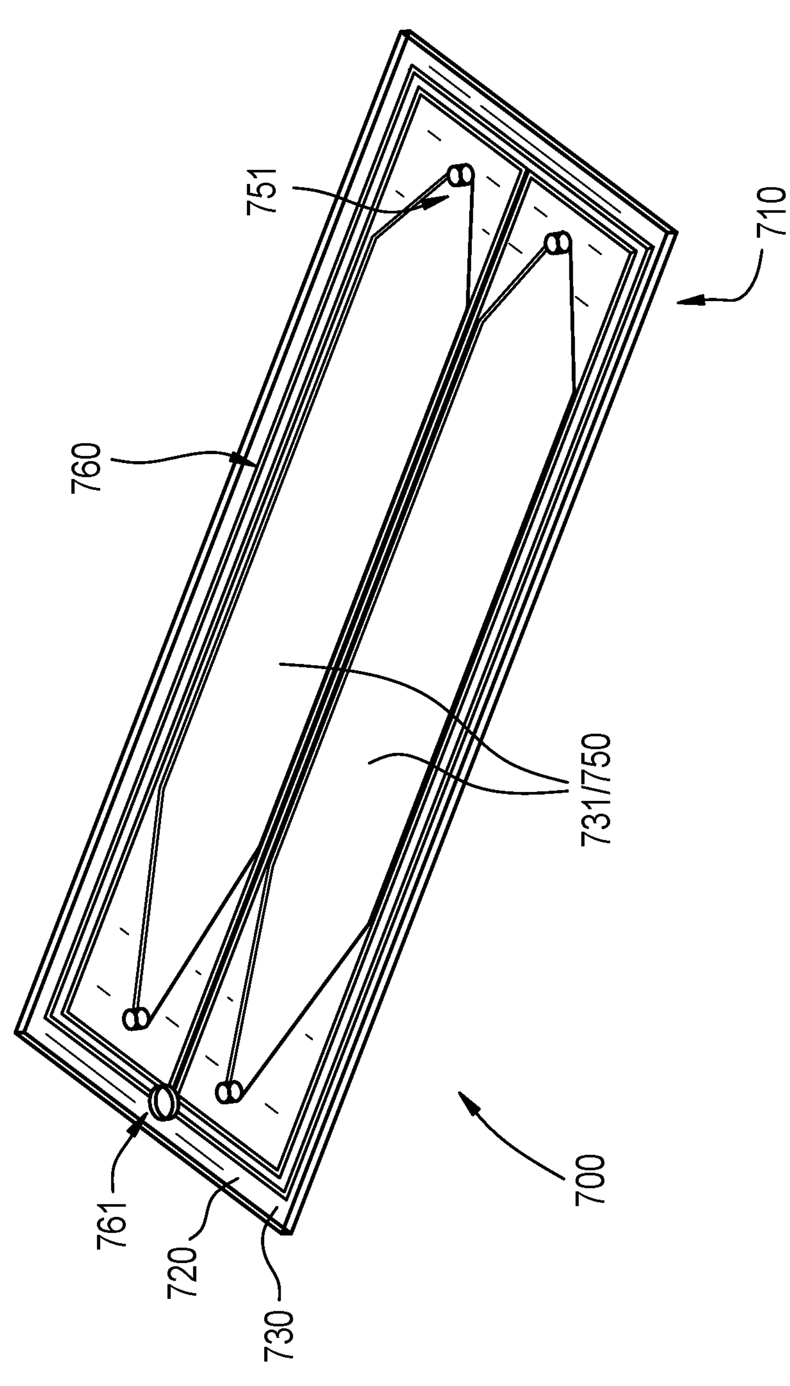
FIG. 6 illustrates an embodiment of a device in which channels recessed into the fluidic interface layer or the gasket define vacuum channels. The fluidic interface layer includes a connection port for applying vacuum to the device and fluidic ports, and the gasket includes voids. In particular, device 700 of FIG. 6 includes gasket 730 disposed between substrate layer 710 and fluidic interface layer 720. Gasket 730 includes a plurality of gasket voids 731 which form flow paths 750. Fluidic interface layer 710 includes a plurality of fluidic interface layer ports 751 to flow paths 750. Device 700 further includes vacuum channel 760, as well as vacuum port 761 connected thereto.

As shown in FIG. 6, substrate layer 710, fluidic interface layer 720, and gasket 730 align with gasket 730 between substrate layer 710 and fluidic interface layer 730. The gasket includes a void that forms a vacuum channel 760 between the fluidic interface layer and the substrate layer. Negative pressure is applied to vacuum port 761 of device 700, e.g., with a vacuum pump, to seals to the gasket to substrate layer 710 and fluidic interface layer 720 reversibly. Increasing the pressure in the channel allows for disassembly of the device.

A fluid is transported through both flow paths 750 in device 700 via fluidic ports 751 during use.

Example 3

The present example demonstrates the reversible assembly of a device of the present disclosure through the use of negative pressure.

Figure 18:
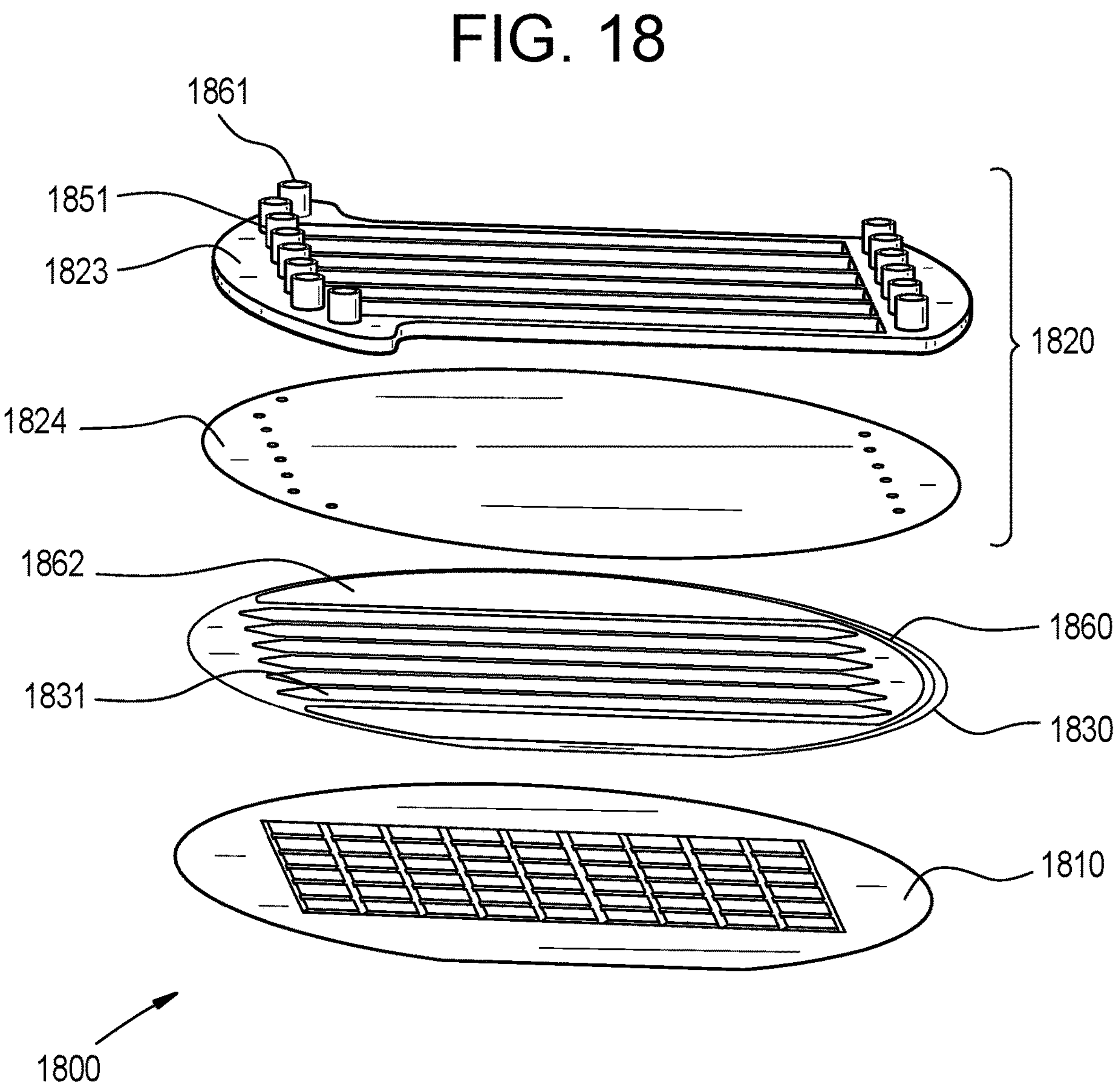
FIG. 18 illustrates an embodiment of a device with a substrate layer, a gasket with voids, a fluidic interface top layer with fluidic ports, and a fluidic interface bottom layer designed to fluidically connect the fluidic ports and the flow paths, or fluidic channels, in the gasket. In particular, device 1800 of FIG. 18 shows gasket 1830 of FIG. 17 aligned with substrate layer 1820 and fluidic interface layer 1820. Fluidic interface layer 1820 includes top fluidic interface layer 1823 having fluidic ports 1851 and bottom fluidic interface 1824.

Substrate layer 1820, top fluidic interface layer 1823, bottom fluidic interface layer 1824, and gasket 1830 are aligned according to FIG. 18. Bottom fluidic interface layer 1824 includes through holes to connect ports in top fluidic interface layer 1823 with voids in the gasket. The gasket includes hollow areas 1862 connected to vacuum ports 1861. Negative pressure is applied to vacuum port 1861, e.g., with a vacuum pump, to seal substrate layer 1810 and fluidic interface layer 1820 together to form device 1800. Release of the negative pressure allows for disassembly of the device.

A fluid is transported through the flow paths in device 1800 formed from gasket voids 1831 between the top and bottom fluidic interface layers and the substrate layer.

Example 4

The present example demonstrates disassembly of a device of the present disclosure using release fluid.

Figure 19B:
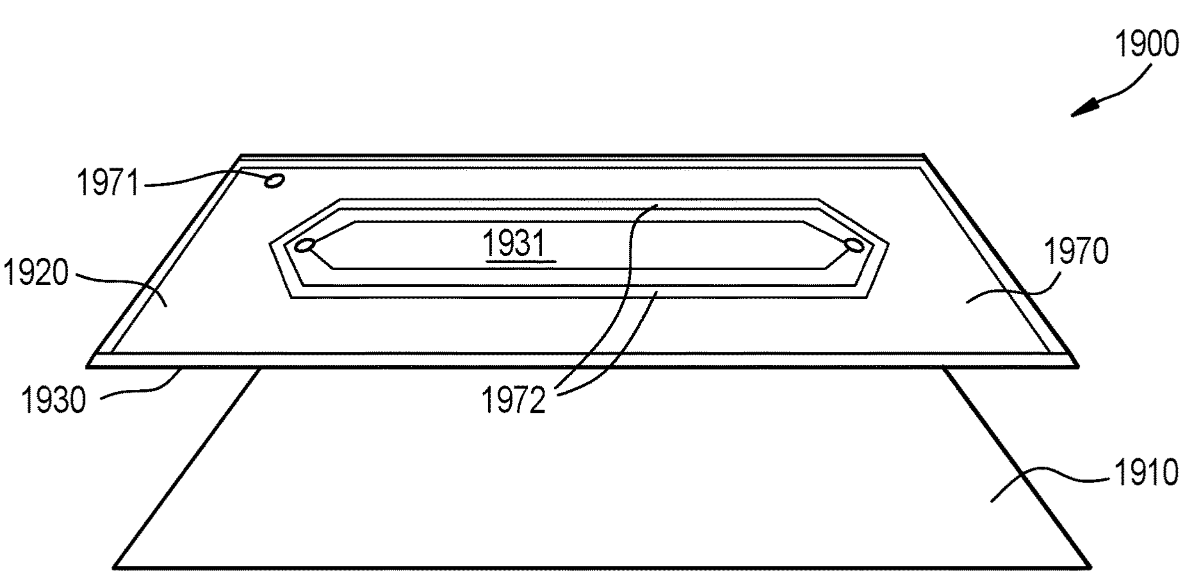
FIG. 19B illustrates gasket 1930 and fluidic interface layer 1920 of FIG. 19A attached and being placed on substrate layer 1920 to assemble device 1900. Fluidic interface layer 1920 includes a plurality of fluidic interface ports, one of which is release fluid port 1971. Gasket 1930 includes gasket void 1931.
Figure 19C:
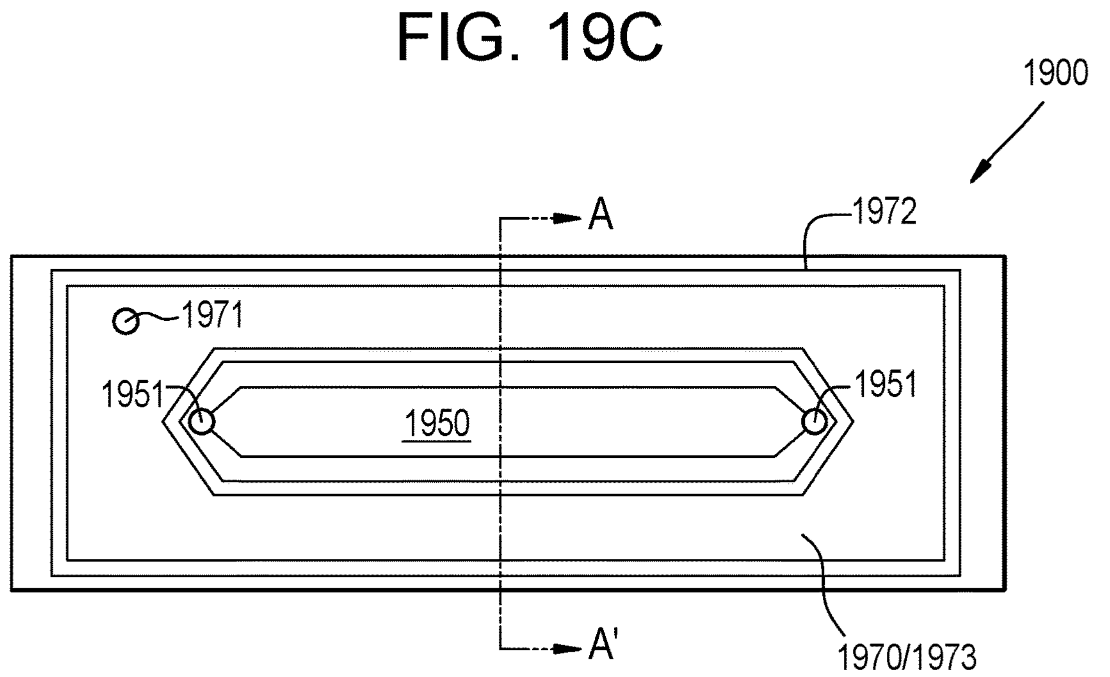
FIG. 19C illustrates device 1900 of FIG. 19B when assembled. Device 1900 includes a substrate layer, a fluidic interface layer, and a gasket therebetween. A void in the gasket defines flow path 1950 having a plurality of fluidic ports 1951. Bonded perimeters 1972 of the gasket seal to the fluidic interface layer. Unbonded interior 1973 forms release fluid channel 1970. Fluid may be added to release fluid channel 1970 through release fluid port 1971.
Figure 19D:
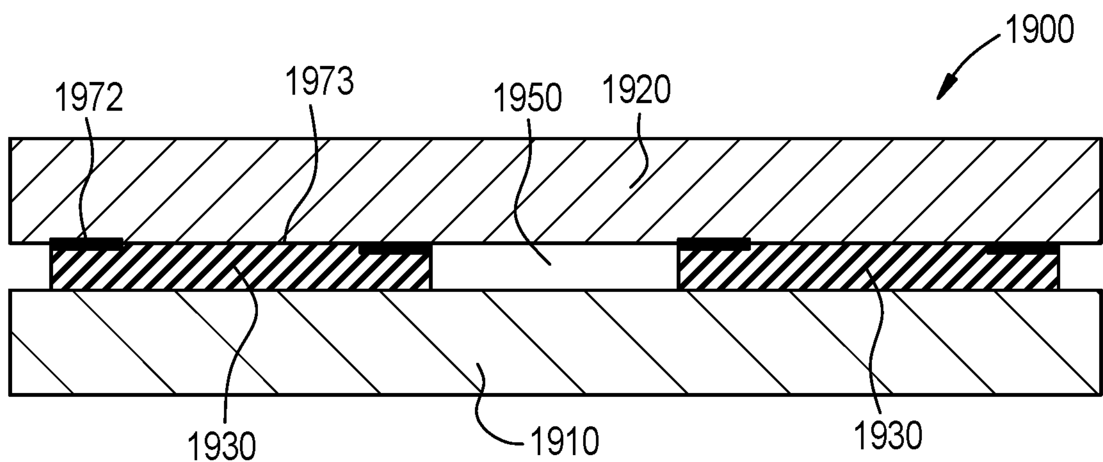
FIG. 19D illustrates a cross-sectional view along A-A' of device 1900 in FIG. 19C in which no fluid is present in release fluid channel 1970. In particular.
Figure 19E:
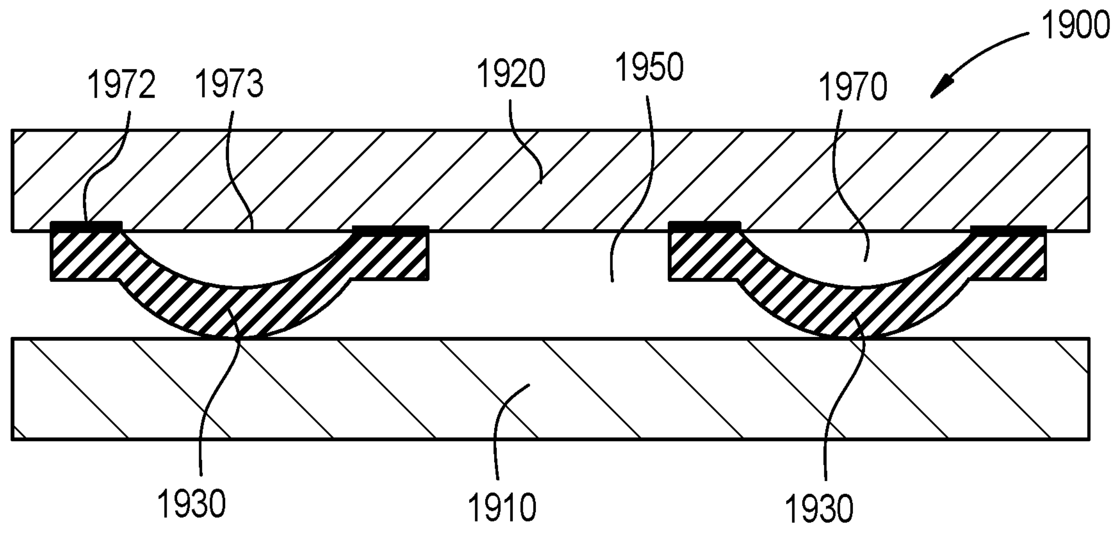
FIG. 19E illustrates a cross-sectional view along A-A' of device 1900 in FIG. 19C in which fluid is present in release fluid channel 1970, which deforms under the pressure. In particular.

Device 1900 is assembled according to FIGS. 19A and 19B. Gasket 1930 is attached to fluidic interface layer 1920 by bonded perimeters 1972. The attachment may or may not be reversible. The attachment may be made by adhesive. The bonded perimeters surround unbonded interior 1973, which is not sealed to the fluidic interface layer. The substrate layer 1920 is then reversibly sealed to the gasket, as shown in FIGS. 19C and 19D. A void 1931 in gasket 1930 defines flow path 1950 having a plurality of fluidic ports 1951. FIG. 19D illustrates a cross-sectional view along A-A' of device 1900 in FIG. 19C in which no fluid is present in release fluid channel 1970.

A release fluid such as air is injected into release fluid channel 1970 through release fluid port 1971, e.g., by a pump. As shown in FIG. 19 E, introduction of the release fluid deforms the release fluid channel, reducing the area of contact between the gasket and the substrate layer to allow for easier disassembly.

Example 5

The present example demonstrates disassembly of device 2000 using a release fluid.

Figure 20:
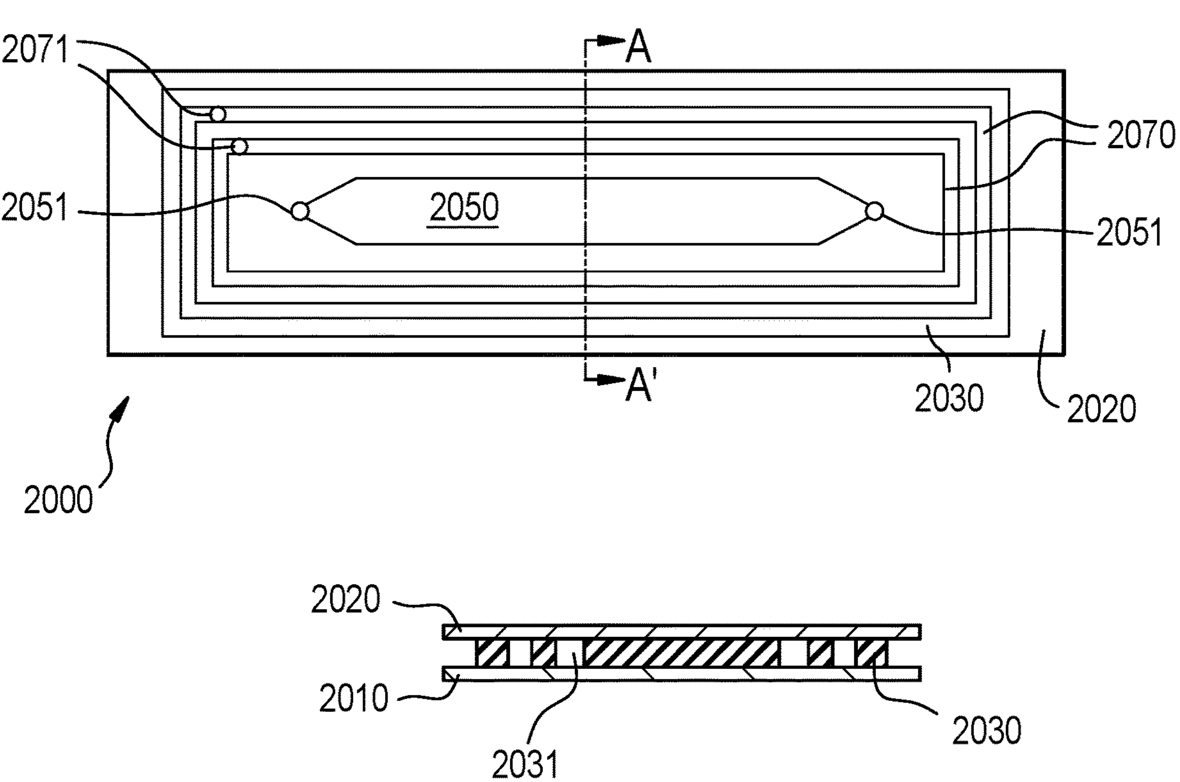
FIG. 20 illustrates an embodiment of a device, e.g., a flowcell, having a fluidic interface layer, a gasket having three voids, and a substrate layer. Device 2000 of FIG. 20 includes substrate layer 2010, fluidic interface layer 2020, and gasket 2030 having a plurality of gasket voids 2031. Two of the gasket voids 2031 define release fluid channels 2070, and the remaining gasket void 2031 defines flow path 2050. Ports 2071, 2051 in the fluidic interface layer connect to the voids in the gasket.

Device 2000, shown in FIG. 20, includes substrate layer 2010, fluidic interface layer 2020, and gasket 2030 therebetween having a plurality of gasket voids 2031. Two of the gasket voids 2031 define release fluid channels 2070, and the remaining gasket void 2031 defines flow path 2050.

When disassembly is desired, a release fluid, such as isopropyl alcohol, is injected into one or both release fluid channels 2070. The release fluid reduces the attraction between the gasket and substrate layer to allow for easier disassembly.

Other embodiments are in the claims.

What is claimed is:

1. A device comprising:

a fluidic interface layer having a top surface, a bottom surface, and at least one side surface;

a substrate layer having a top surface, a bottom surface, and at least one side surface; and a gasket disposed between the bottom surface of the fluidic interface layer and the top surface of the substrate layer, wherein a first portion of the gasket is wrapped over the at least one side surface of the fluidic interface layer and at least a portion of the top surface of the fluidic interface layer.

2. The device of claim 1, wherein a second portion of the gasket is wrapped over the at least one side surface of the fluidic interface layer and at least a portion of the top surface of the fluidic interface layer.

3. The device of claim 1, wherein the gasket is reversibly attached to the fluidic interface layer and/or the substrate layer.

4. The device of claim 1, wherein the device comprises one or more channels, and wherein the one or more channels are connected to the exterior of the device through one or more vias or pierceable seals.

5. The device of claim 4, wherein the one or more channels are formed within the gasket or wherein the one or more channels are formed within the fluidic interface layer.

6. The device of claim 1, wherein the gasket comprises a void defining a flow path.

7. A device comprising:

a fluidic interface layer having a top surface, a bottom surface, and at least one side surface, wherein the fluidic interface layer comprises at least one inlet at a first end and at least one outlet at a second end, wherein the fluidic interface layer comprises a vacuum port;

a substrate layer having a top surface, a bottom surface, and at least one side surface; and a gasket disposed between the bottom surface of the fluidic interface layer and the top surface of the substrate layer, wherein the gasket comprises one or more voids defining a flow path extending from the first end to the second end, wherein the gasket comprises a vacuum channel extending around each of the one or more voids and fluidically coupled to the vacuum port, wherein the contact between the gasket and the substrate layer is reversible, and wherein the device is configured to be sealed by applying negative pressure to the vacuum port thereby forming a fluid tight seal between the fluidic interface layer, the substrate layer, and the gasket.

8. The device of claim 7, further comprising one or more spacers positioned within at least one of the one or more voids.

9. A device comprising:

a substrate layer;

a fluidic interface layer;

a gasket disposed therebetween; and a release fluid channel, wherein the gasket comprises a first void defining a flow path.

10. The device of claim 9, wherein the fluidic interface layer or the gasket further comprises a release fluid inlet in fluid communication with the release fluid channel.

11. The device of claim 9, wherein the release fluid channel is disposed within the gasket and within the fluidic interface layer and defined by a bonded perimeter and an unbonded interior within or wherein the release fluid channel is a second void in the gasket.

12. A method for disassembling a flowcell comprising:

providing a device according to claim 9;

providing a fluid to the release fluid channel; and separating the gasket from the substrate layer.

13. The method of claim 12, wherein providing the fluid pressurizes the release fluid channel and deforms the gasket to reduce surface area in contact with the substrate layer.

14. The method of claim 12, wherein providing the fluid reduces the bonding between the gasket and the substrate layer.

15. A method for assembling a device comprising:

providing a device according to claim 7, and forming a fluid tight seal between the fluidic interface layer, the substrate layer, and the gasket by applying a negative pressure to the vacuum port, wherein the gasket is removable from the substrate layer after assembly.

16. The method of claim 12, further comprising applying positive pressure to the one or more voids in the gasket to thereby separate the gasket from the fluidic interface layer and/or the substrate layer.

* * * * *